(12) United States Patent
Cocagne

(10) Patent No.: US 10,078,472 B2
(45) Date of Patent: Sep. 18, 2018

(54) REBUILDING ENCODED DATA SLICES IN A DISPERSED STORAGE NETWORK

(71) Applicant: International Business Machines Corporation, Armonk, NY (US)

(72) Inventor: Thomas Darrel Cocagne, Elk Grove Village, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 264 days.

(21) Appl. No.: 14/984,024

(22) Filed: Dec. 30, 2015

(65) Prior Publication Data

US 2016/0253240 A1    Sep. 1, 2016

Related U.S. Application Data

(60) Provisional application No. 62/121,736, filed on Feb. 27, 2015.

(51) Int. Cl.
    *G06F 11/10* (2006.01)
    *G06F 3/06* (2006.01)

(52) U.S. Cl.
    CPC .............. *G06F 3/067* (2013.01); *G06F 3/064* (2013.01); *G06F 3/0619* (2013.01); *G06F 11/1092* (2013.01); *G06F 2211/1028* (2013.01)

(58) Field of Classification Search
    CPC ...... G06F 3/064; G06F 3/067; G06F 11/1076; G06F 3/0619; G06F 11/1092; G06F 11/1088; G06F 2212/263
    See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Phung M Chung
(74) *Attorney, Agent, or Firm* — Garlick & Markison; Timothy W. Markison; Kelly H. Hale

(57) ABSTRACT

A method for a computing device to rebuild a plurality of to-be rebuilt encoded data slices in a dispersed storage network (DSN) begins with the computing device, for each set of encoded data slices of a plurality of sets of encoded data slices that includes at least one of the plurality of to-be rebuilt encoded data slices, determining a cumulative memory health for memory devices of storage units storing other encoded data slices of the respective set of encoded data slices and determining a probability of data loss. The method continues with the computing device prioritizing rebuilding based on the probability of data loss for each set of encoded data slices and rebuilding, in accordance with the prioritizing, a first to-be rebuilt encoded data slice of the plurality of to-be rebuilt encoded data slices to produce a first rebuilt encoded data slice.

18 Claims, 57 Drawing Sheets

(56) References Cited

U.S. PATENT DOCUMENTS

| | | | |
|---|---|---|---|
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 9,110,833 B2* | 8/2015 | Gladwin | G06F 12/1458 |
| 9,727,275 B2* | 8/2017 | Kazi | G06F 3/065 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2014/0331086 A1* | 11/2014 | Resch | G06F 11/1458 714/15 |
| 2017/0147428 A1* | 5/2017 | Volvovski | G06F 11/10 |
| 2017/0300374 A1* | 10/2017 | Gladwin | G06F 11/0727 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner distributed computing system 10

| DST allocation info 242 | | | | | | | |
|---|---|---|---|---|---|---|---|
| | data partition info 320: data ID; No. of partitions; Addr. info for each partition; format conversion indication | | | | | | |
| | task execution info 322 | | | | intermediate result info 324 | | |
| task 326 | task ordering 328 | data partition 330 | set of DT EX mods 332 | Name 334 | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1-4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z &<br>R1-5_1 - R1-5_z | 1_2, 2_2, 3_2, 4_2, & 5_2 | R1-6 | DST unit 2 | DST unit 2 | DST units 2-6 |
| 1_7 | after 1_2 & 1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

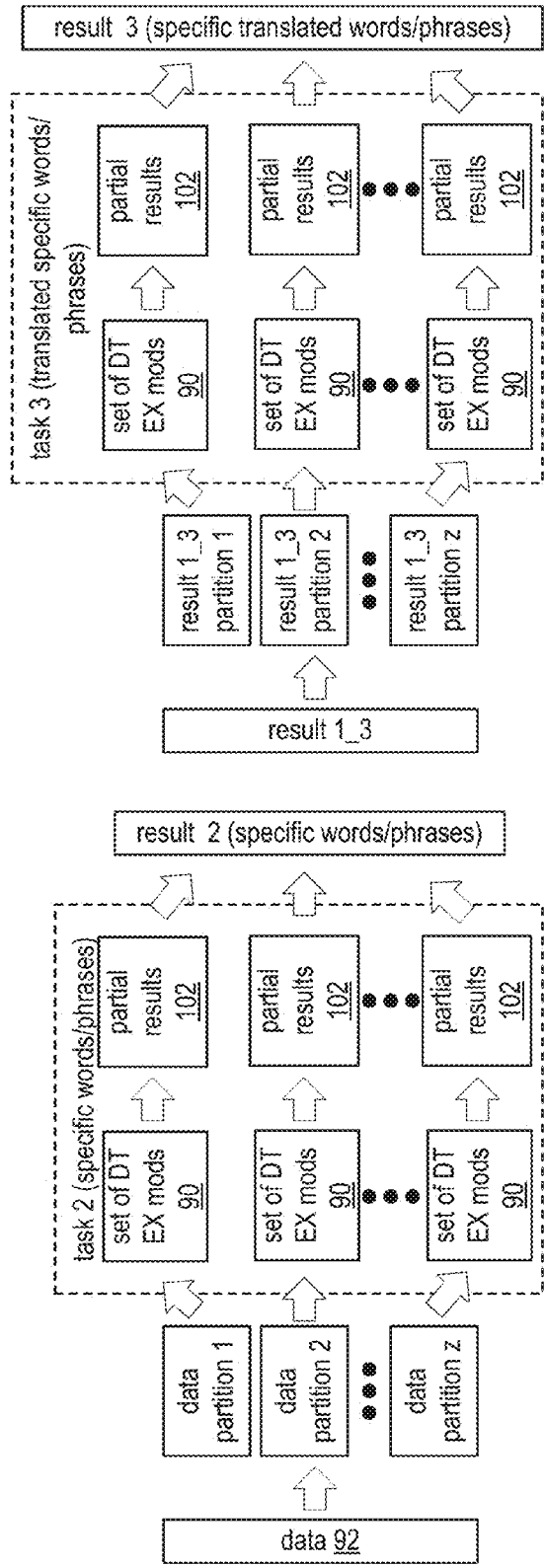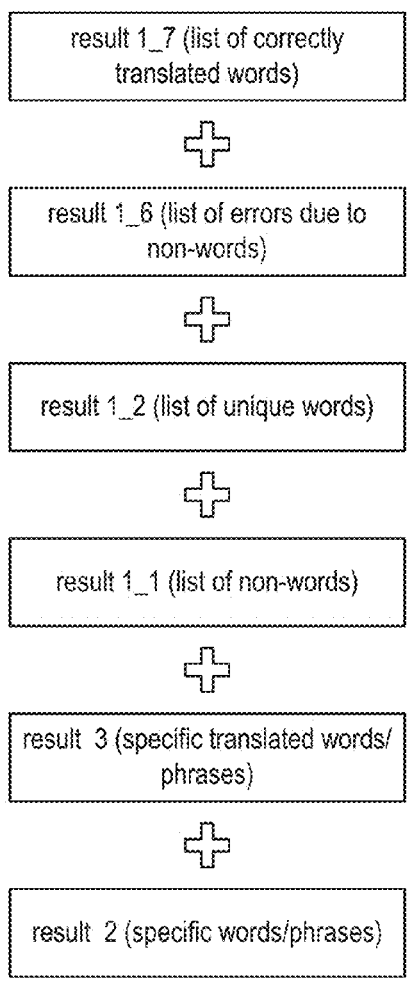

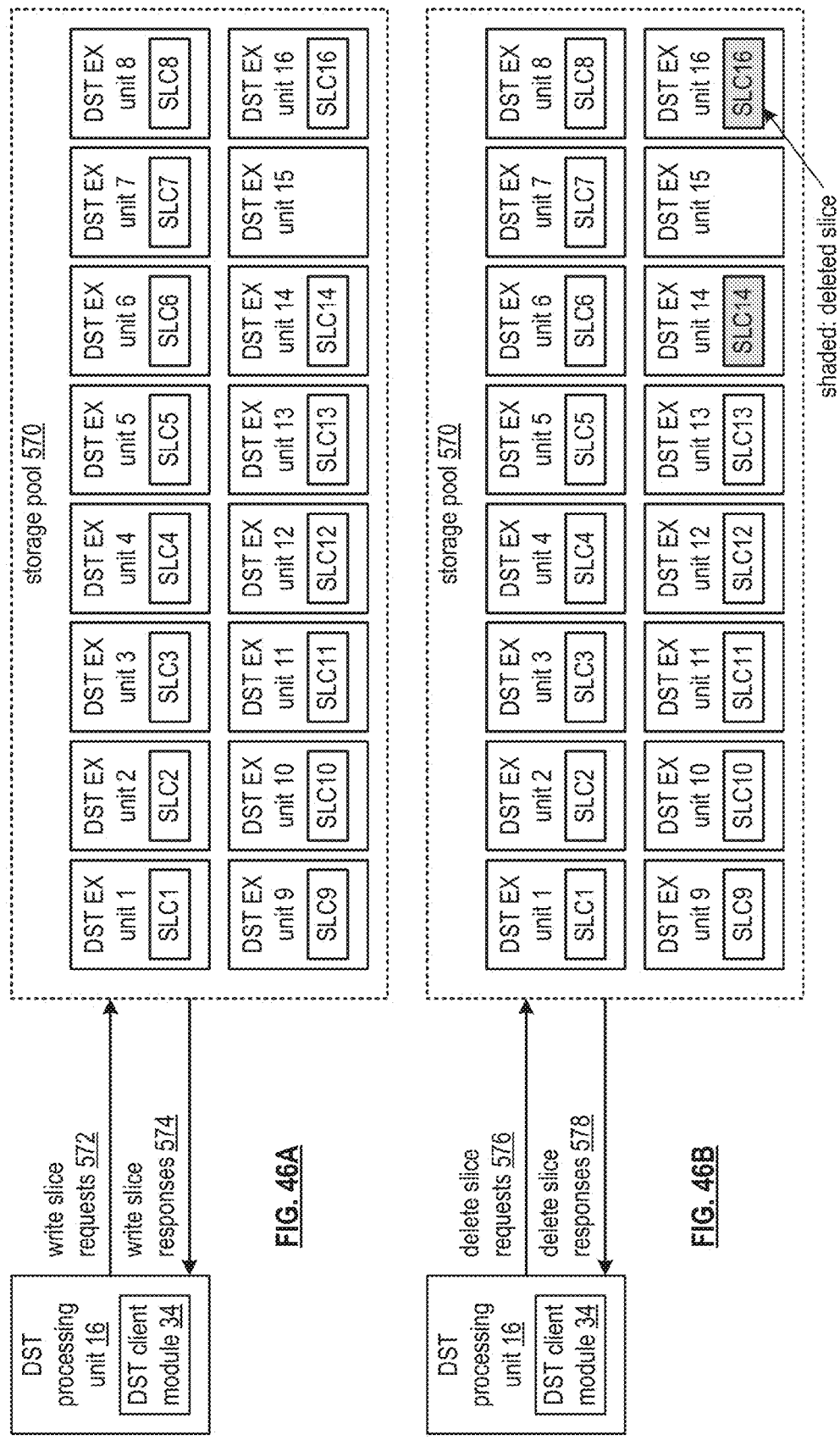

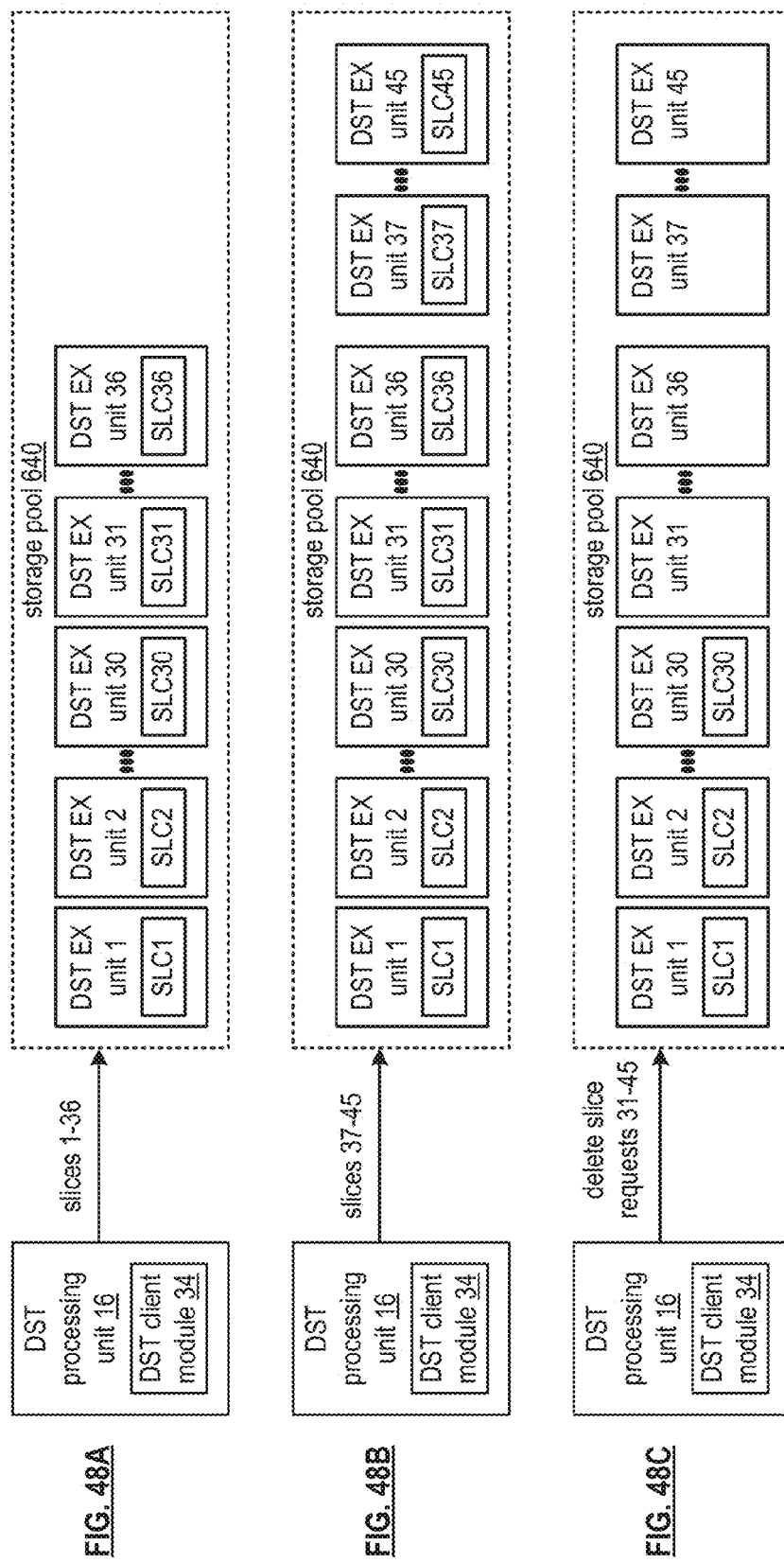

REBUILDING ENCODED DATA SLICES IN A DISPERSED STORAGE NETWORK

CROSS REFERENCE TO RELATED PATENTS

The present U.S. Utility patent application claims priority pursuant to 35 U.S.C. § 119(e) to U.S. Provisional Application No. 62/121,736, entitled "TRANSITIONING A STATE OF A DISPERSED STORAGE NETWORK," filed Feb. 27, 2015, which is hereby incorporated herein by reference in its entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc., on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

Figure 41A:
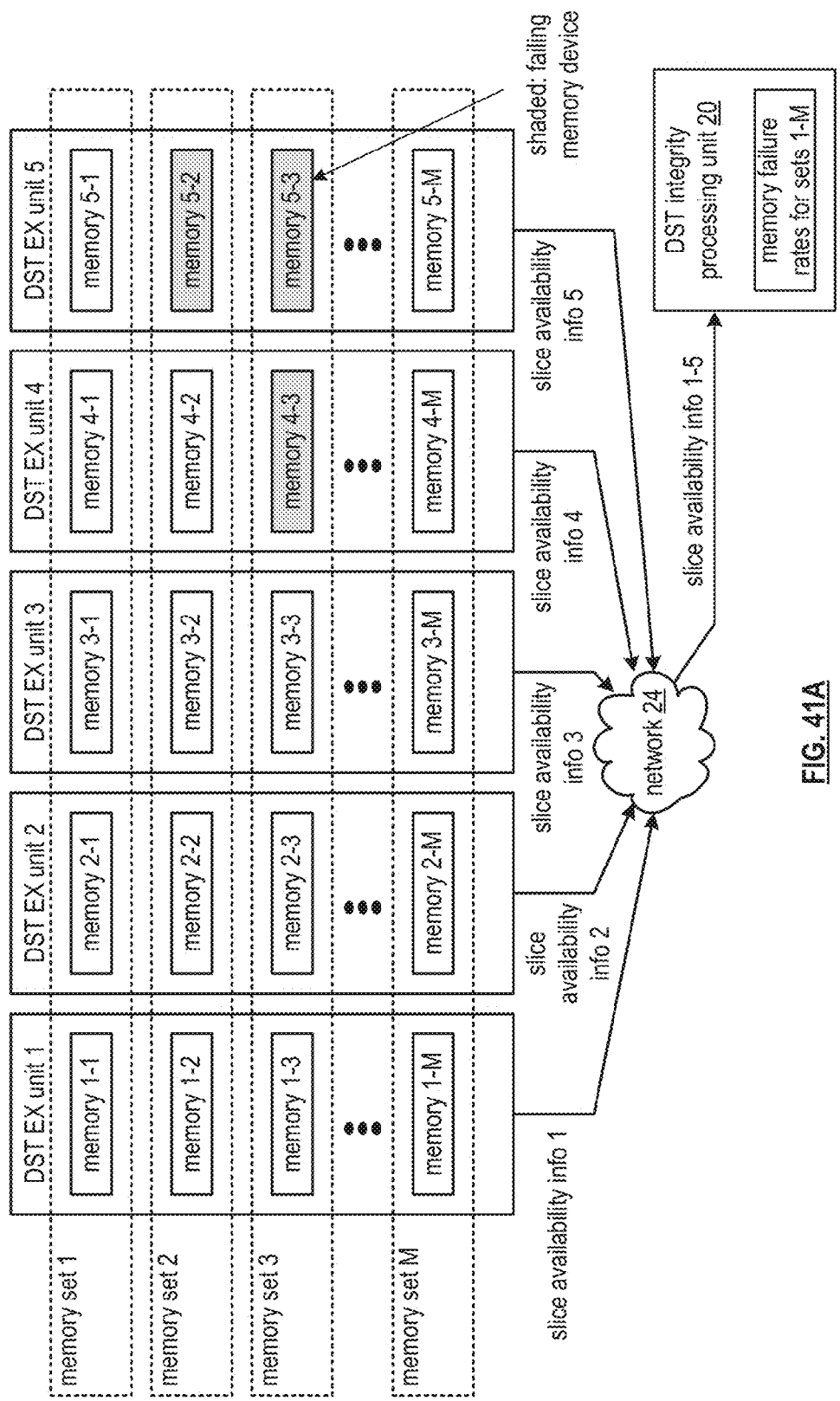
Figure 41B:
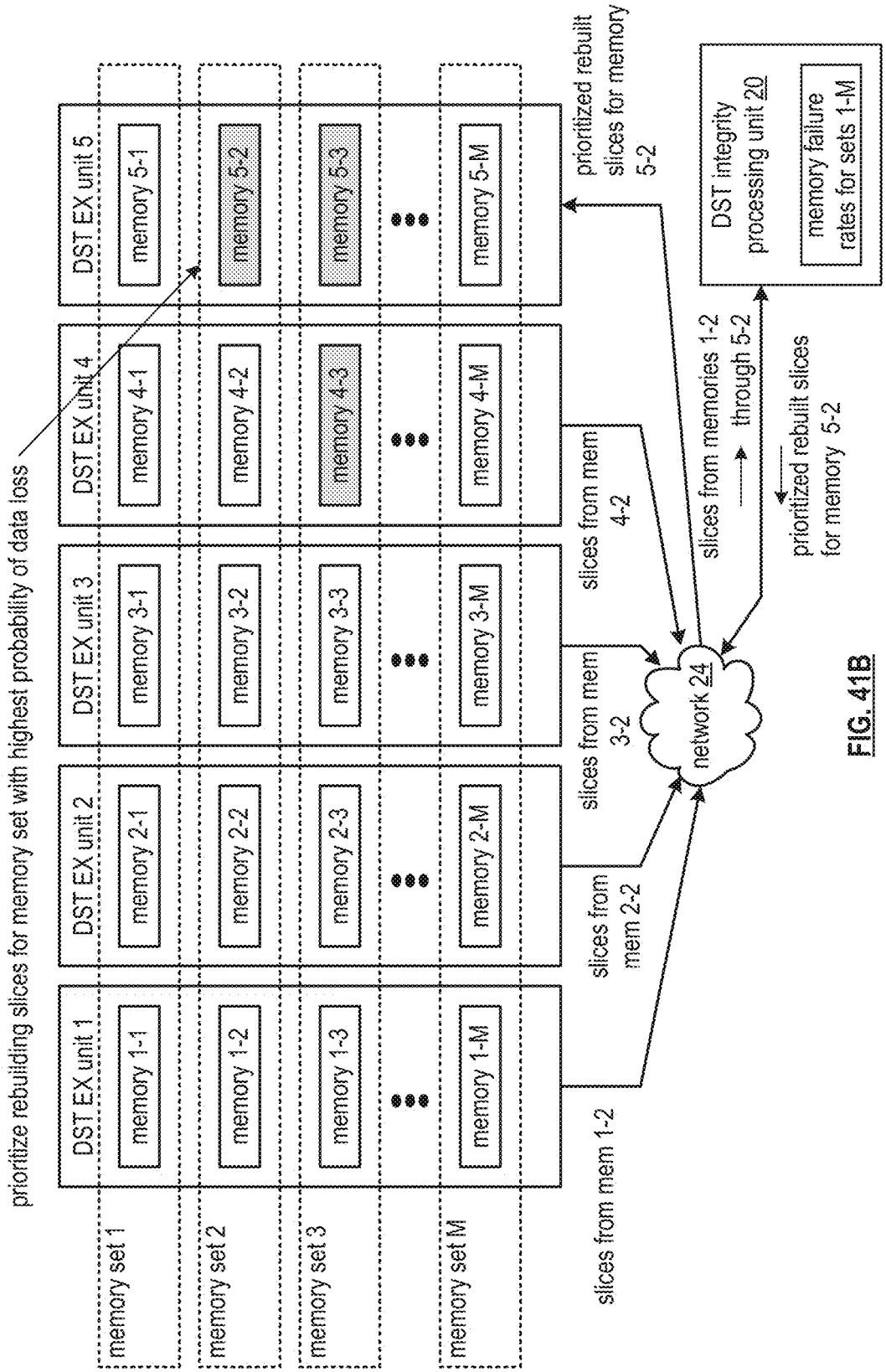
Figure 41C:
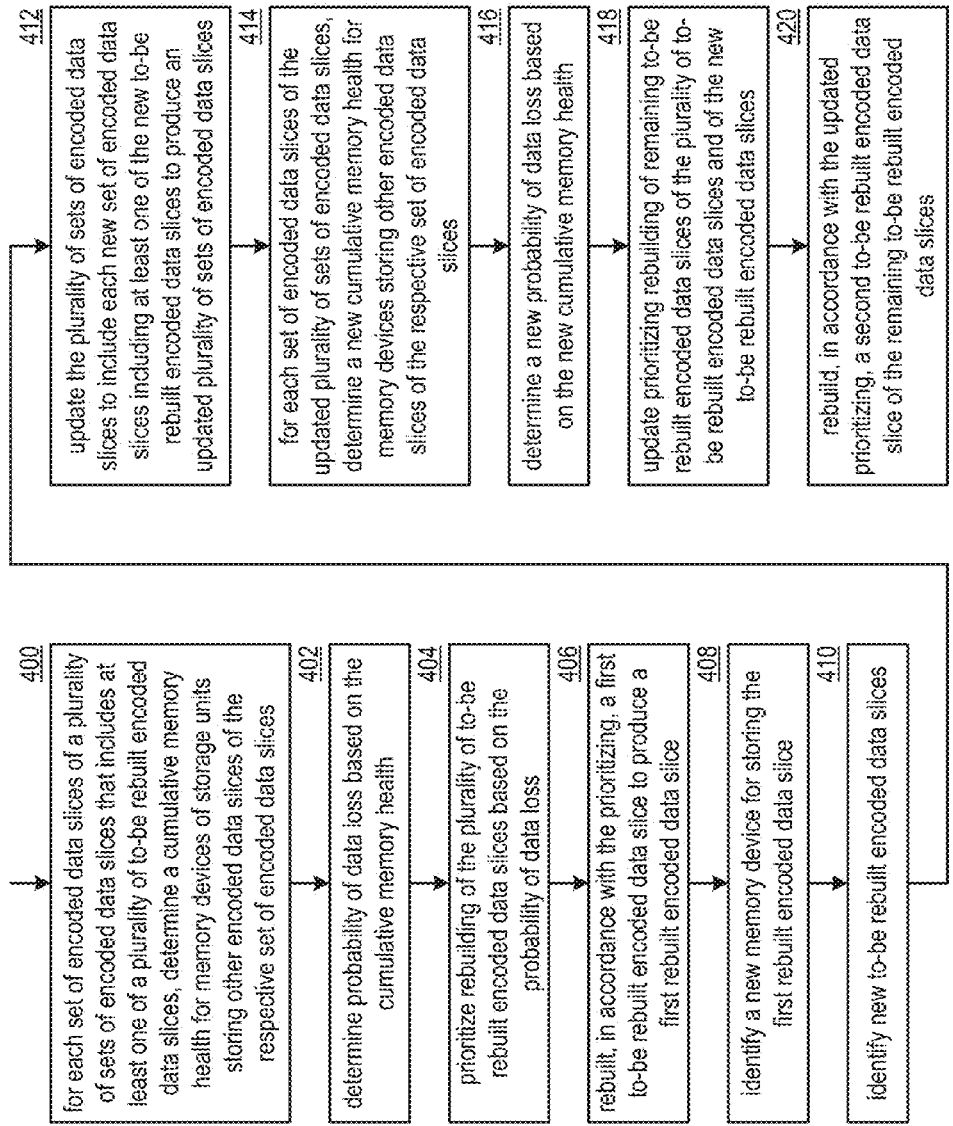
Figure 42A:
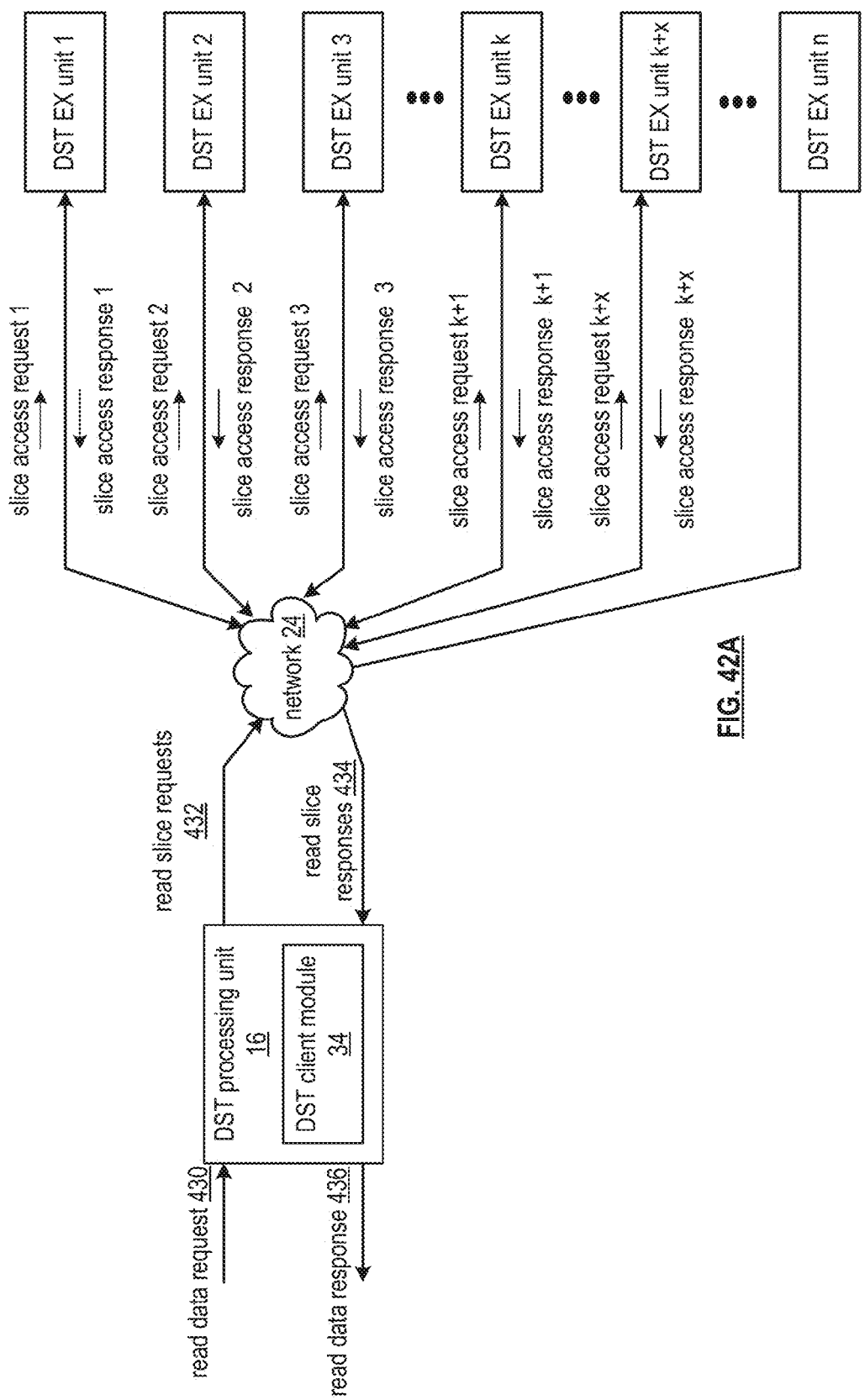
Figure 42B:
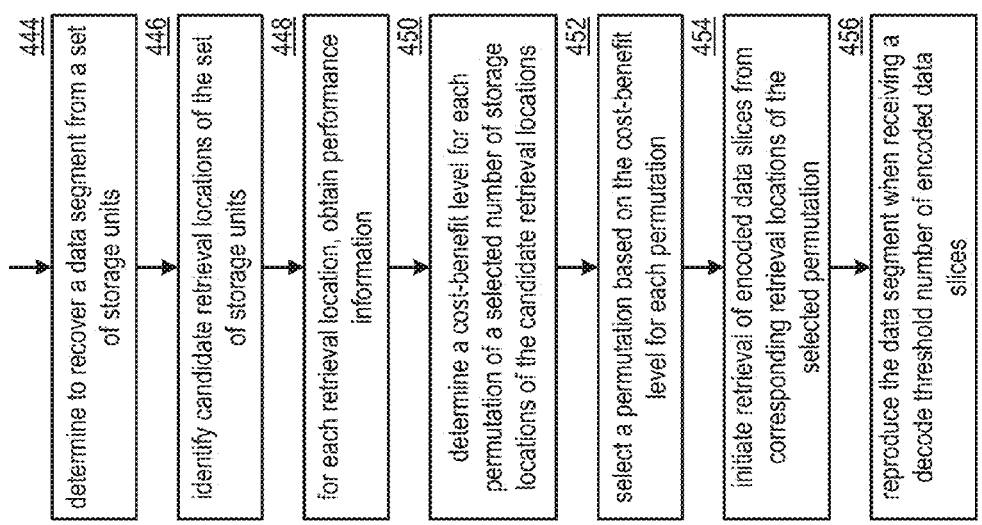
Figure 43A:
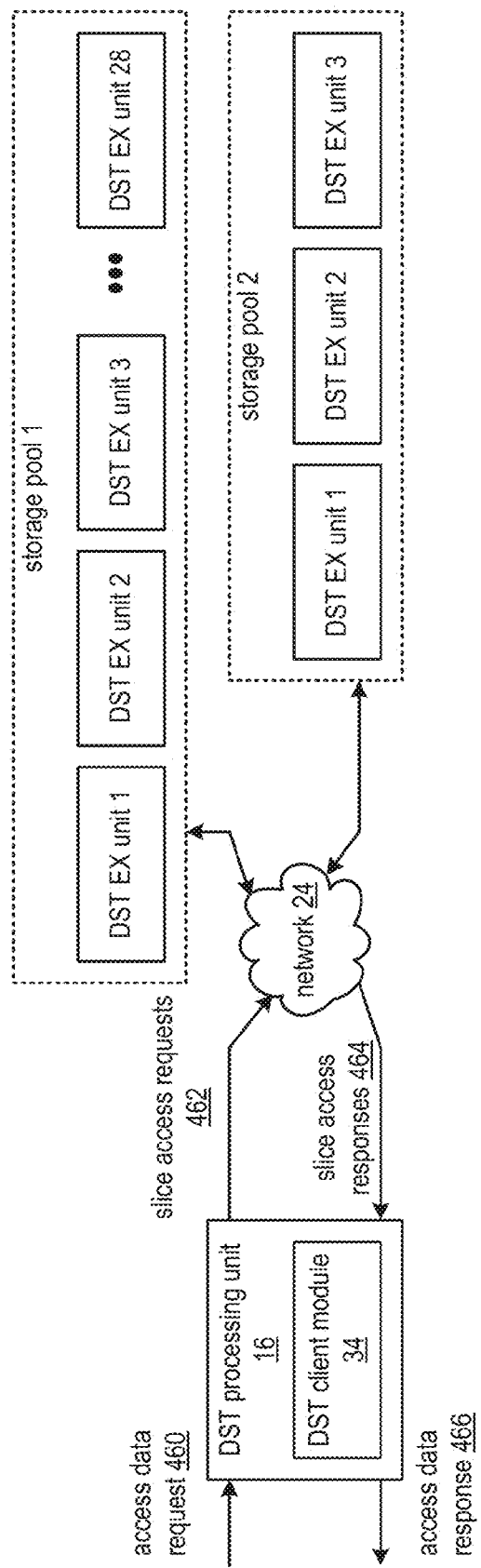
Figure 43B:
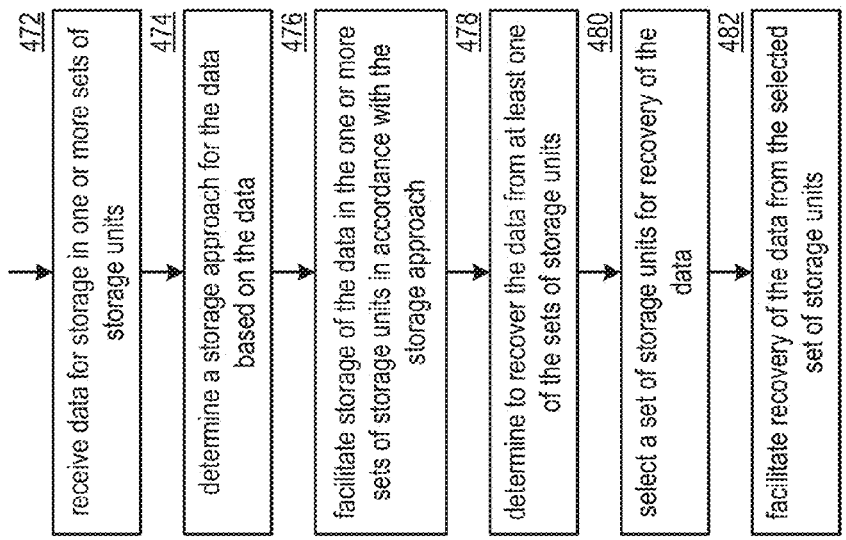
Figures 44A, 44B:
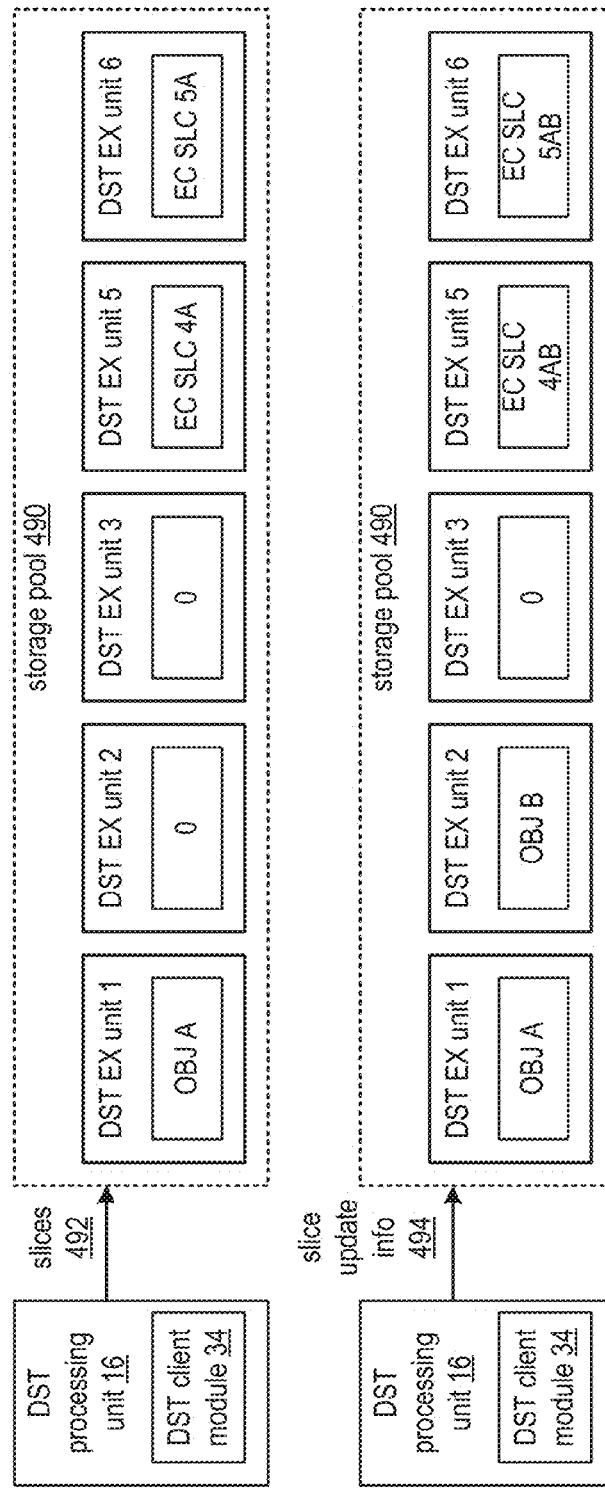
Figure 44C:
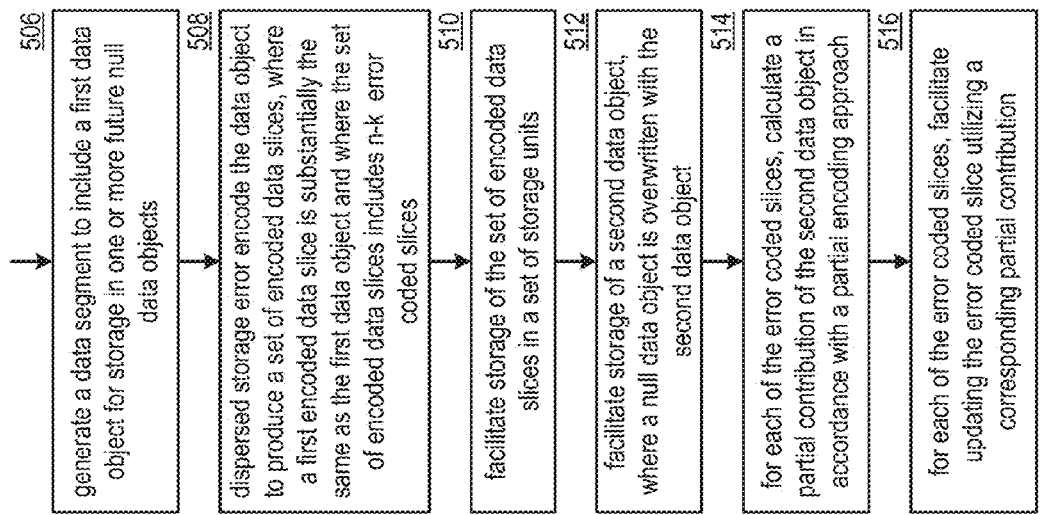
Figure 45A:
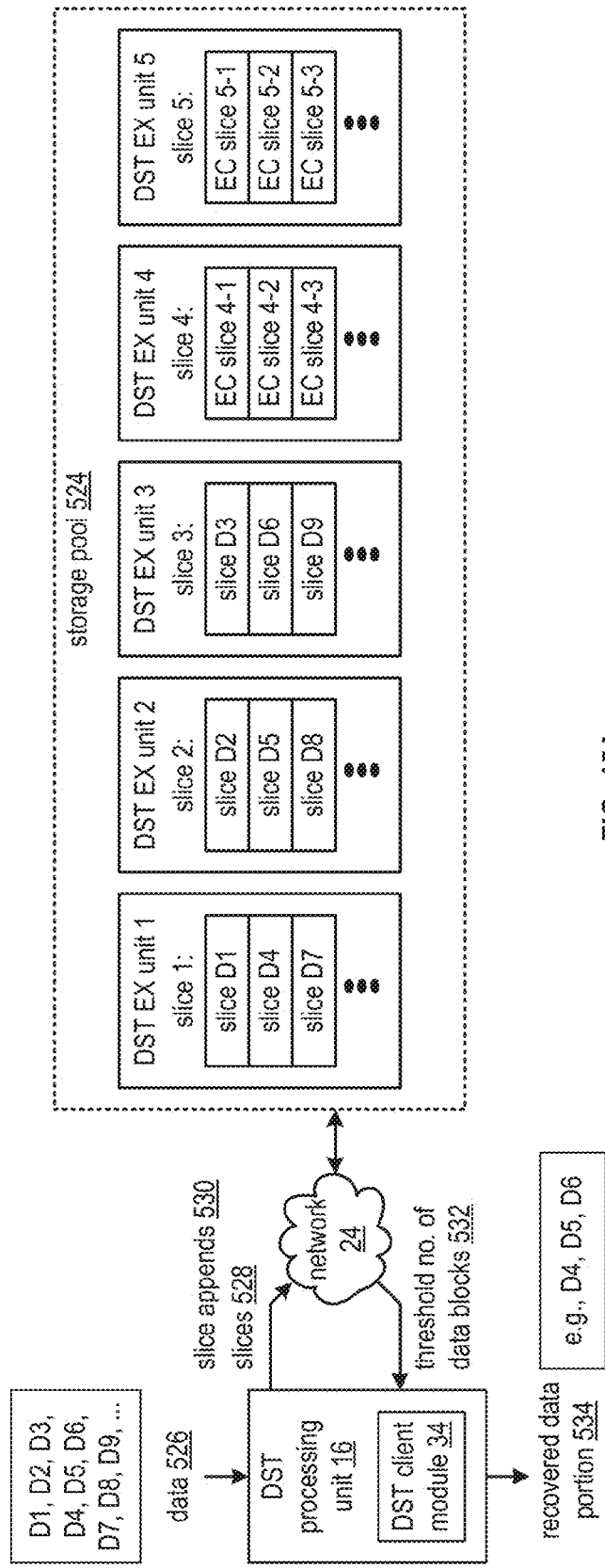
Figure 45B:
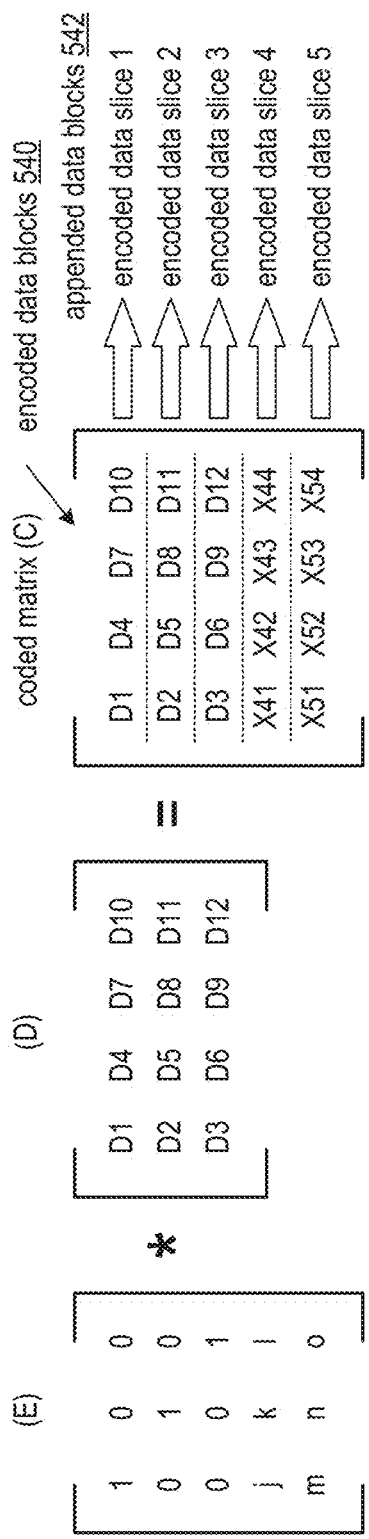
Figure 45C:
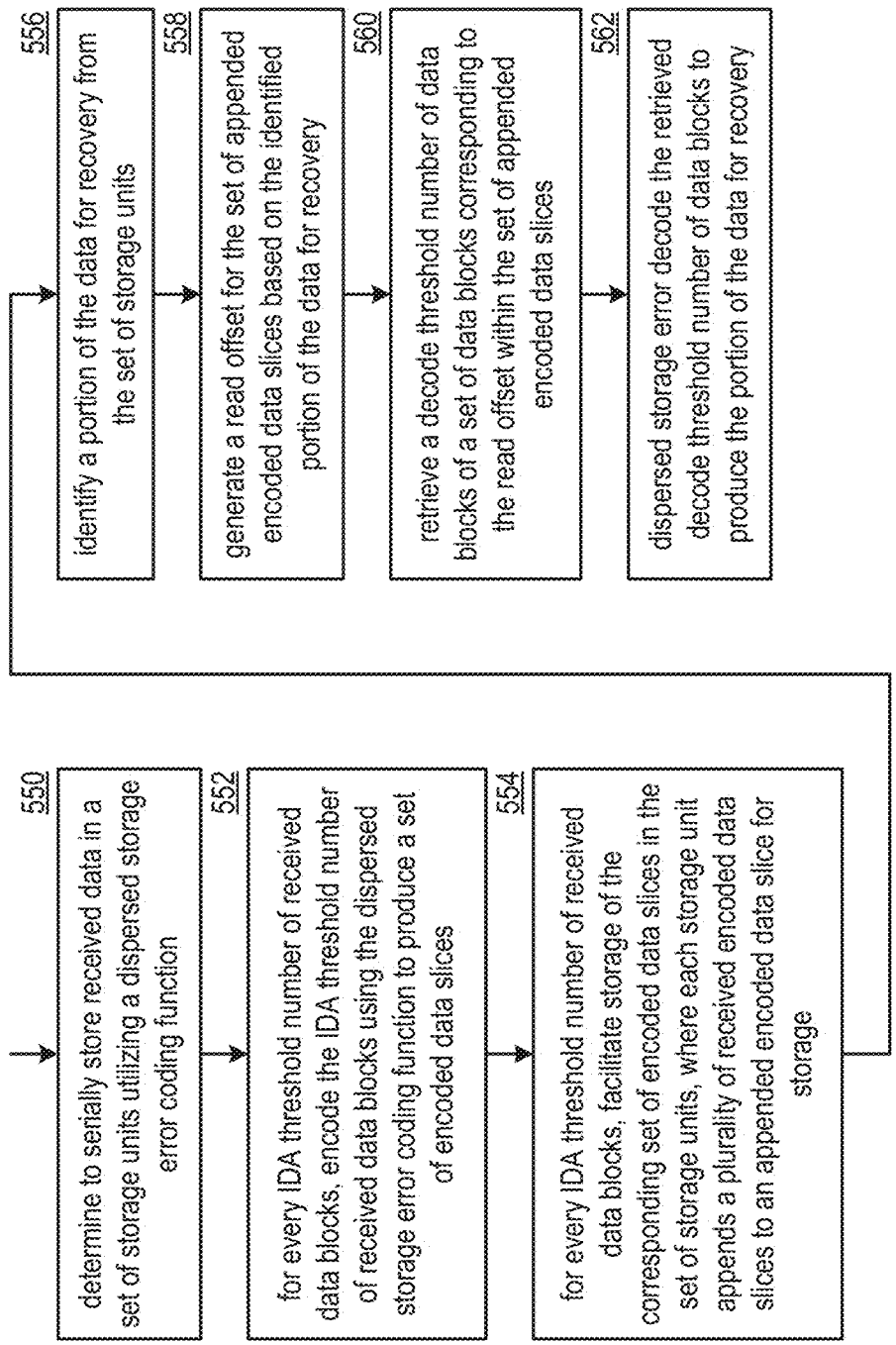
Figure 46C:
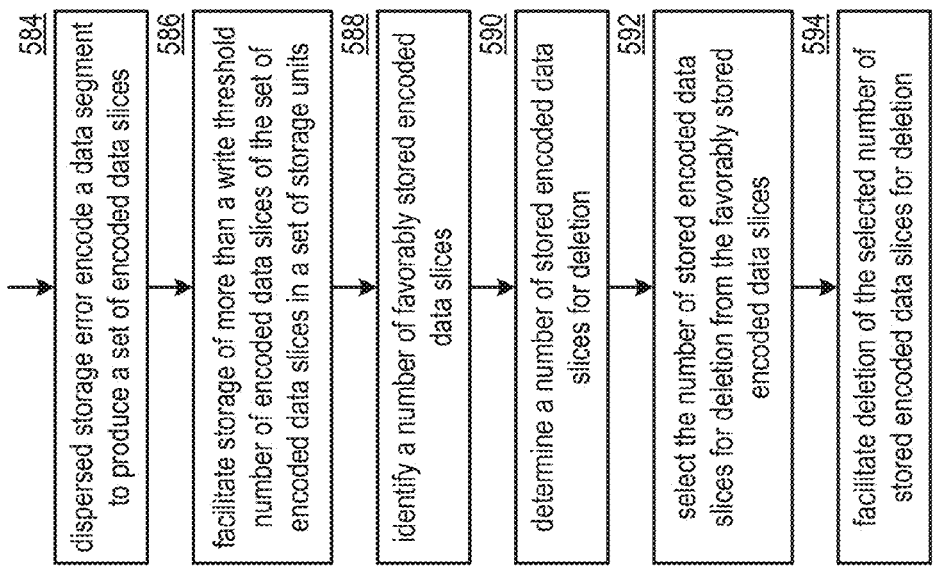
Figure 47A:
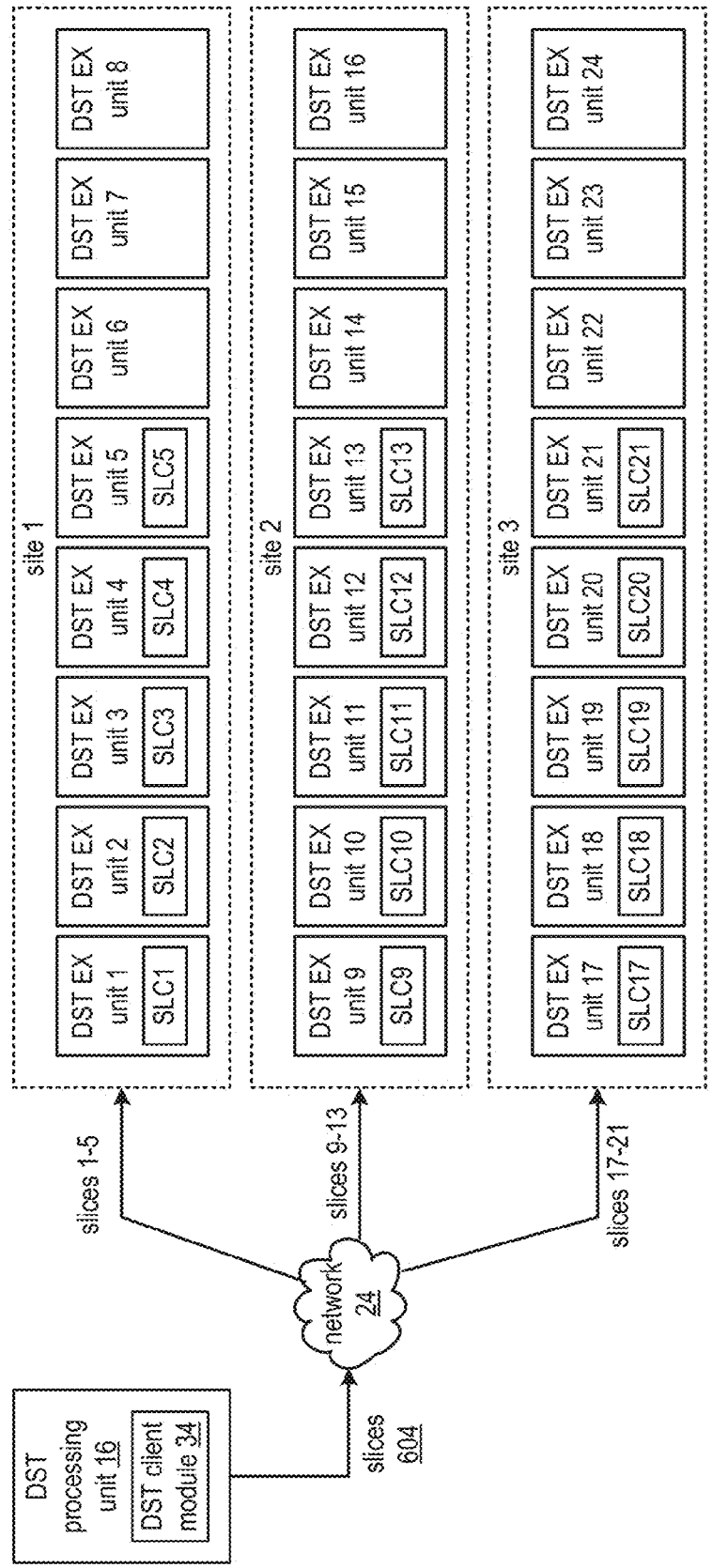
Figure 47B:
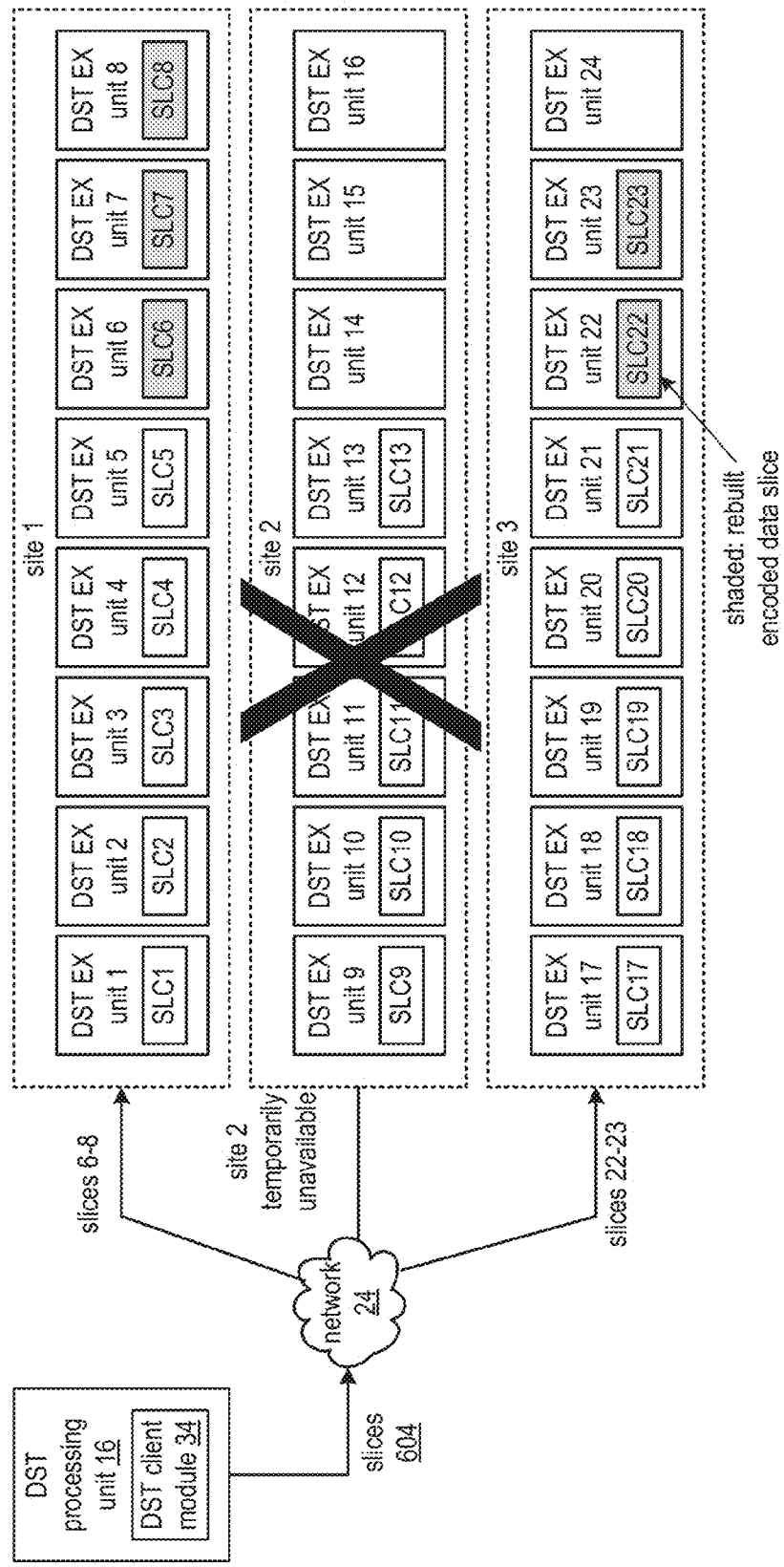
Figure 47C:
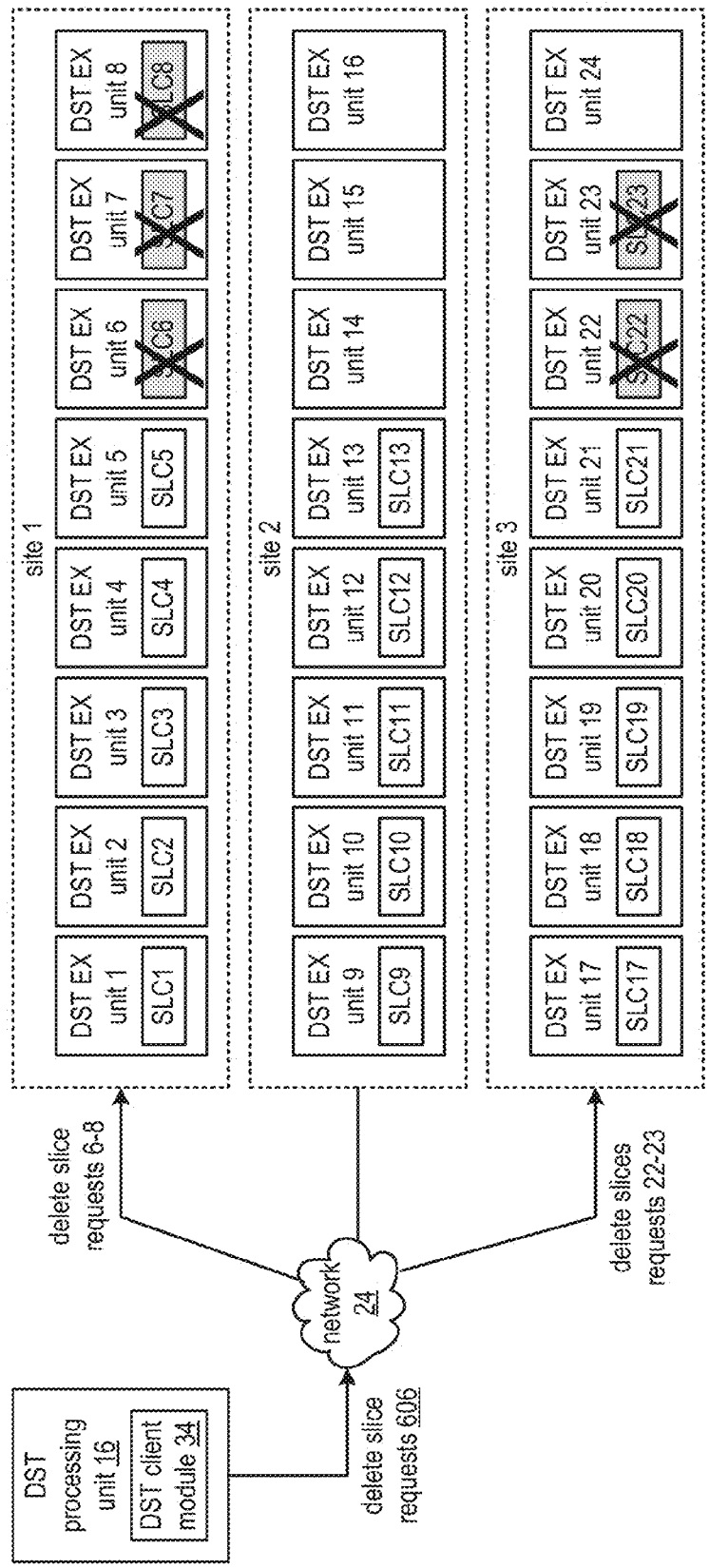
Figure 47D:
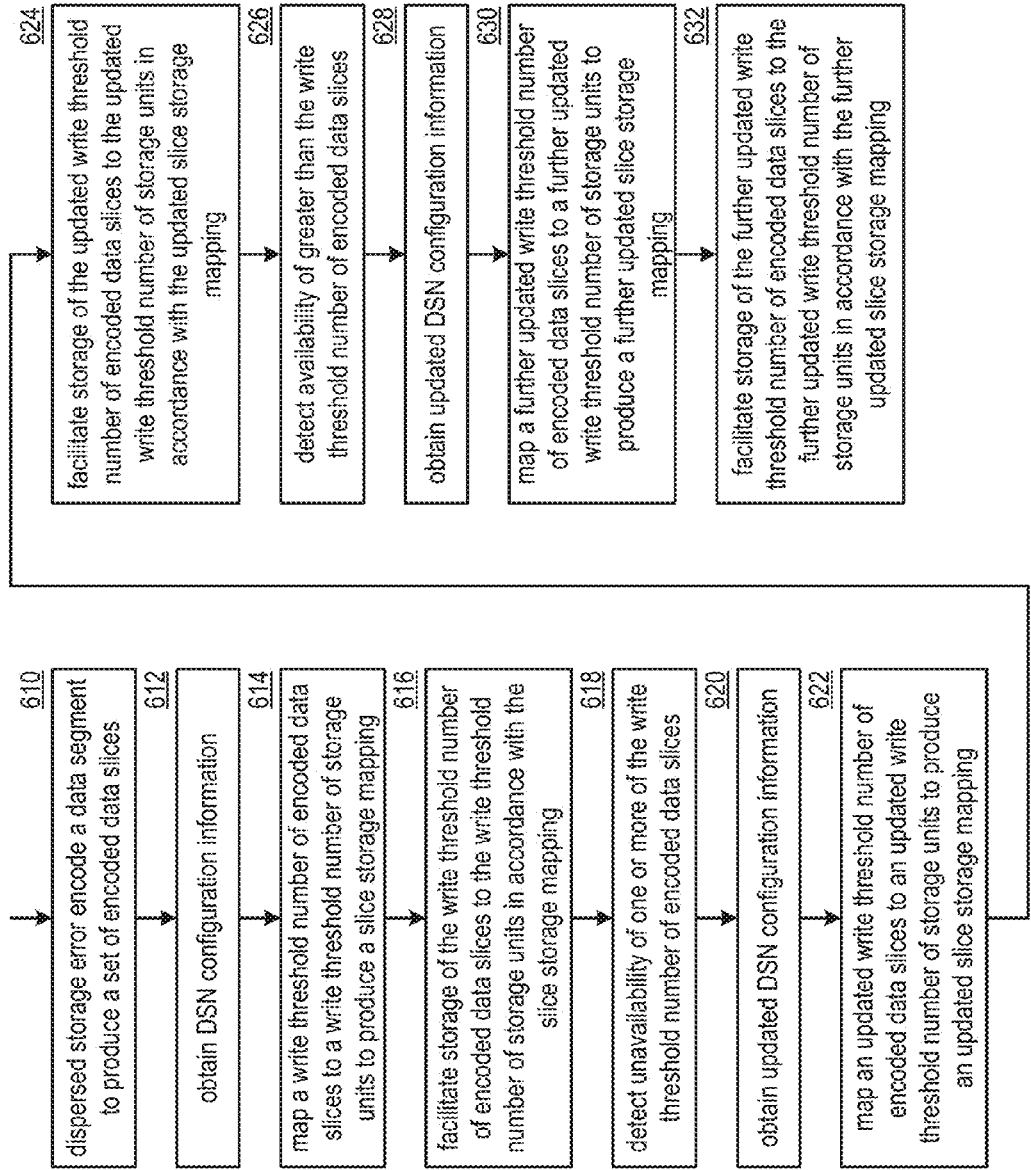
Figure 48D:
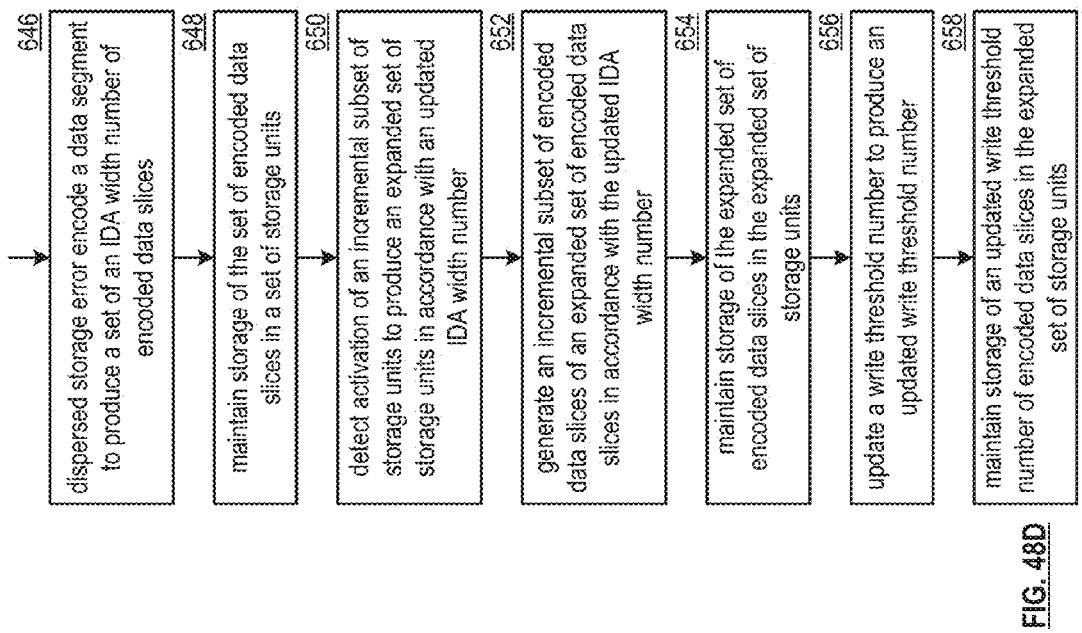

FIGS. 41A-B are schematic block diagrams of another embodiment of a dispersed storage network (DSN) in accordance with the present invention;

FIG. 41C is a flowchart illustrating an example of rebuilding encoded data slices in accordance with the present invention;

FIG. 42A is a schematic block diagram of another embodiment of a dispersed storage network (DSN) in accordance with the present invention;

FIG. 42B is a flowchart illustrating an example of selecting retrieval locations in accordance with the present invention;

FIG. 43A is a schematic block diagram of an embodiment of a dispersed storage network (DSN) in accordance with the present invention;

FIG. 43B is a flowchart illustrating an example of accessing data utilizing a plurality of storage pools in accordance with the present invention;

FIGS. 44A and 44B are schematic block diagrams of another embodiment of a dispersed storage network (DSN) in accordance with the present invention;

FIG. 44C is a flowchart illustrating an example of accessing data in accordance with the present invention;

FIG. 45A is a schematic block diagram of another embodiment of a dispersed storage network (DSN) in accordance with the present invention;

FIG. 45B is a diagram illustrating an example of matrix multiplication of an encoding matrix and a data matrix to produce a coded matrix in accordance with the present invention;

FIG. 45C is a flowchart illustrating an example of accessing serially stored data in accordance with the present invention;

FIGS. 46A and 46B are schematic block diagrams of another embodiment of a dispersed storage network (DSN) in accordance with the present invention;

FIG. 46C is a flowchart illustrating an example of optimizing data storage in accordance with the present invention;

FIGS. 47A, 47B, and 47C are schematic block diagrams of another embodiment of a dispersed storage network (DSN) in accordance with the present invention;

FIG. 47D is a flowchart illustrating another example of optimizing data storage in accordance with the present invention;

FIGS. 48A, 48B, and 48C are schematic block diagrams of an embodiment of a dispersed storage network (DSN) in accordance with the present invention; and FIG. 48D is a flowchart illustrating an example of transitioning to an optimized data storage approach in accordance with the present invention.

DETAILED DESCRIPTION OF THE INVENTION

Figure 1:
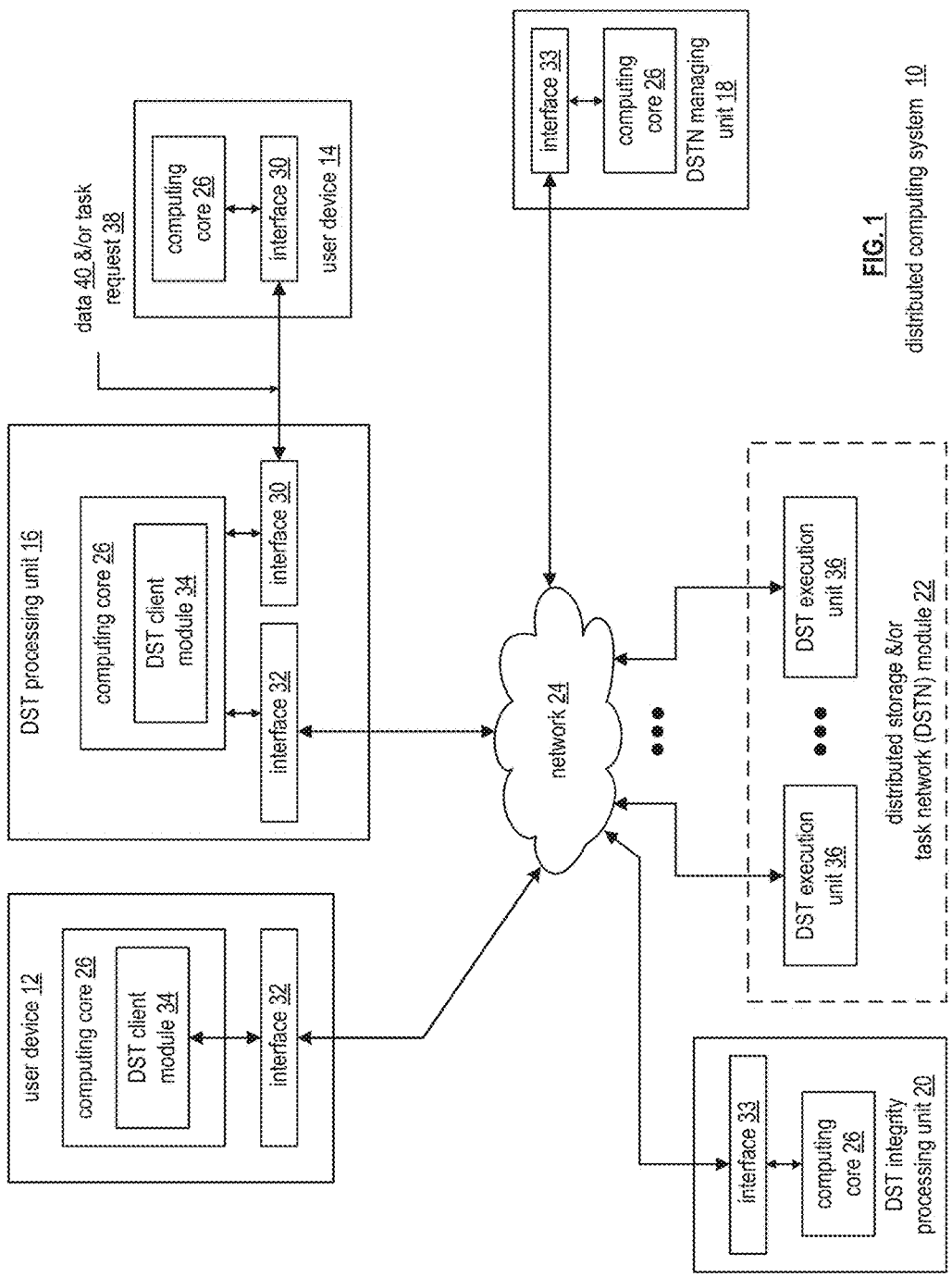
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
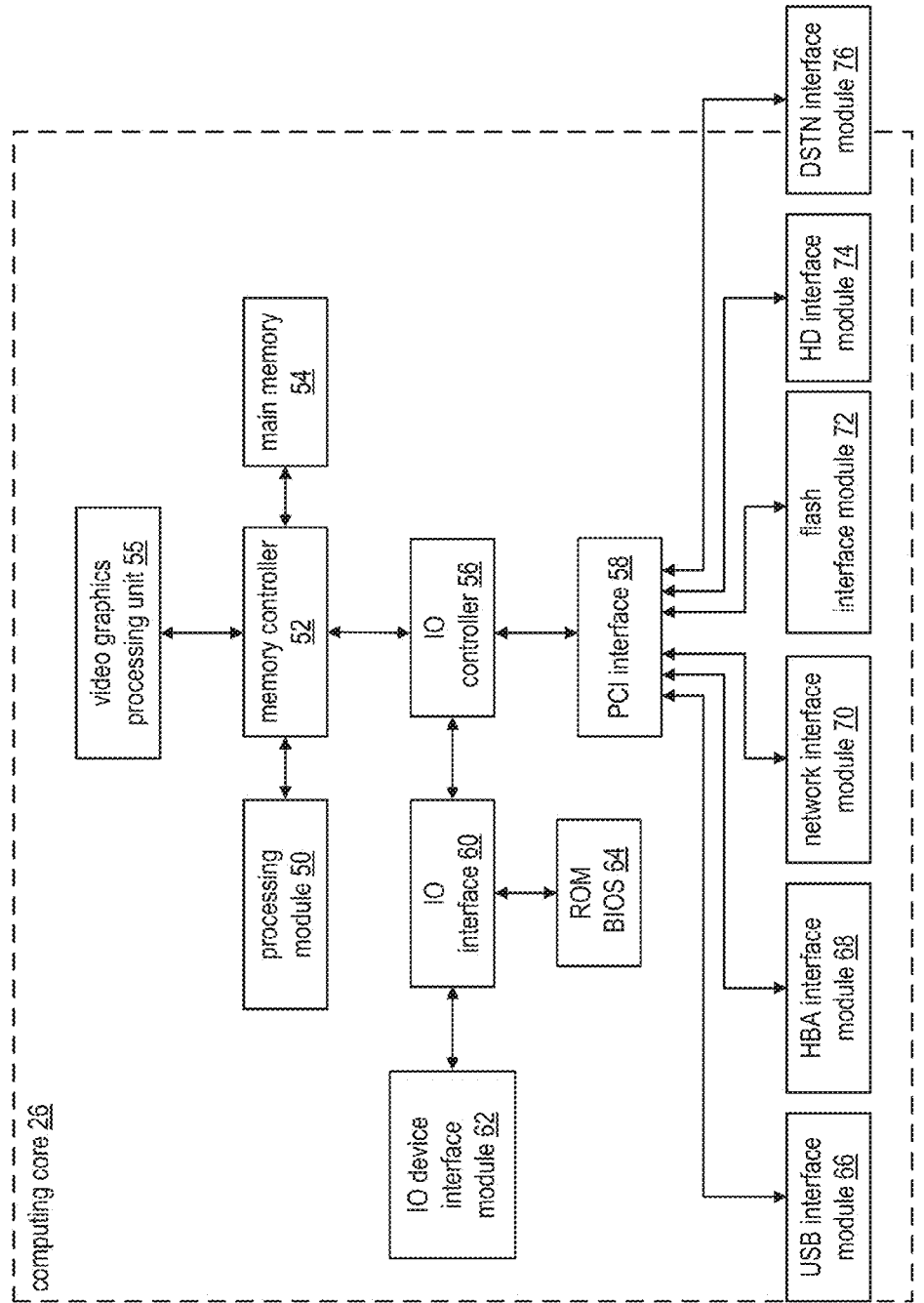
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an 10 interface module 60, at least one 10 device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
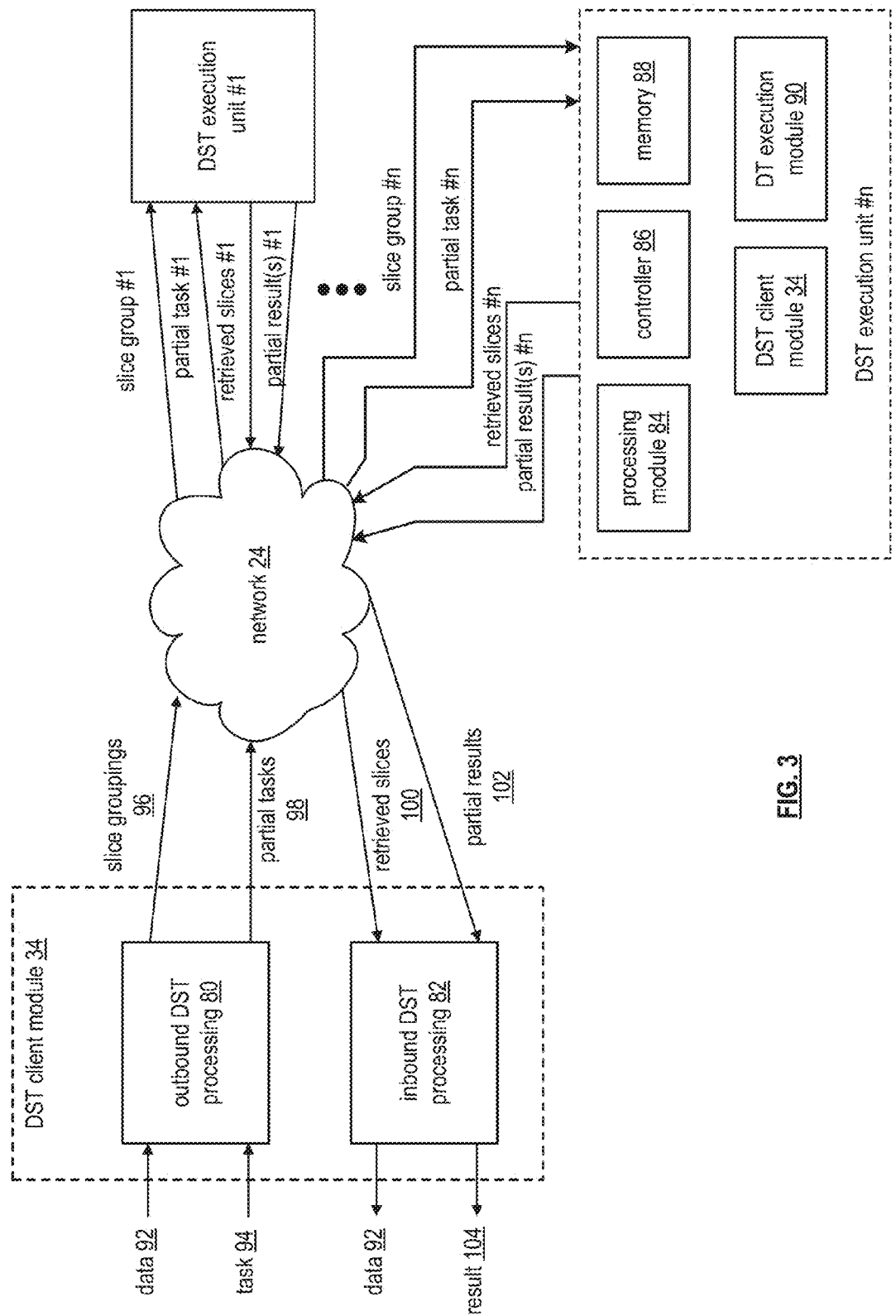
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
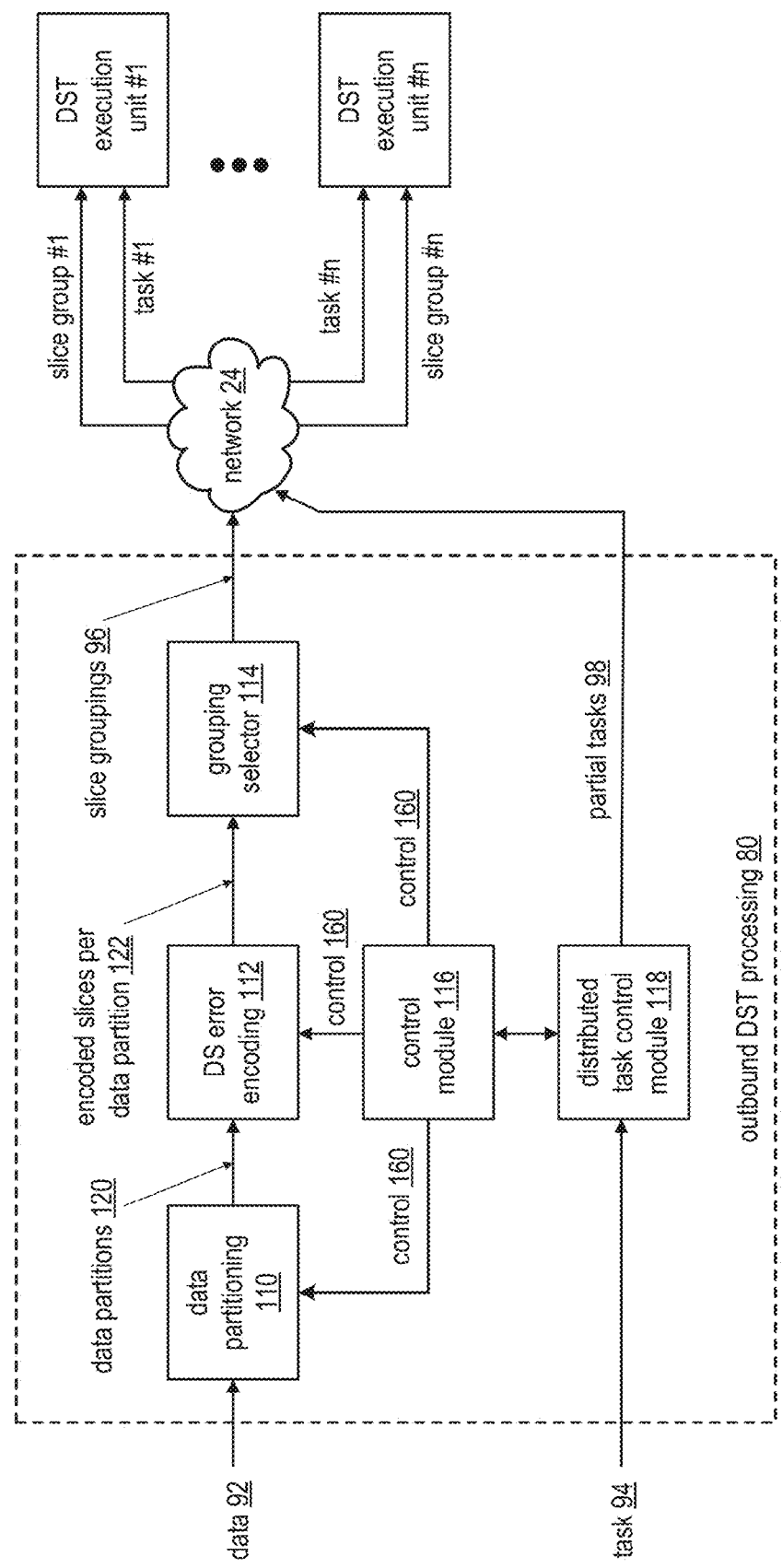
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
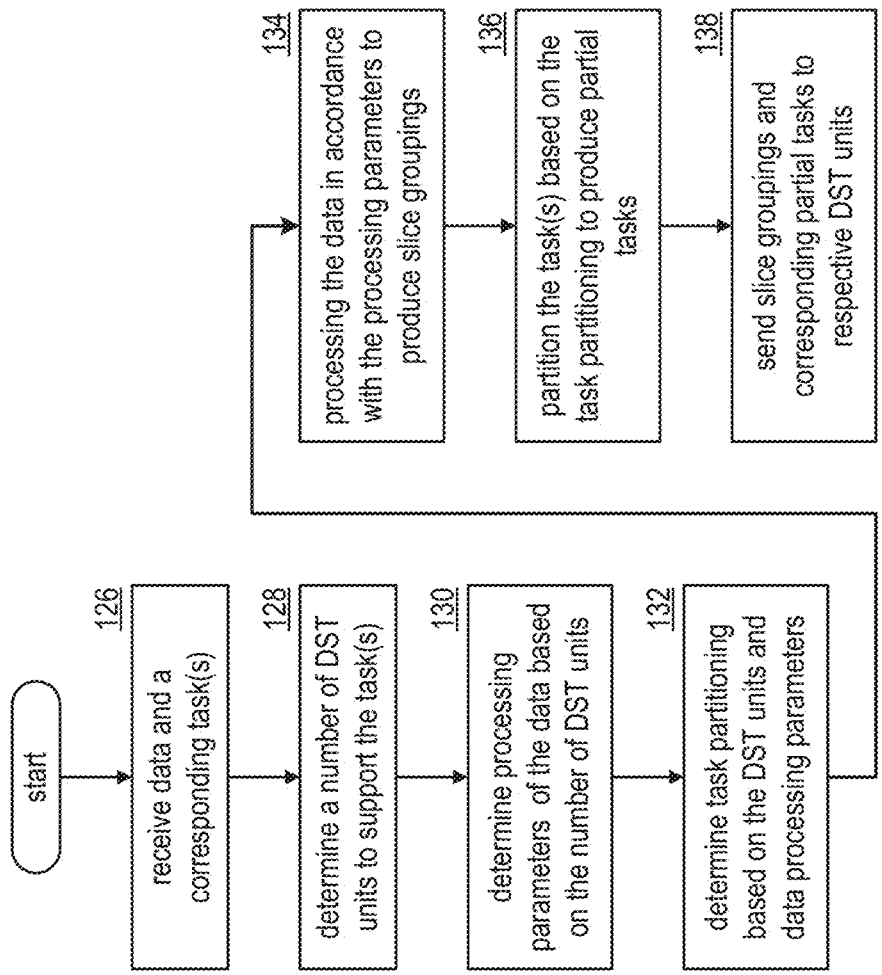
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
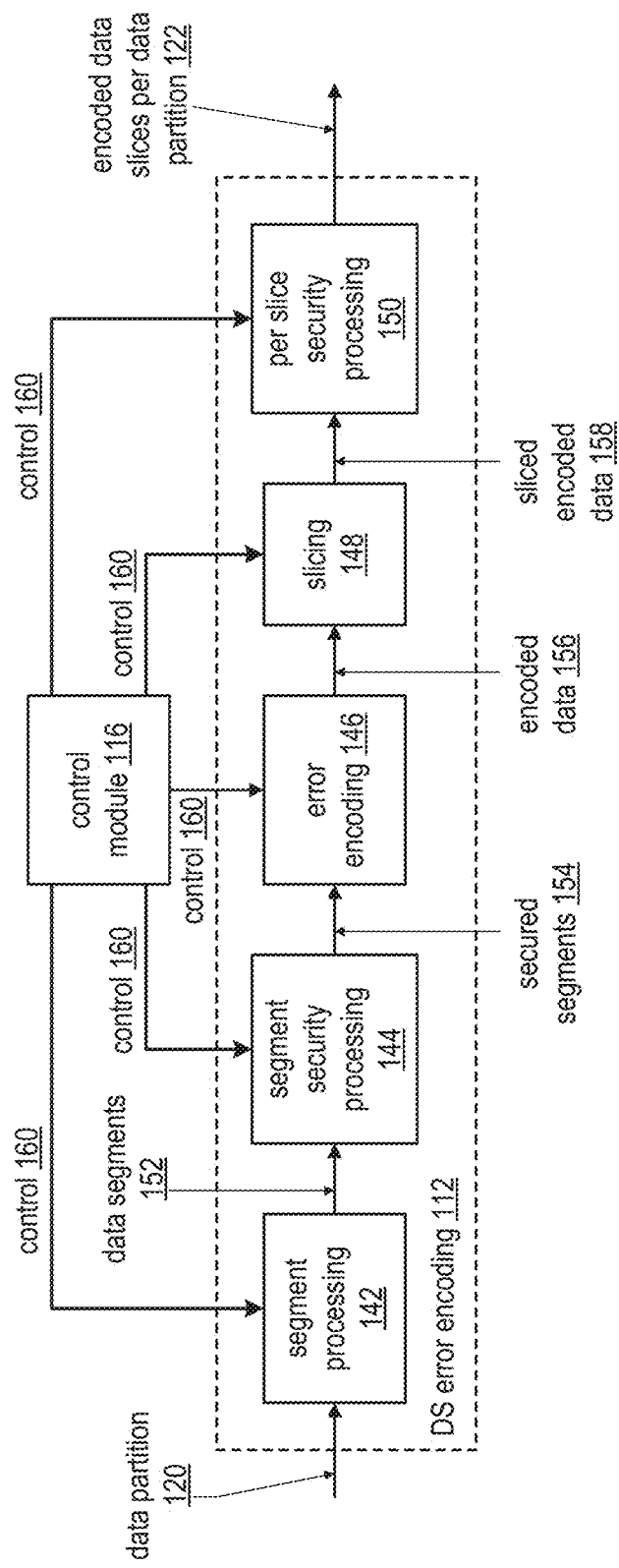
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
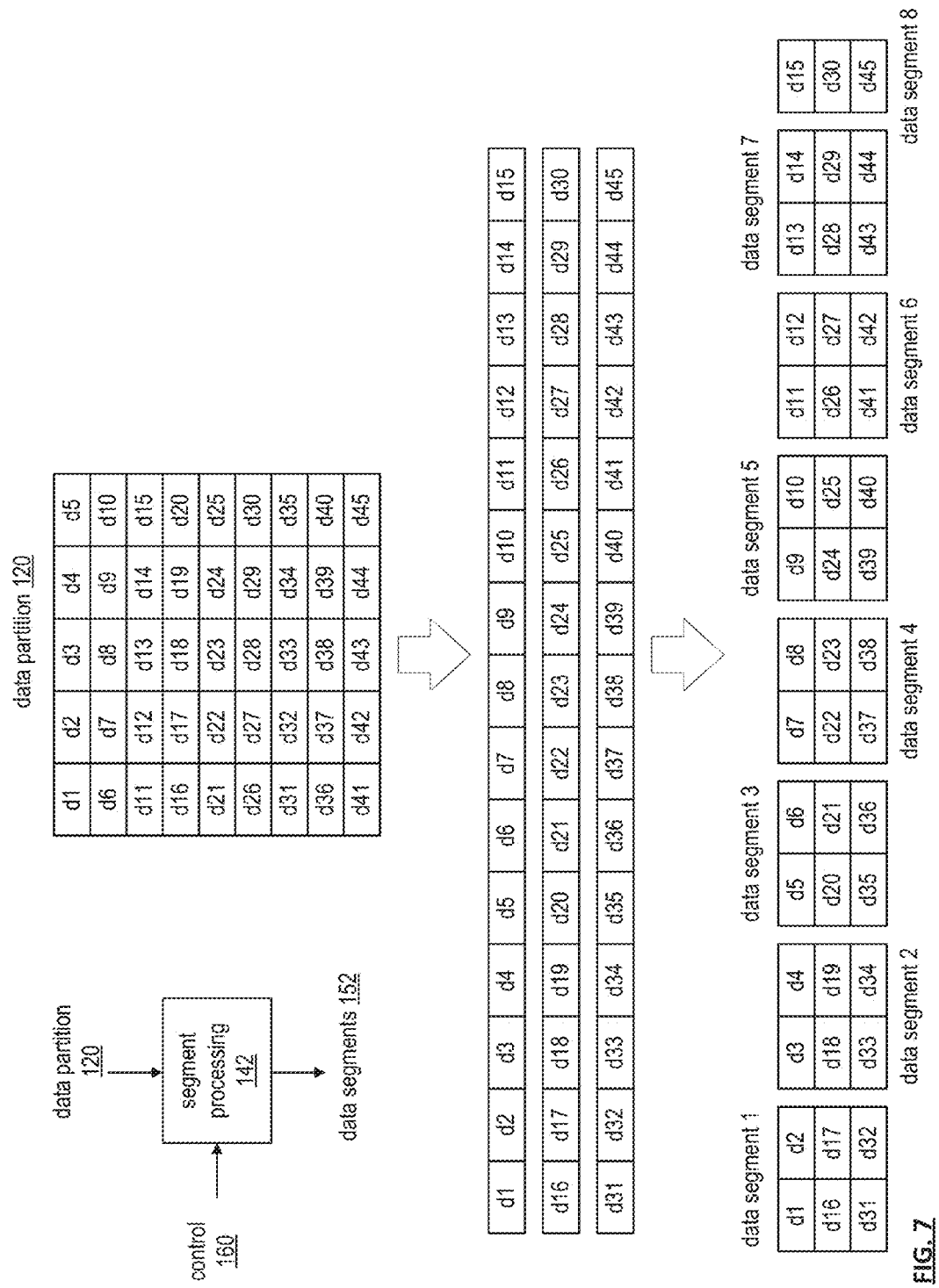
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
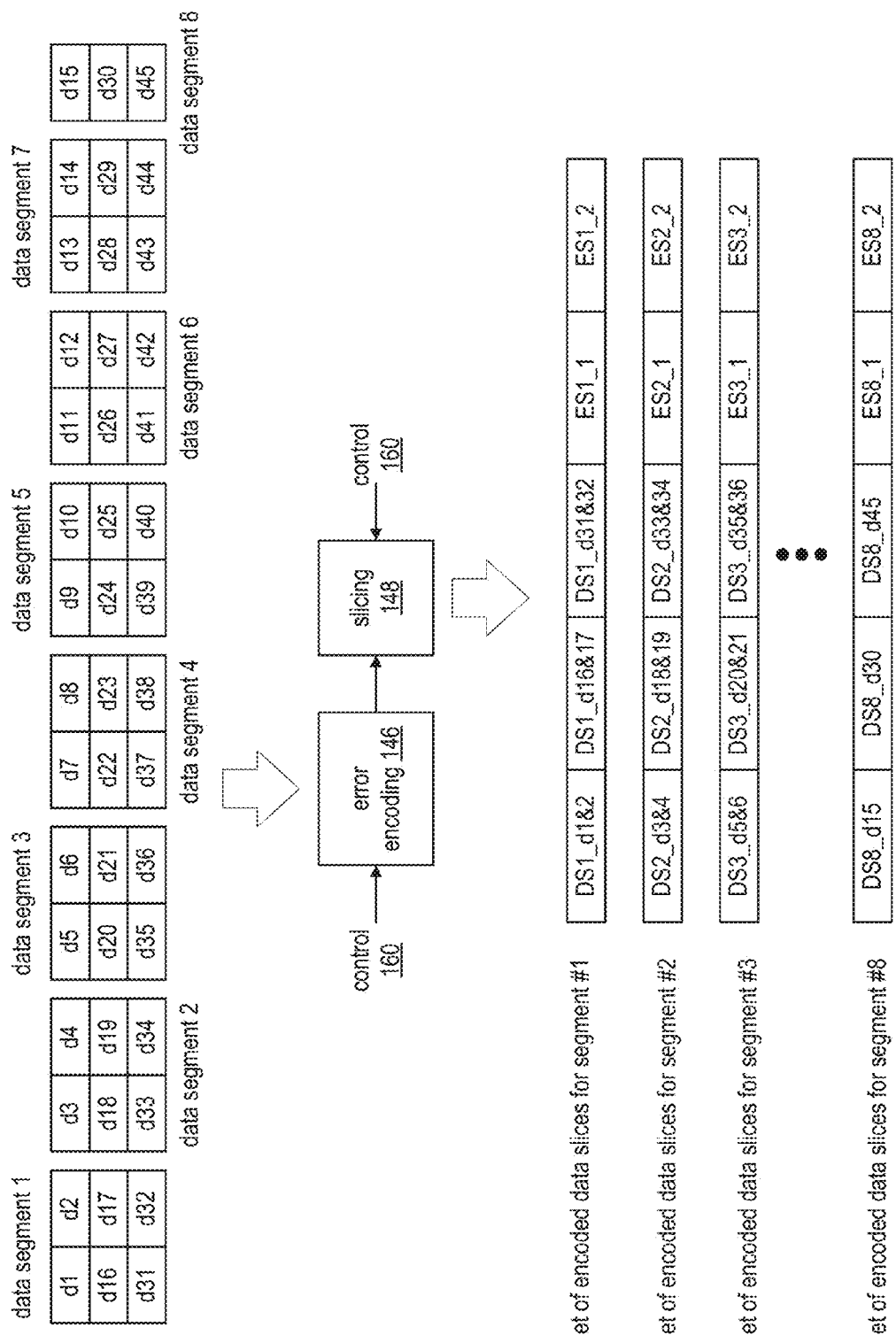
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first—third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
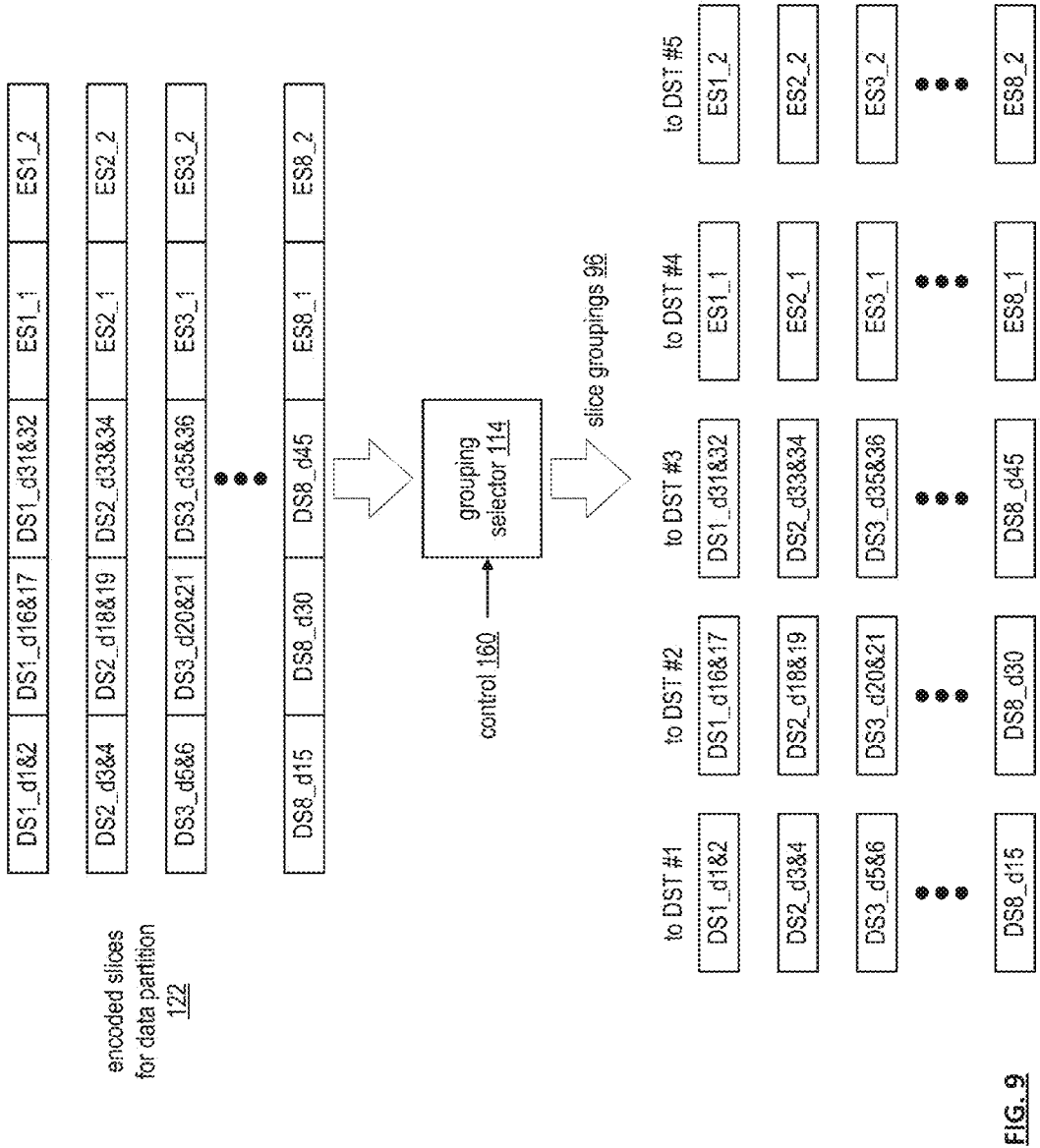
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
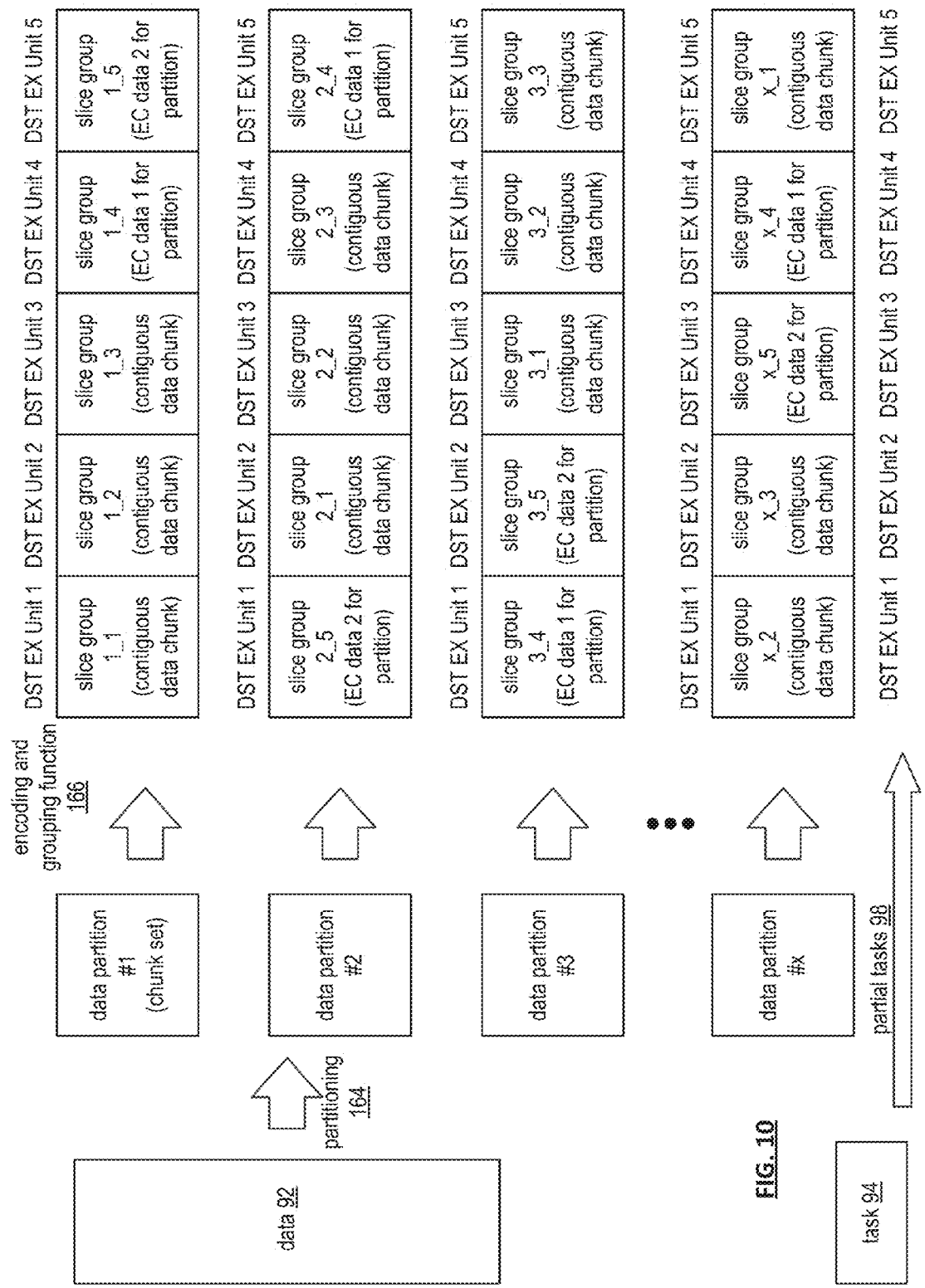
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
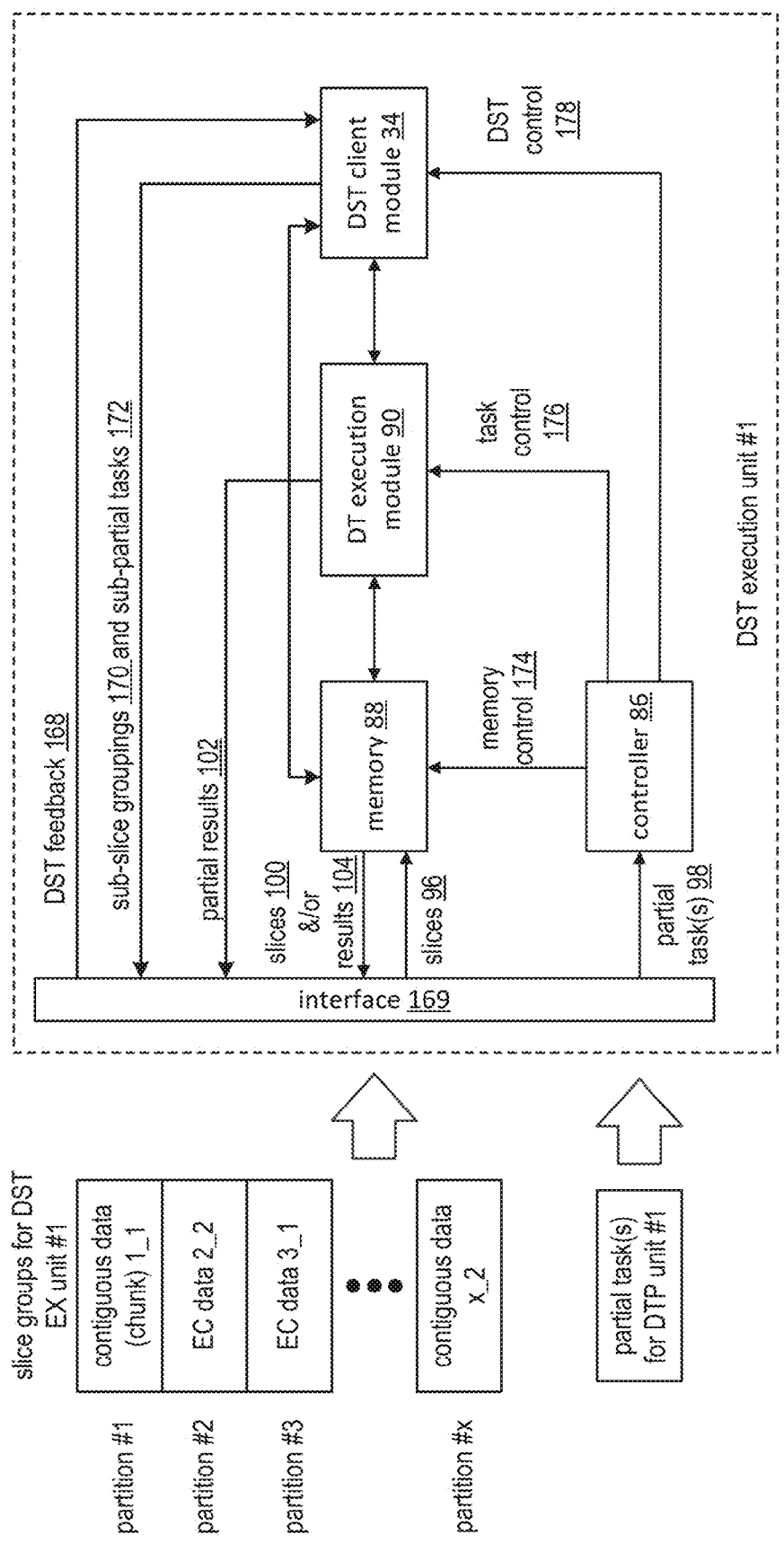
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
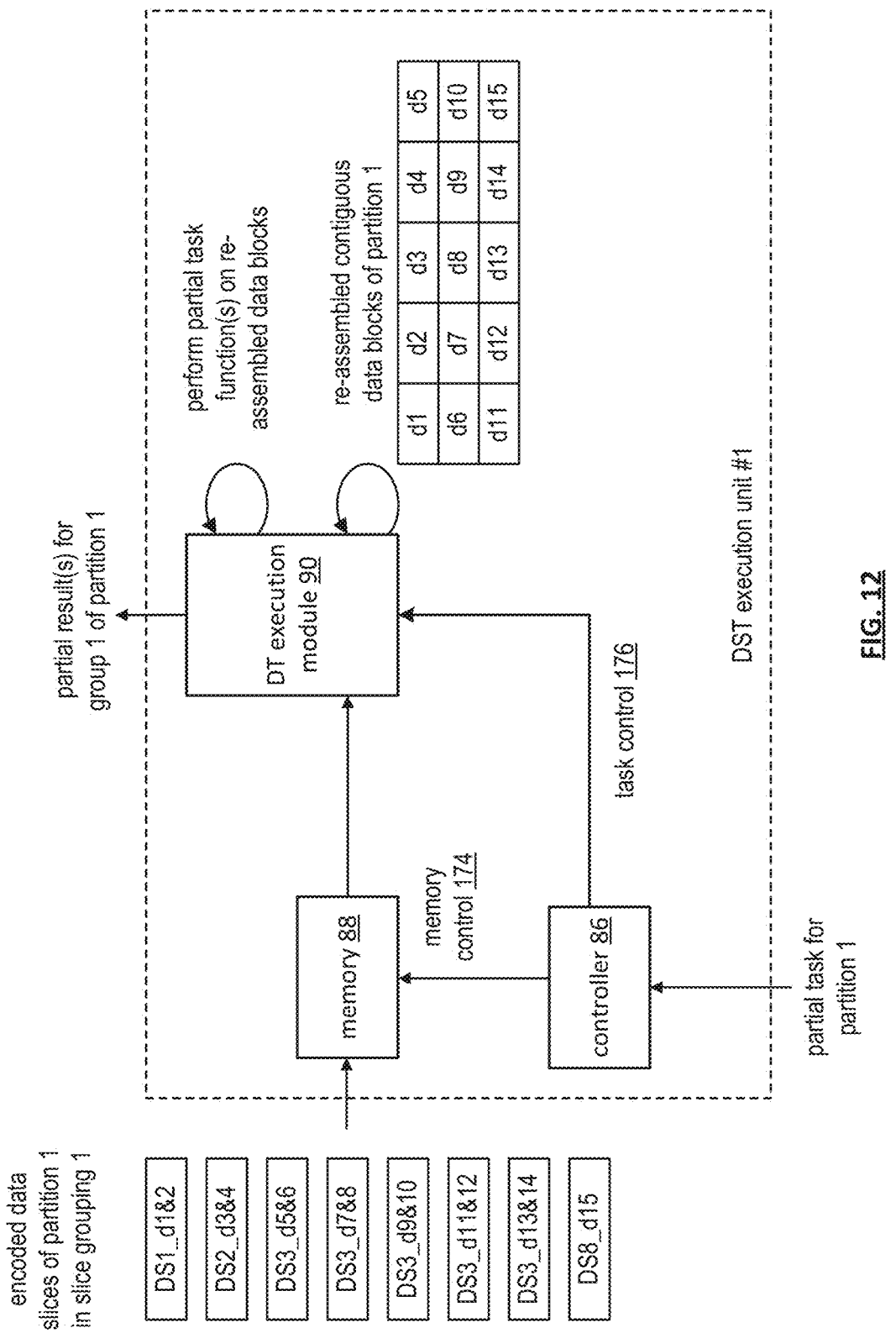
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
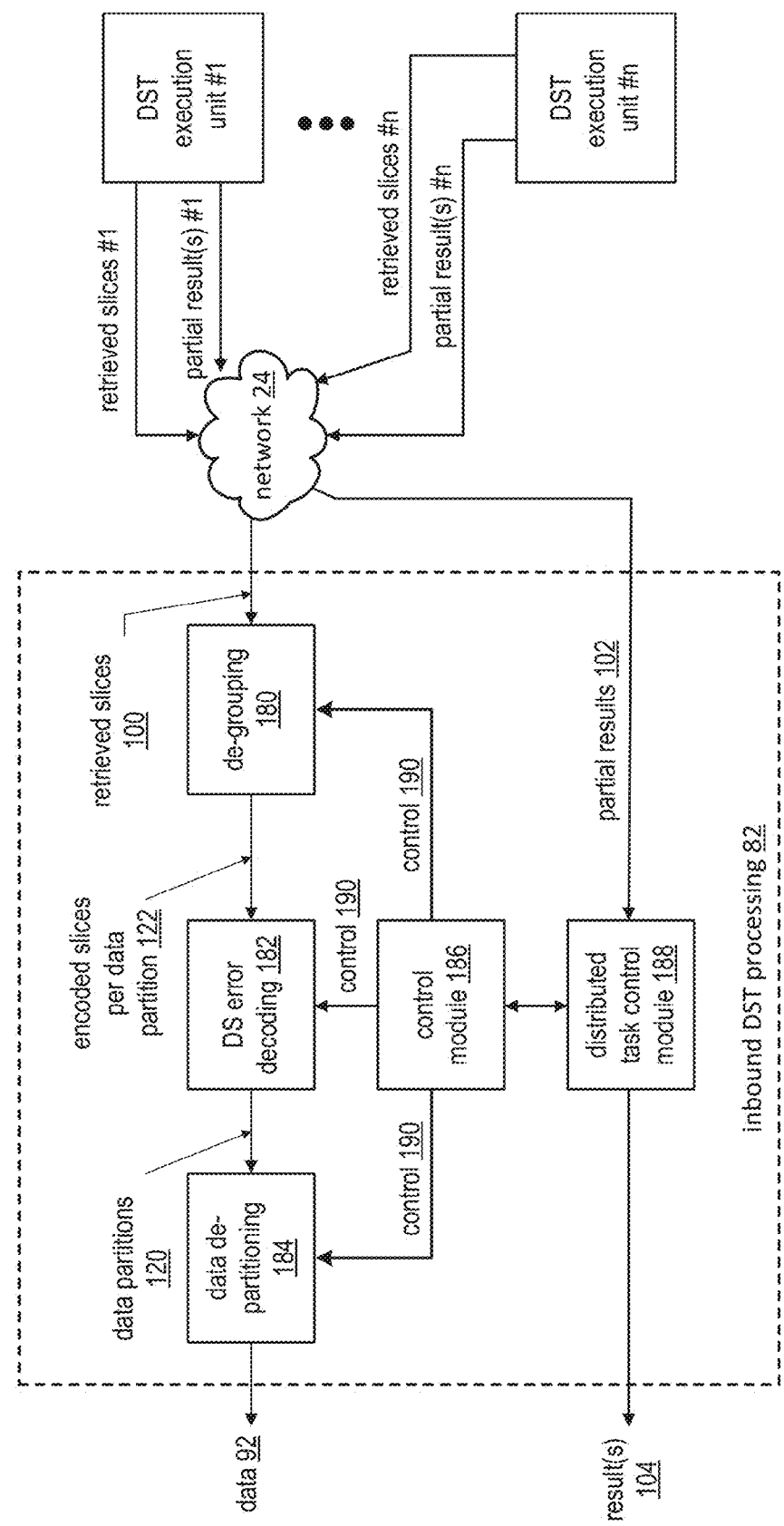
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
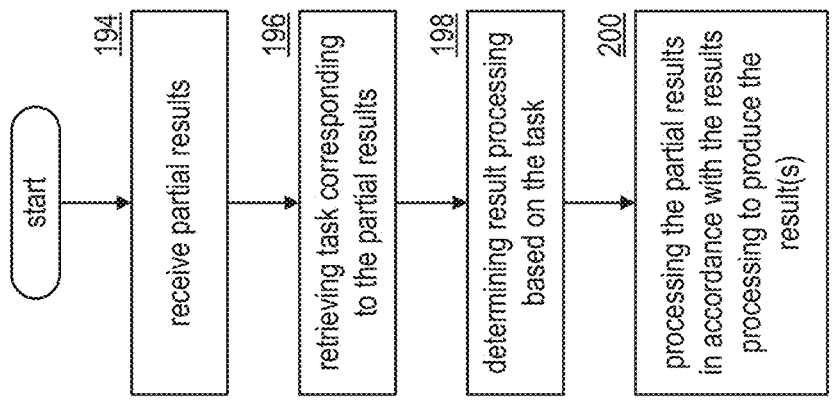
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
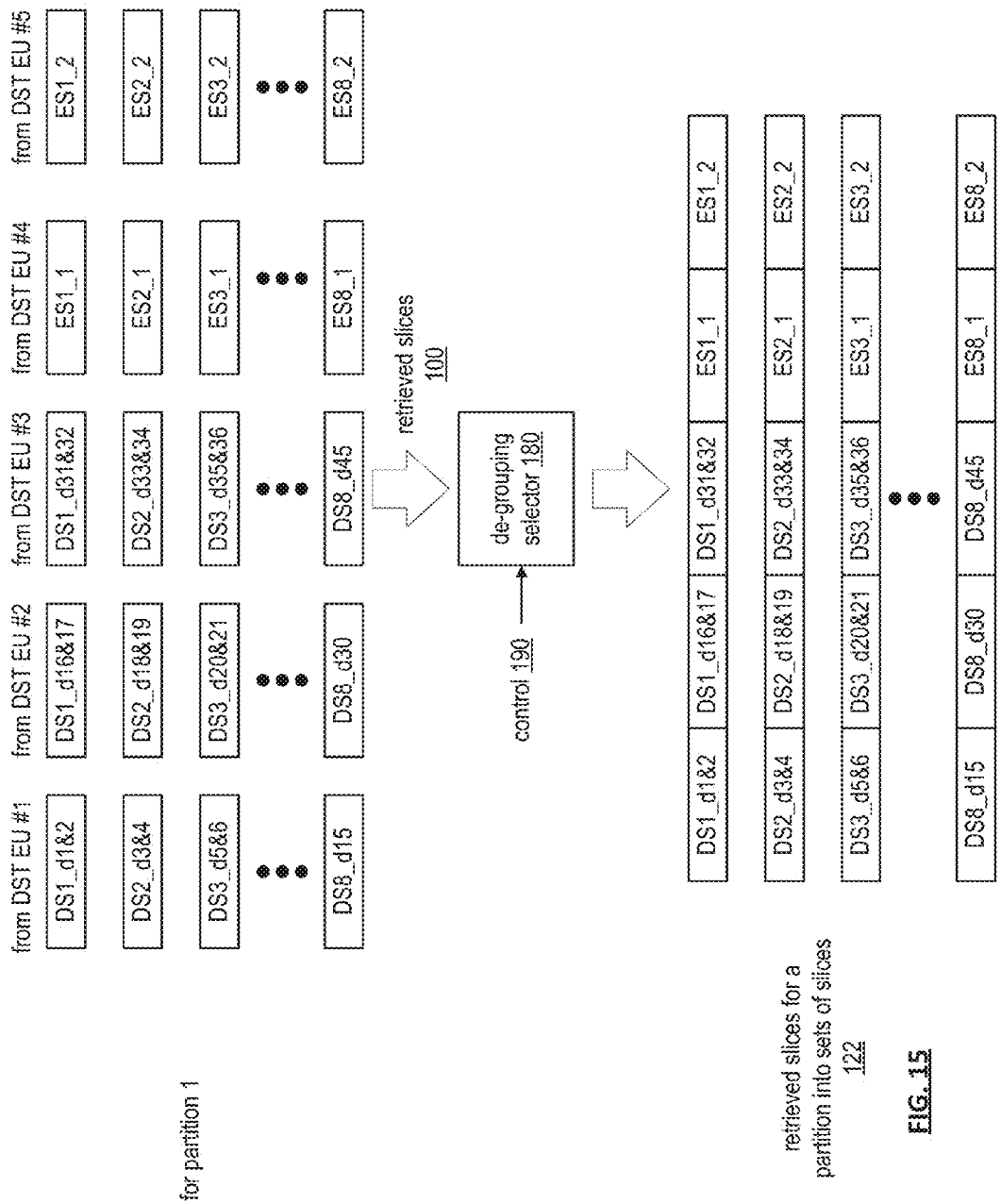
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
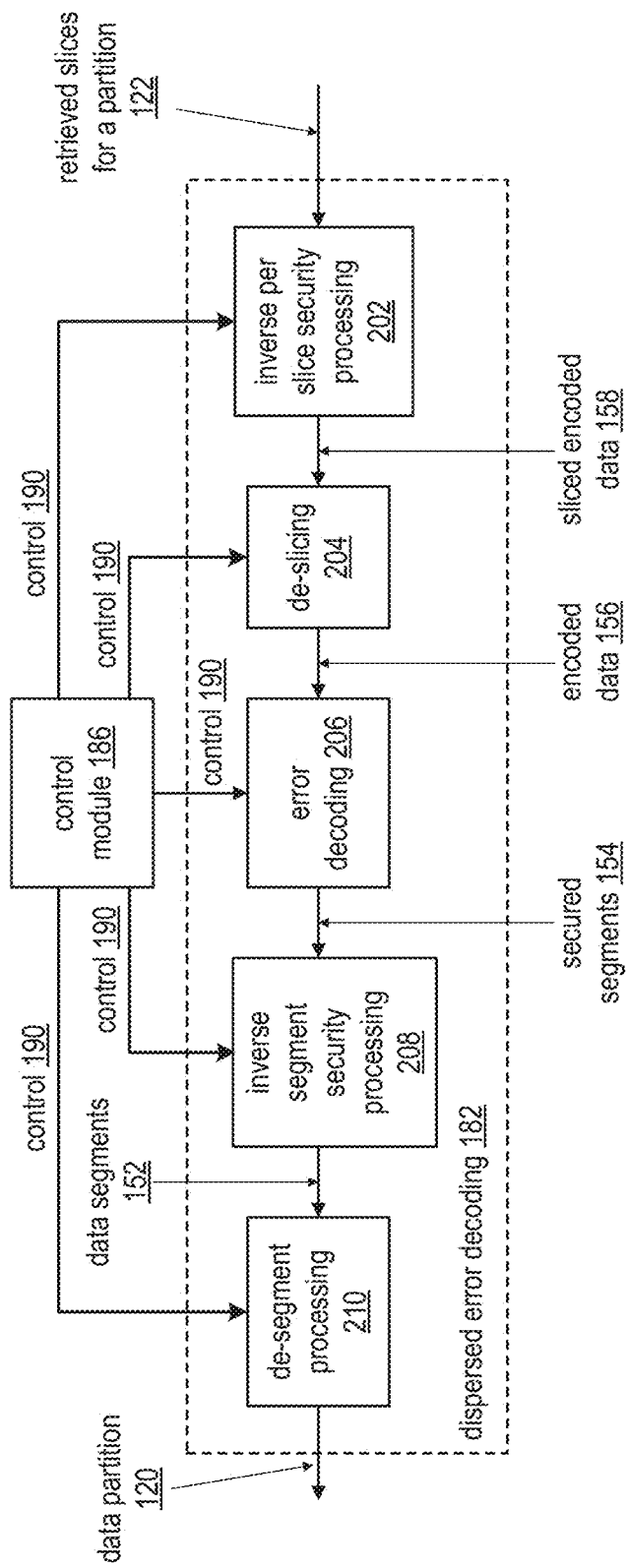
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
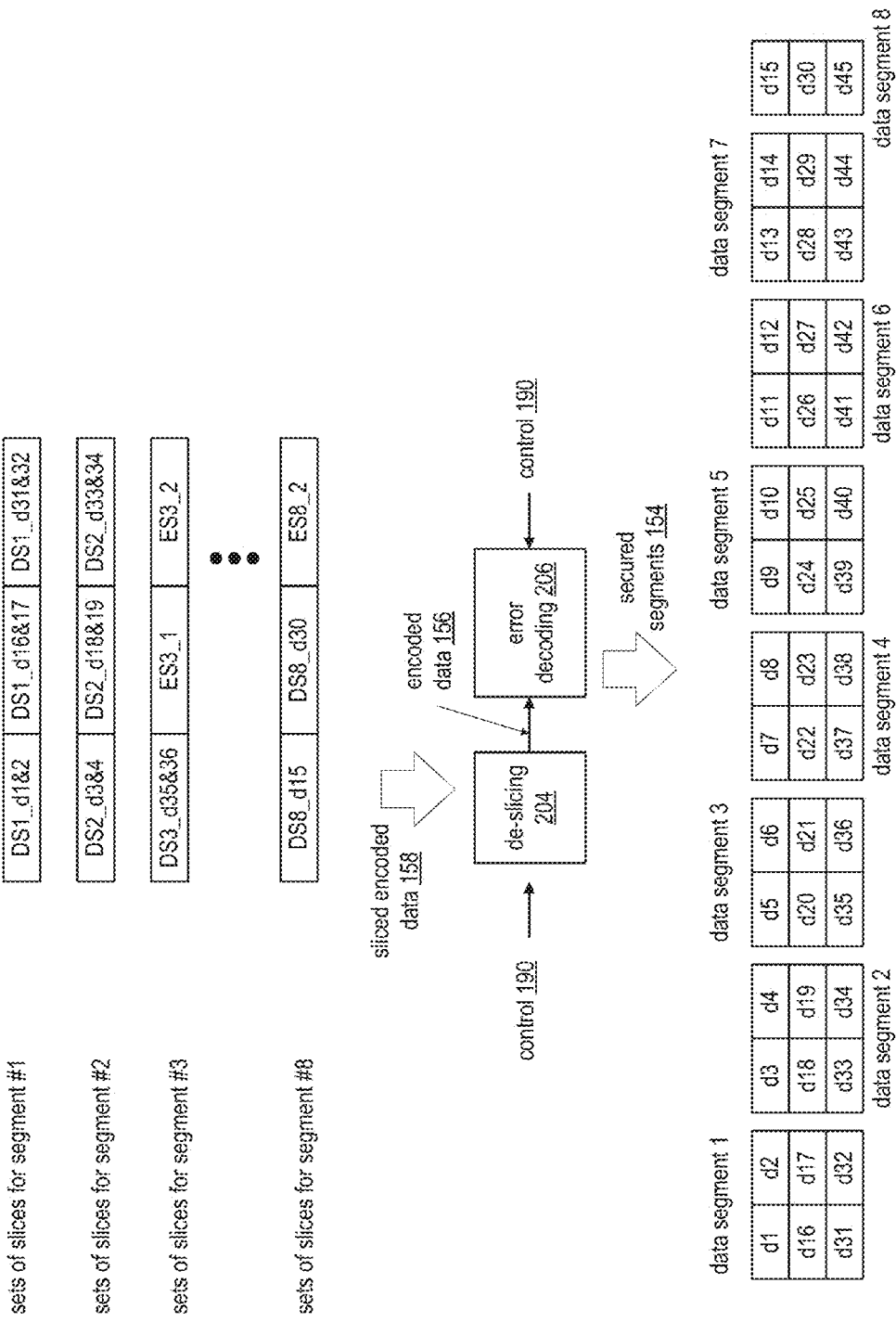
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
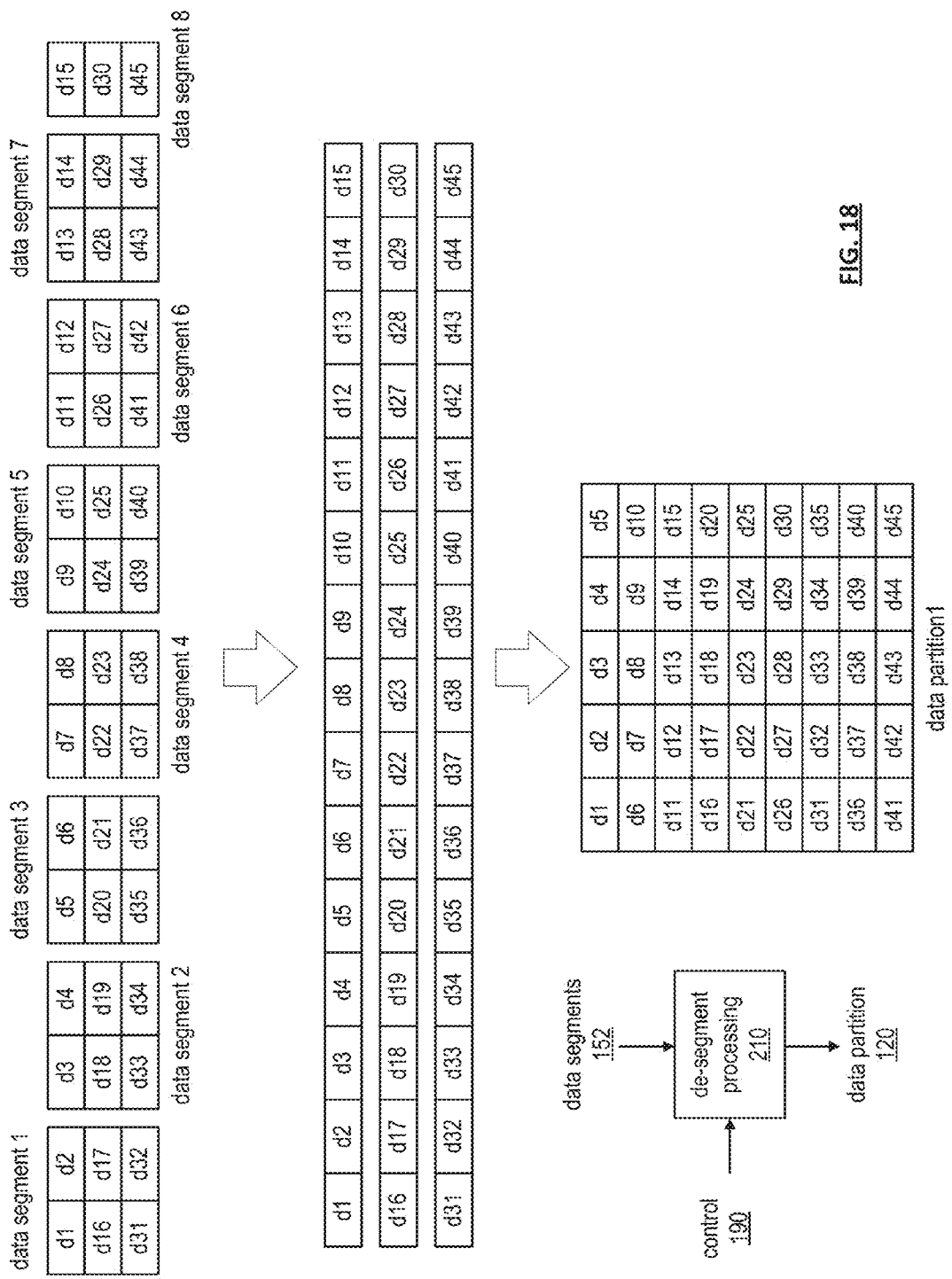
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
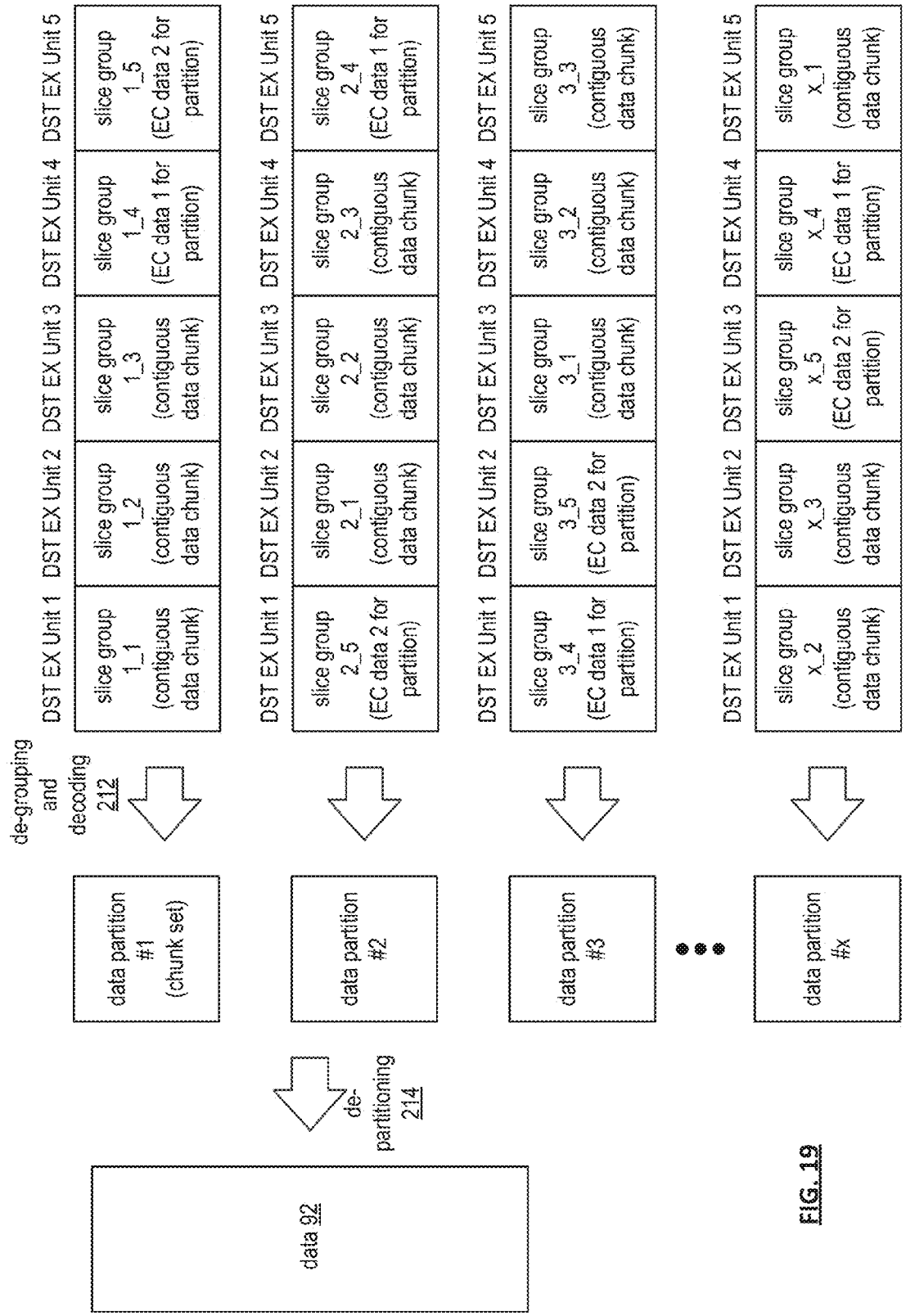
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
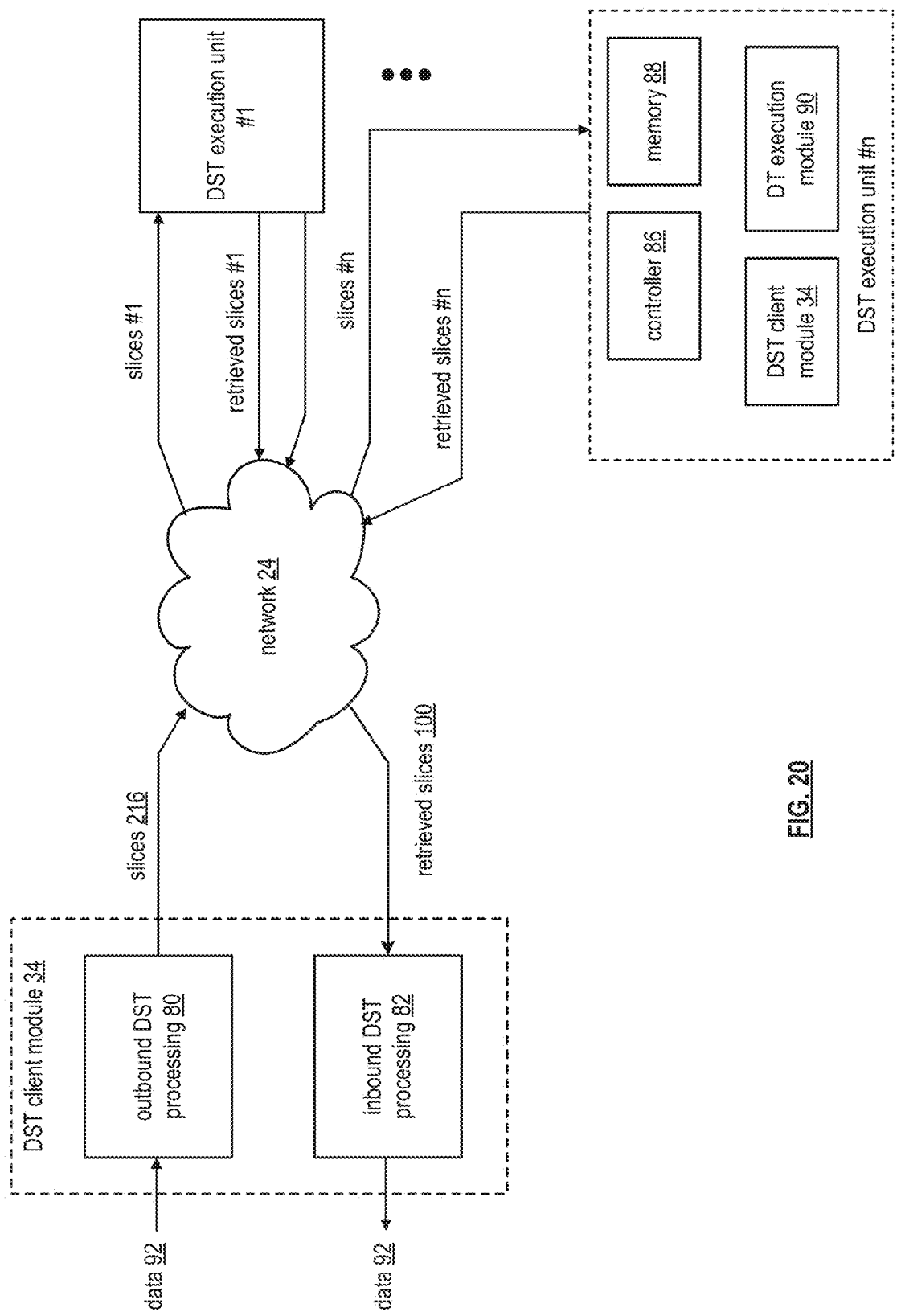
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
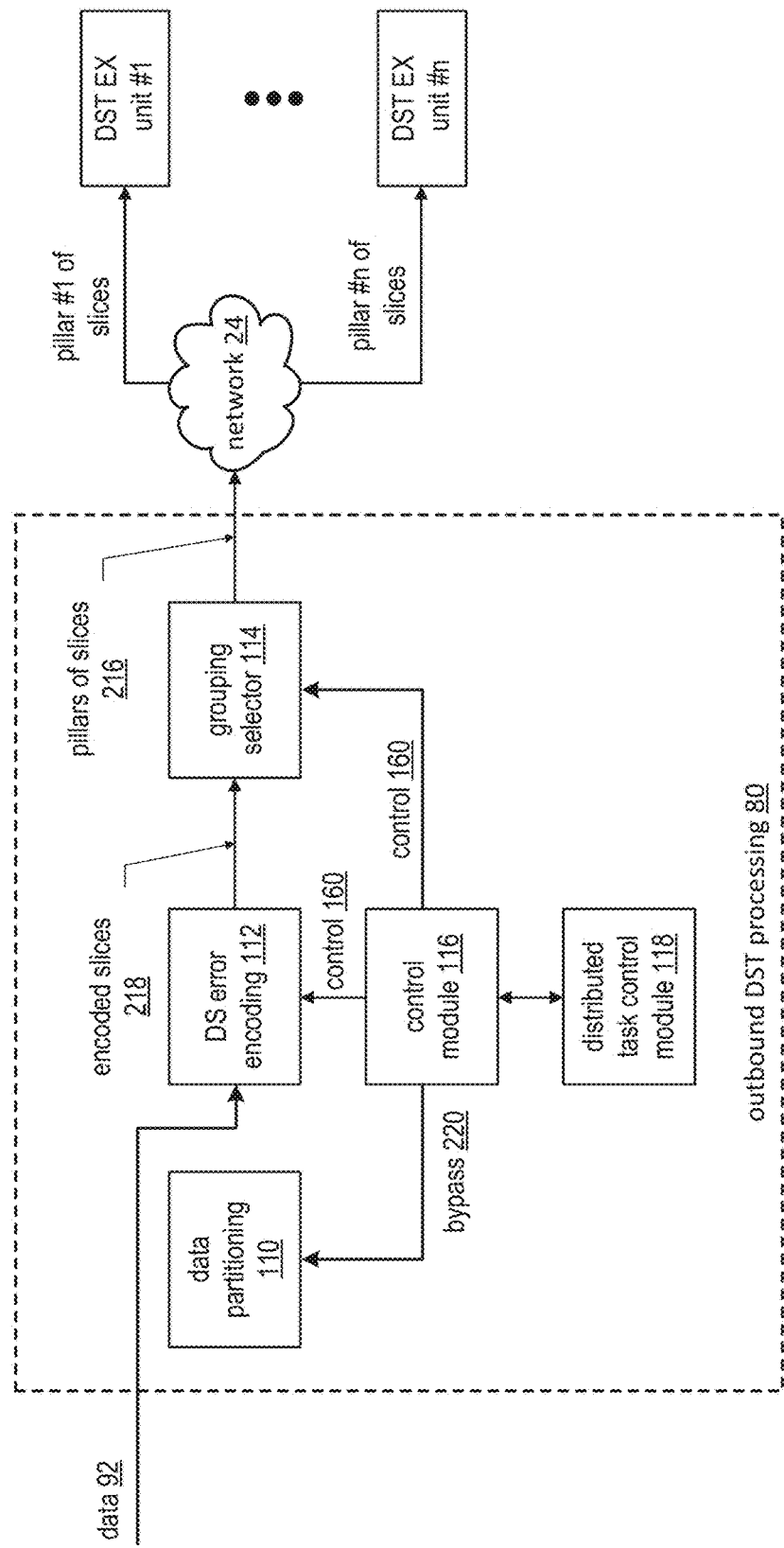
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.). The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
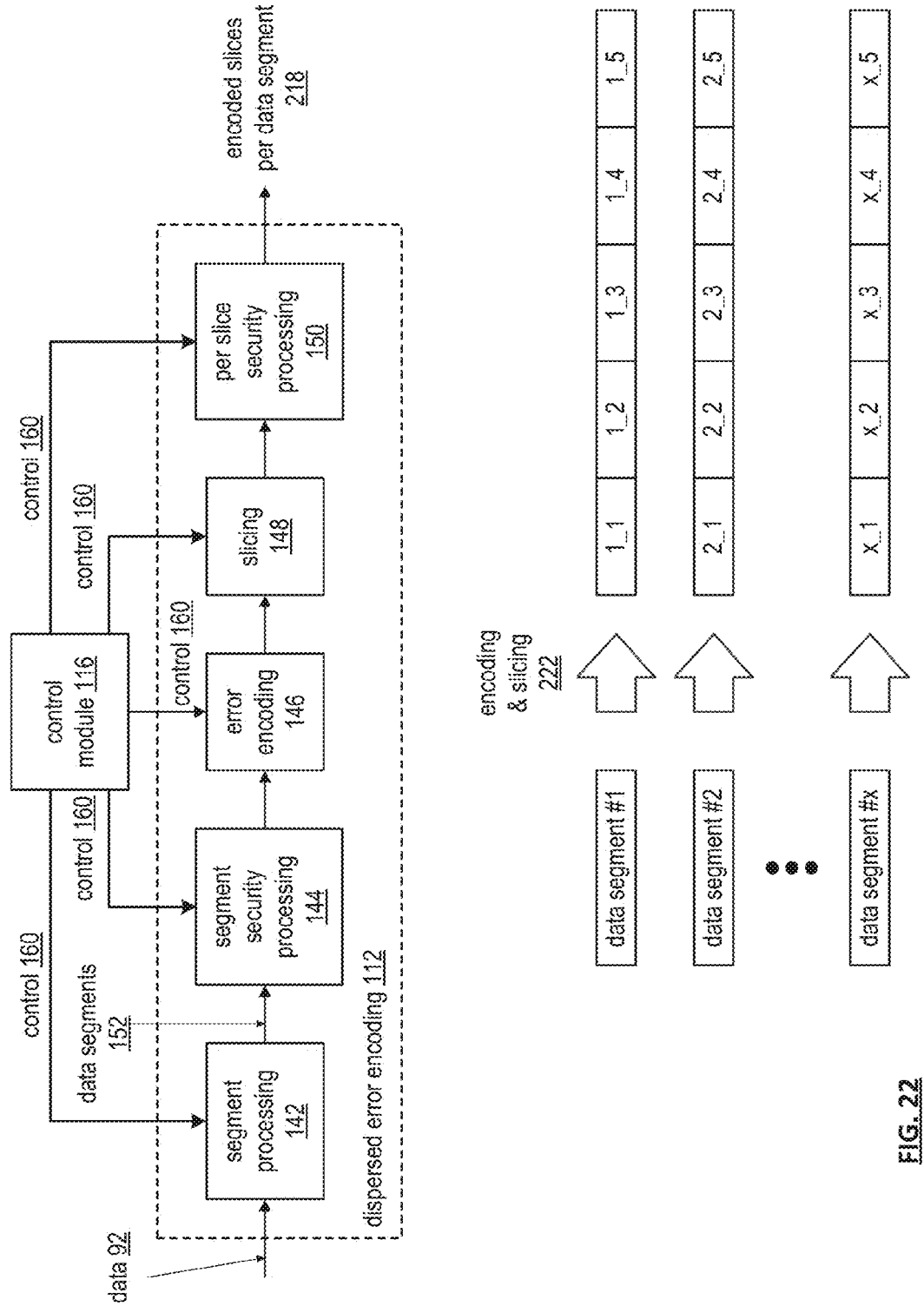
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
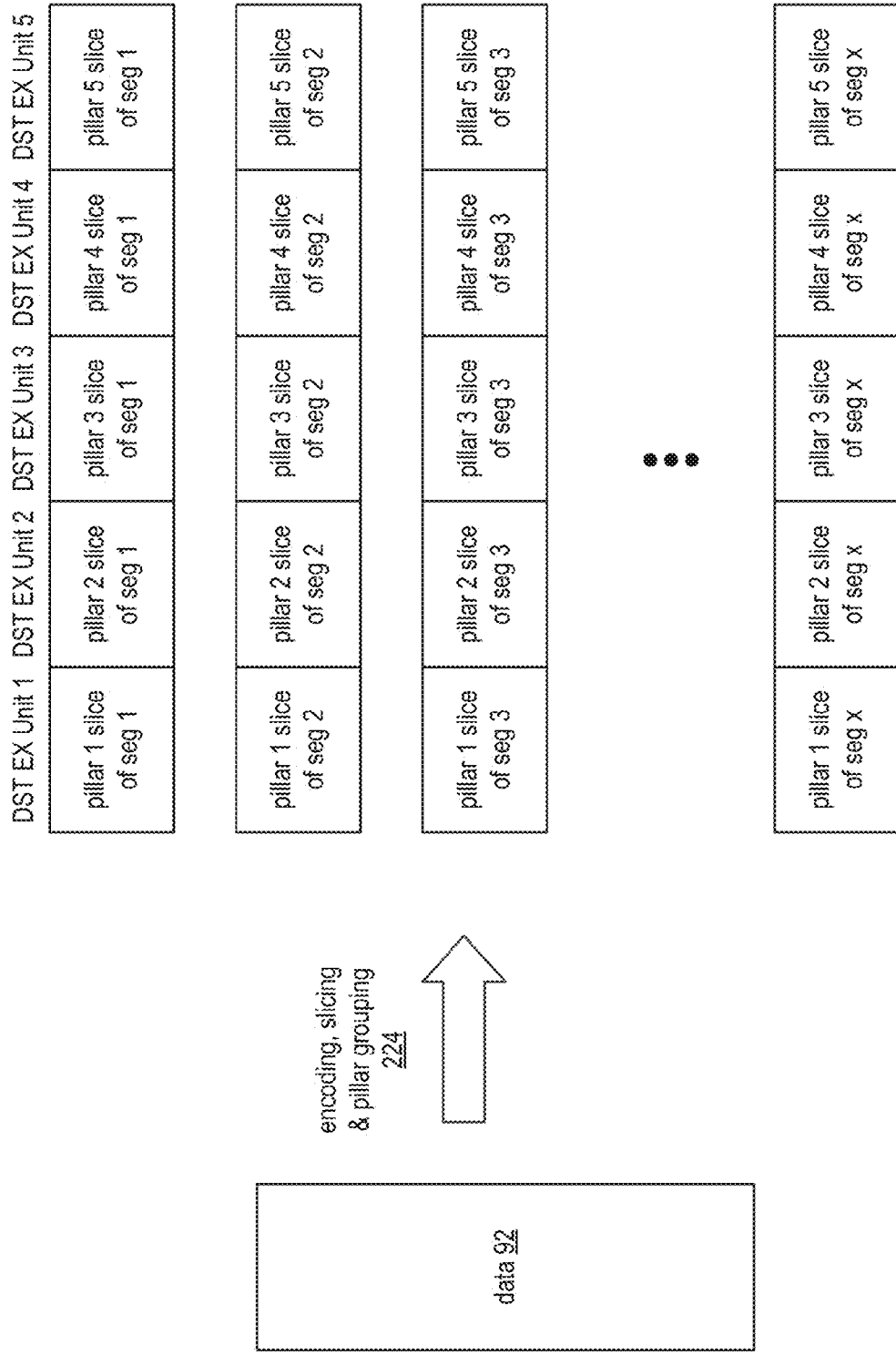
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

Figure 24:
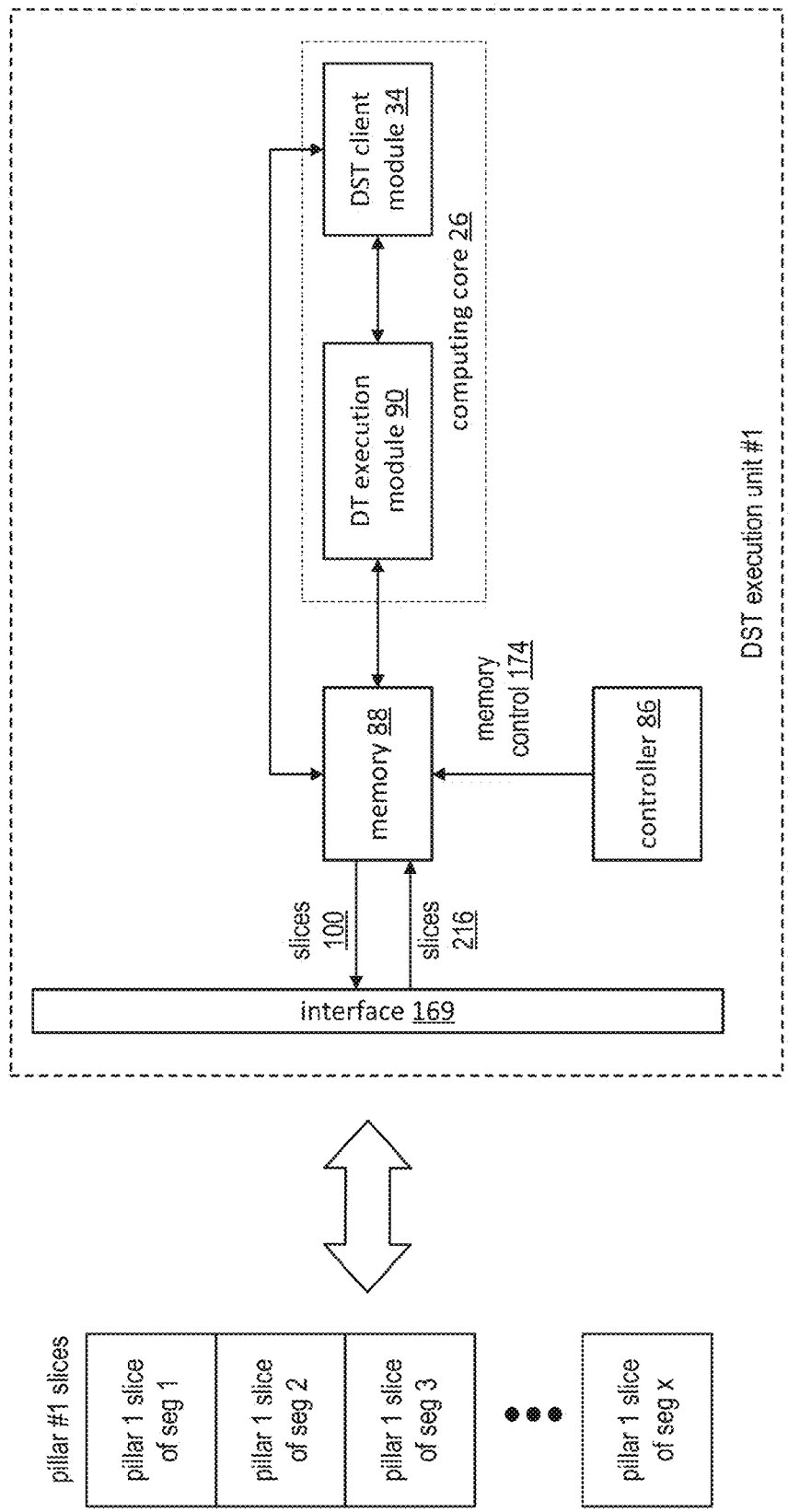
FIG. 24 is a diagram of an example of a storage operation of a DST execution unit in accordance with the present invention.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
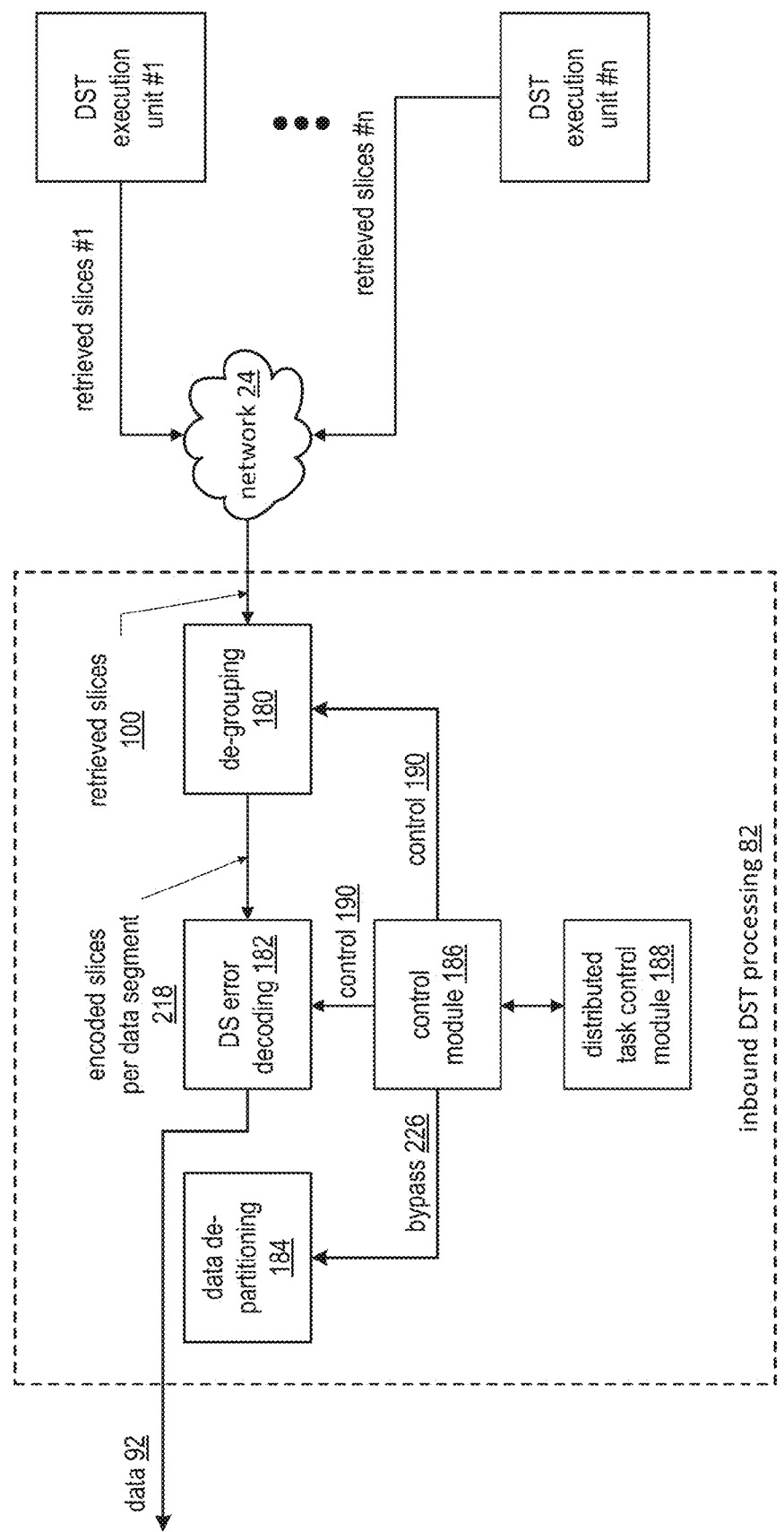
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
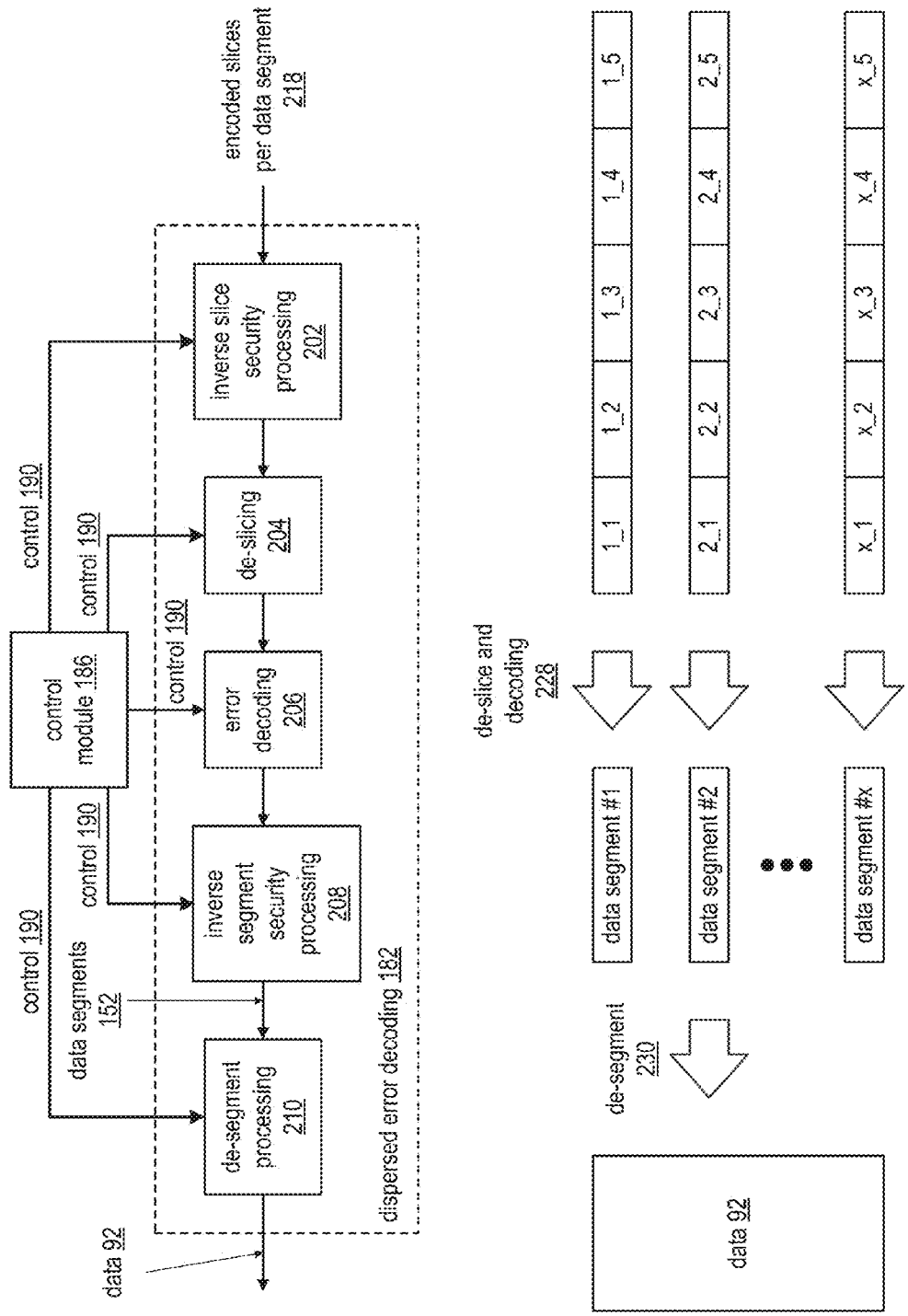
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
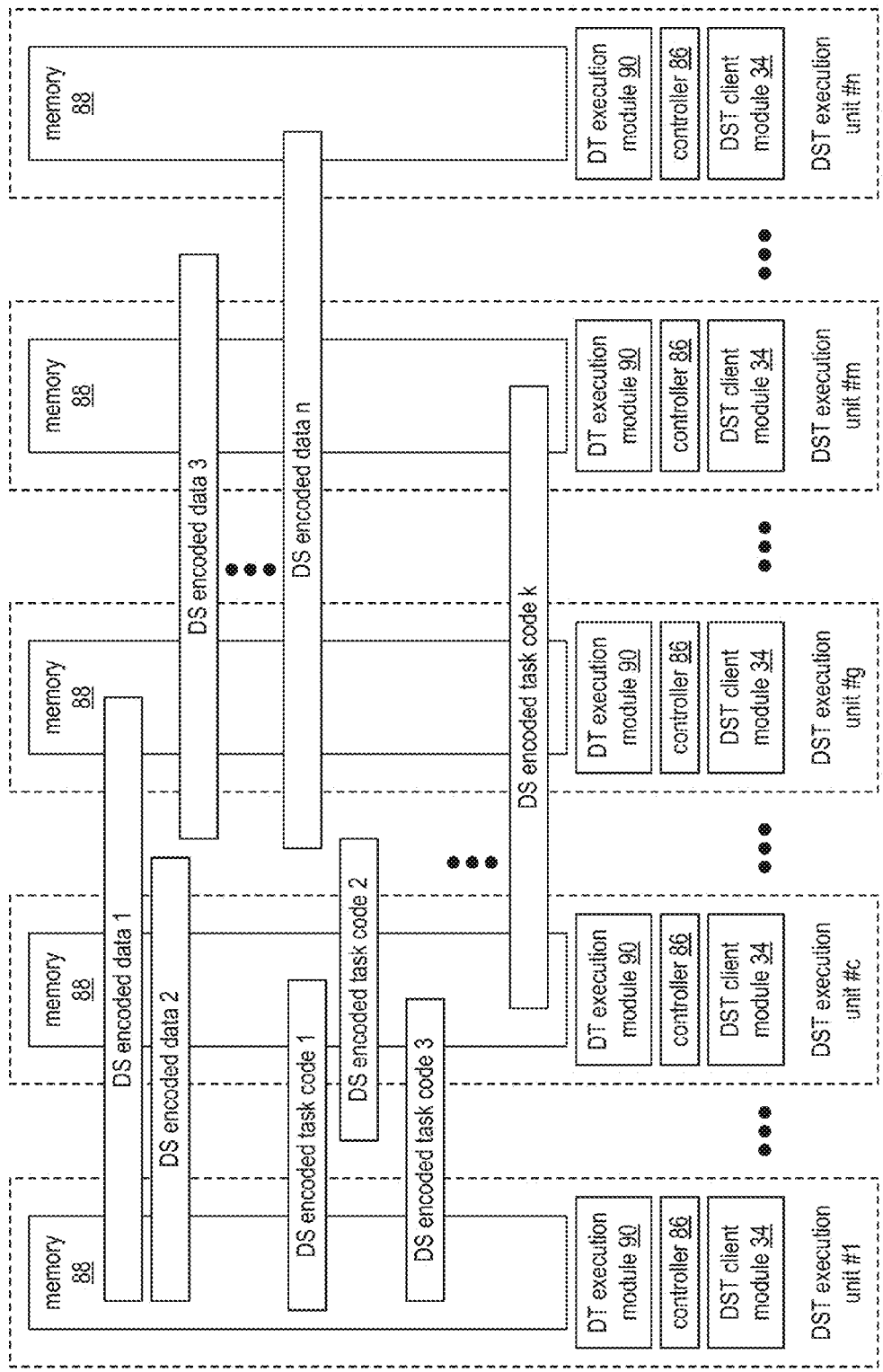
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
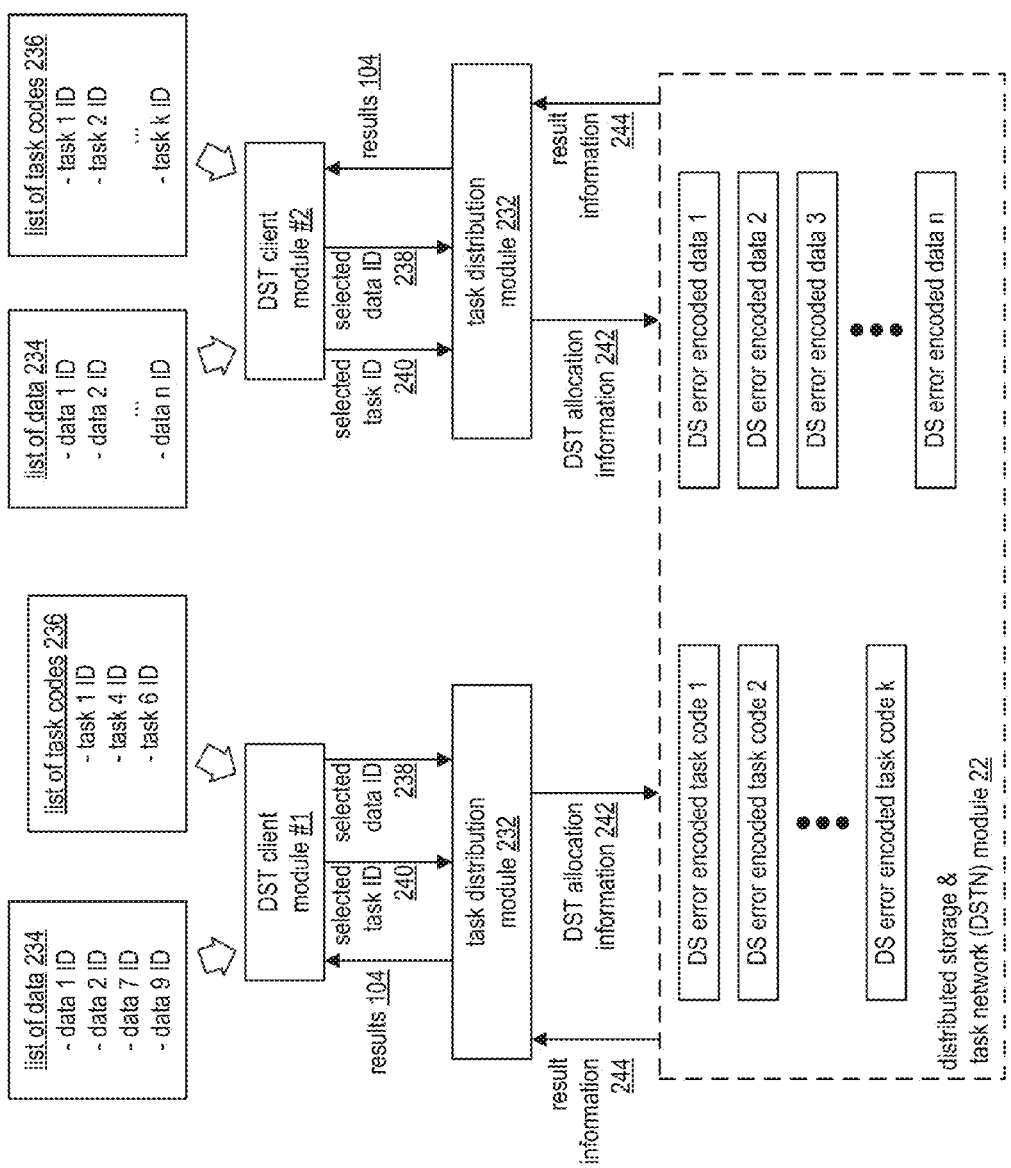
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
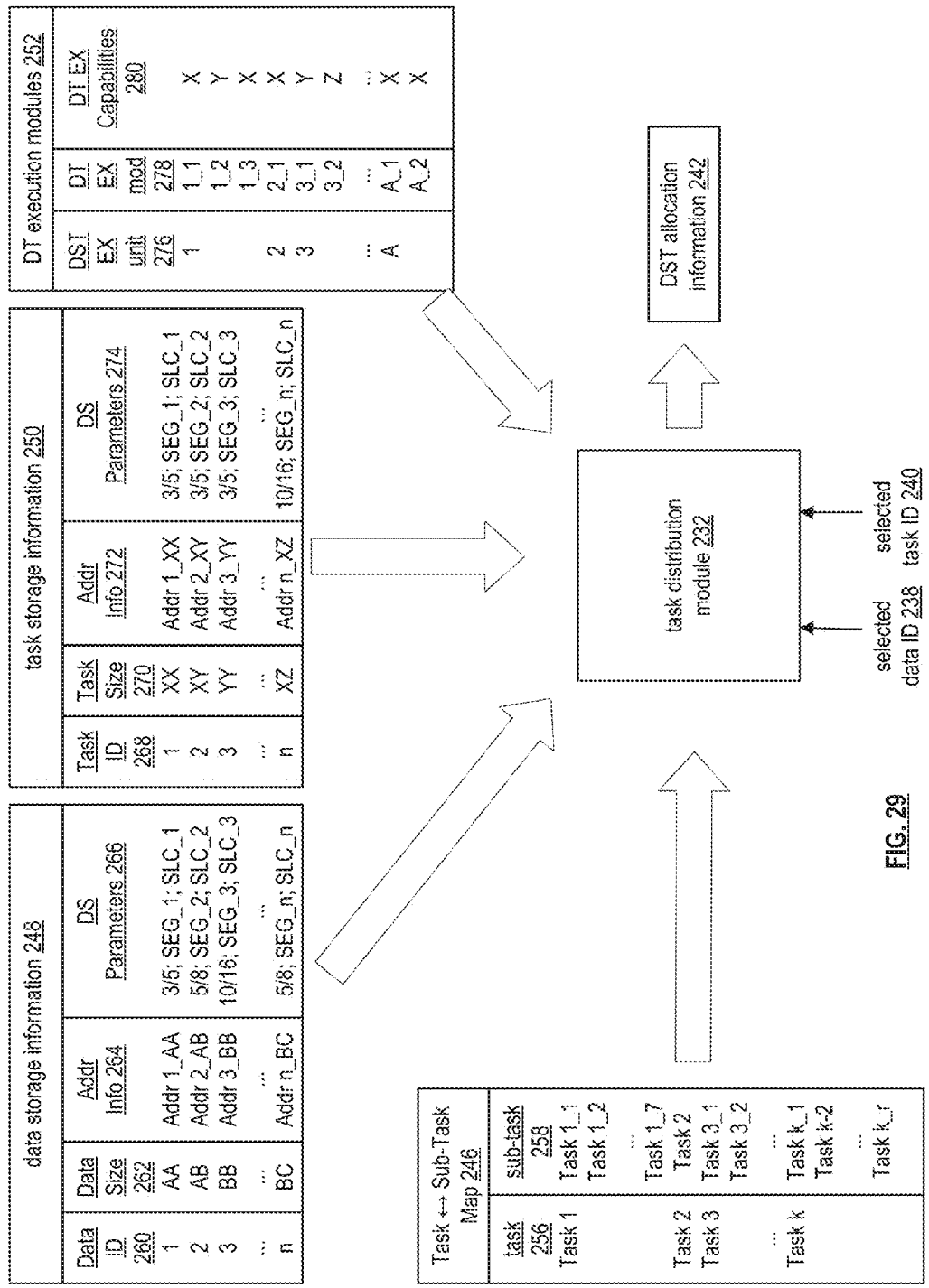
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task⇔sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task⇔sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task⇔sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
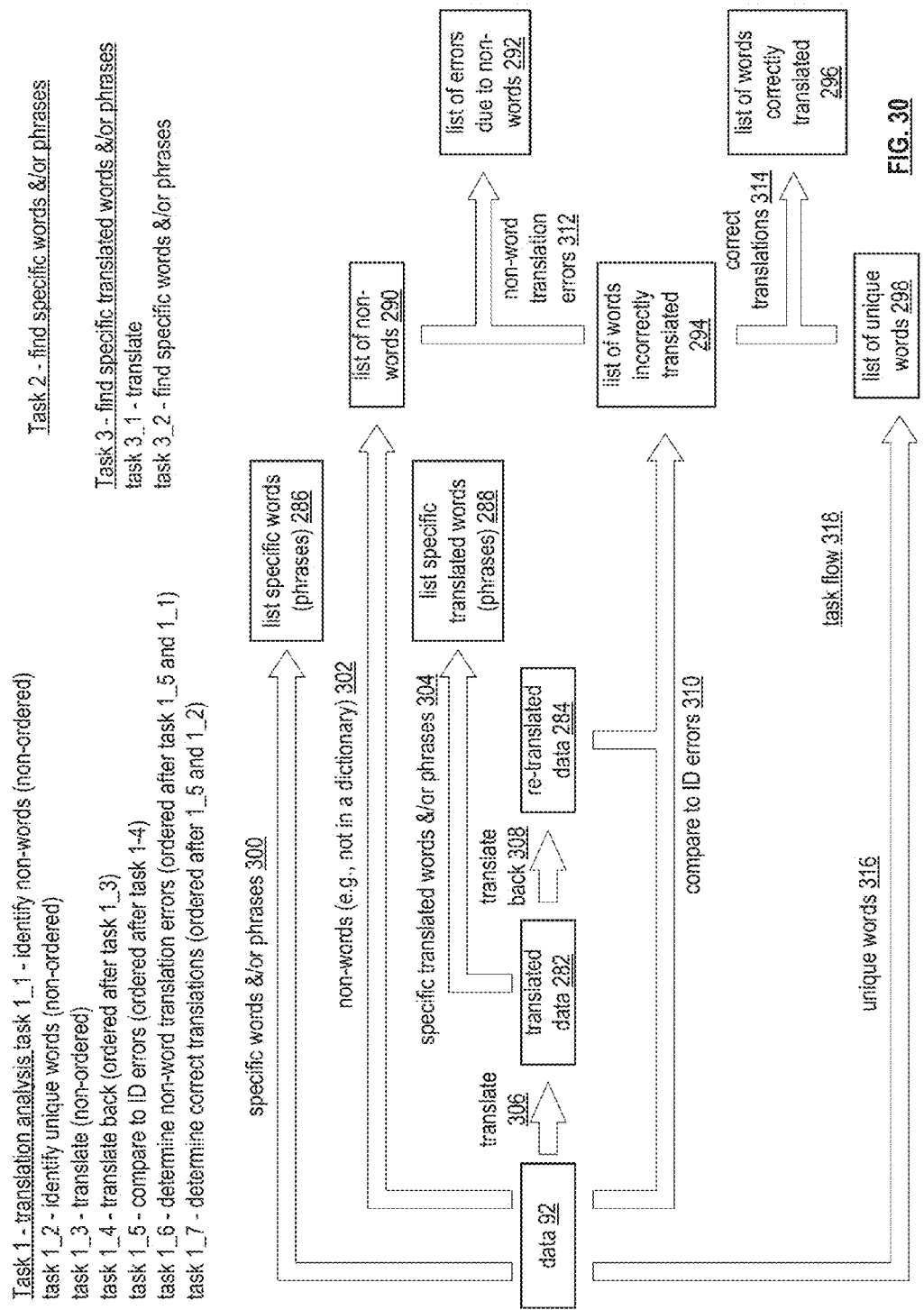
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
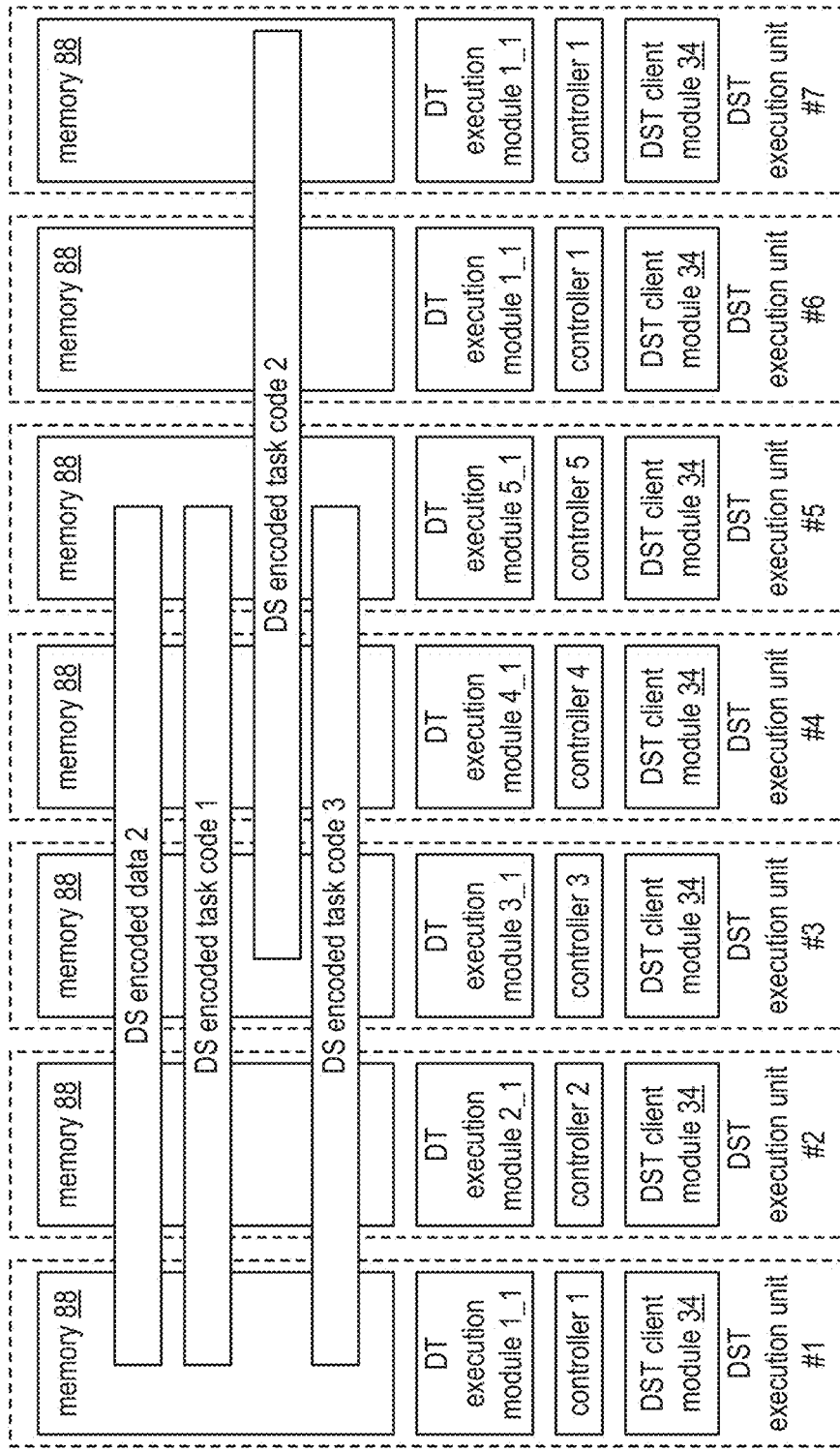
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

Figure 33:
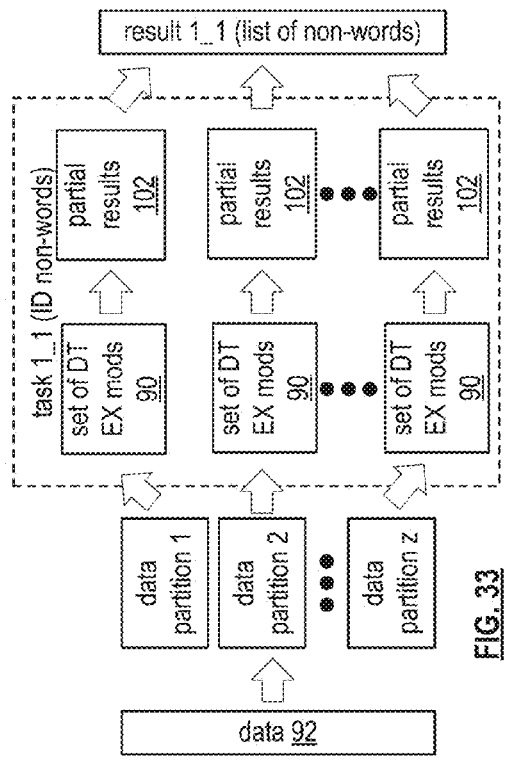

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

Figure 34:
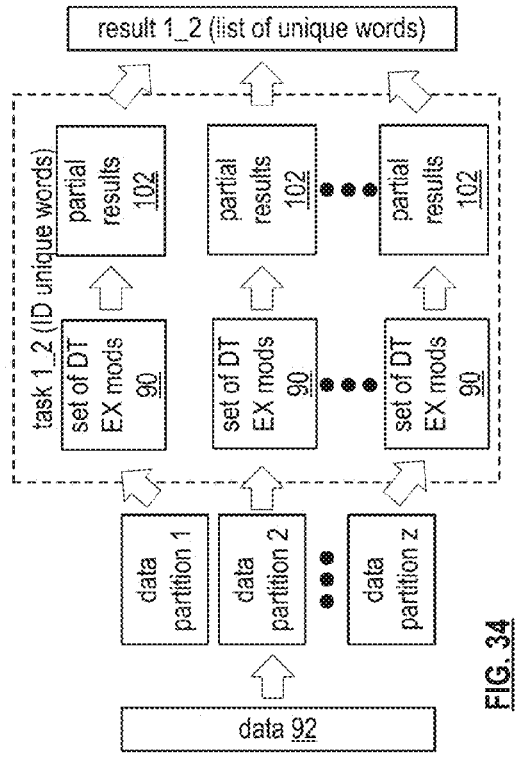

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

Figure 35:
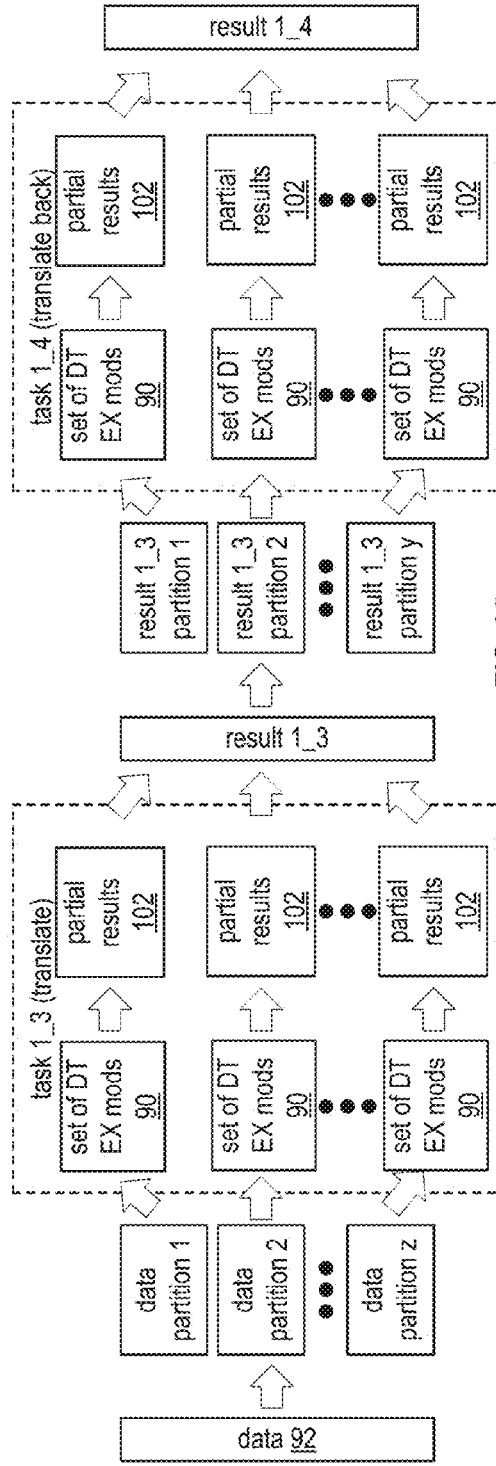

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3)

into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
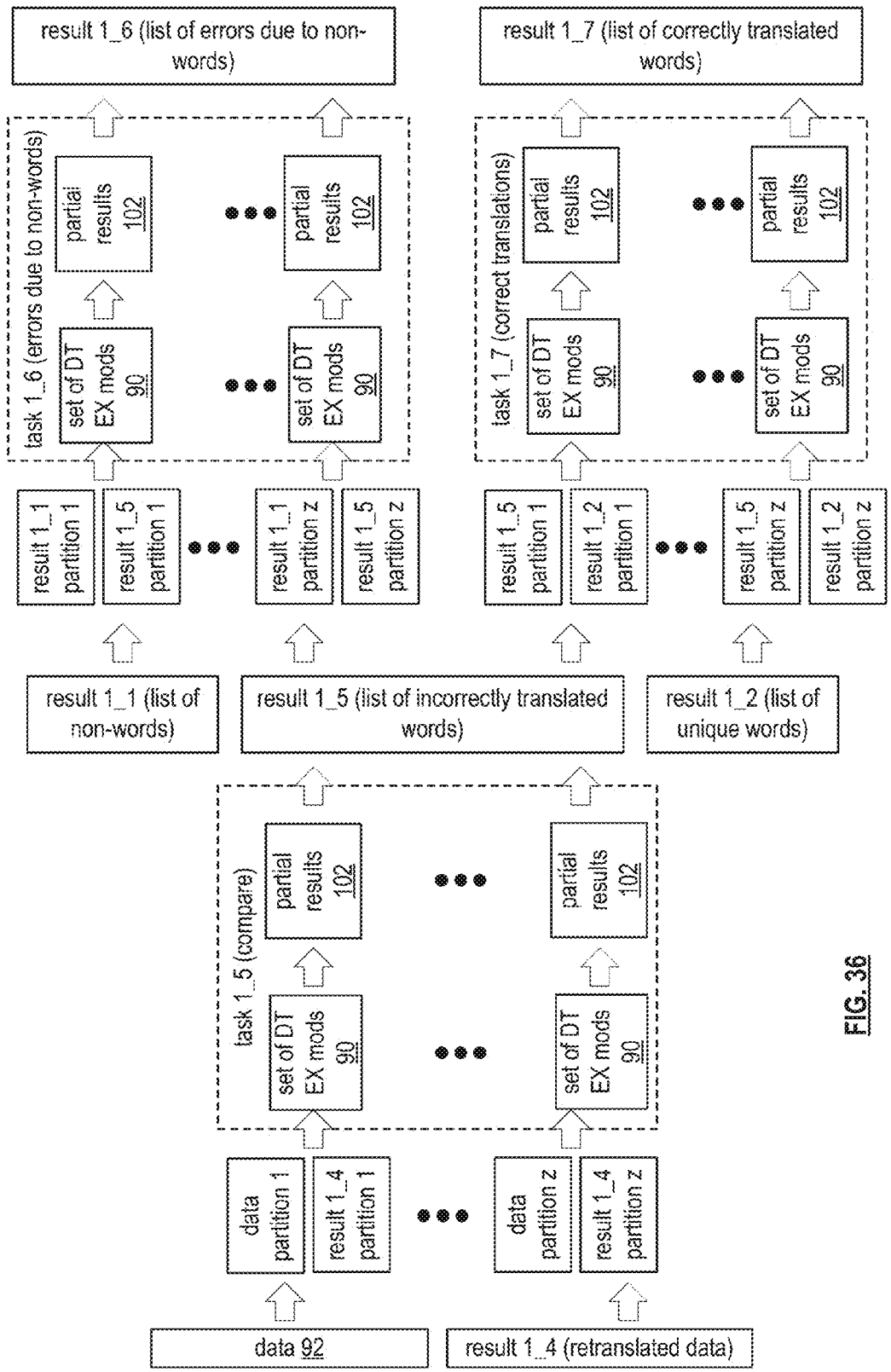

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
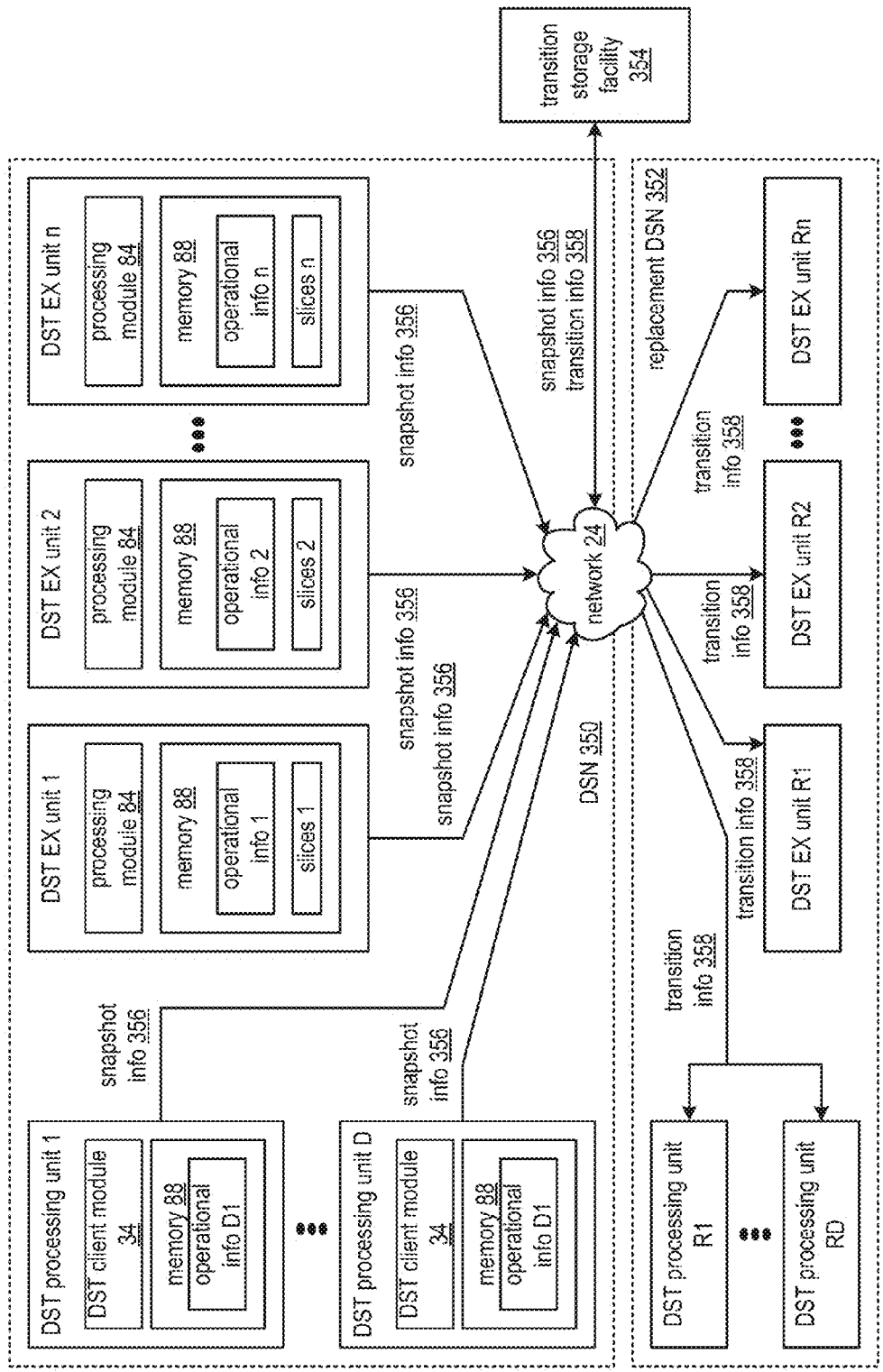
FIG. 40A is a schematic block diagram of an embodiment of a dispersed storage network (DSN) in accordance with the present invention.

FIG. 40A is a schematic block diagram of an embodiment of a dispersed storage network (DSN) 350, a replacement DSN 352, and a transition storage facility 354. The DSN 350 includes a plurality of distributed storage and task (DST) processing units 1-D, at least one set of DST execution (EX) units 1-n, the network 24 of FIG. 1. The replacement DSN 352 includes a plurality of DST processing units R1 through RD and at least one set of DST execution units R1 through Rn. The transition storage facility 354 includes at least one of an external storage system, a local backup storage system, and yet another DSN. Each DST processing unit includes the DST client module 34 of FIG. 1 and the memory 88 of FIG. 3. Each DST execution unit includes the processing module 84 of FIG. 3 and the memory 88 of FIG. 3. The DST processing units may be implemented utilizing the DST processing unit 16 of FIG. 1. The DST execution units may be implemented utilizing the DST execution unit 36 of FIG. 1.

The DSN functions to transition a state of the DSN as the DSN stores data in the set of DST execution units 1-n. The state of the DSN includes one or more of a state of storage of temporary variables associated with processing of storage of data as operational information, a state of storage of encoded data slices, and a state of processes utilized to facilitate the storing of the data. A transition of the state may include one or more of completing a process or task associated with the storing of the data, ending usage of the DSN, and activating usage of the replacement DSN to continue to fulfill a need of the storing of the data.

In an example of operation of the transitioning of the state of the DSN, the transition storage facility 354 (e.g., or any other module associated with the DSN or the replacement DSN) determines to initiate capturing snapshot information from one or more units and/or modules of the DSN. The determining includes one or more of receiving a request, interpreting a DSN replacement schedule, detecting availability of the replacement DSN, interpreting an error message, detecting that a DSN system health level is less than a minimum health threshold level, and receiving a request. Having determined to initiate capturing snapshot information, the transition storage facility 354 issues snapshot scheduling information 356 to the one or more units and/or modules of the DSN. The issuing includes one or more of updating system registry information, publishing a message, issuing a schedule, issuing error messages, and issuing a request.

At least some of the units and/or modules of the DSN receiving the snapshot scheduling information 356 captures operational information and/or encoded data slices as snapshot information. For example, the processing module 84 of the DST execution unit 1 pauses operation of one or more processes, obtains the operational information from the memory 88 of the DST execution unit 1, retrieves encoded data slices from the memory 88 of the DST execution unit 1, generates the snapshot scheduling information 356 to include the obtained operational information and retrieved encoded data slices, and resumes operations. Having captured the snapshot scheduling information 356, the at least some of the units and/or modules of the DSN sends the snapshot information 356 to the transition storage facility 354 for temporary storage.

With the snapshot information 356 stored in the transition storage facility, the transition storage facility 354 selects a storage operations approach utilizing the temporarily stored snapshot information. The selecting includes one or more of detecting that the replacement DSN 352 is available, interpreting an error message, and receiving a request. The storage operations approach includes restarting state of the DSN at the point of the snapshot, rolling back contents of stored encoded data slices in the DSN to the time of the snapshot, utilizing the replacement DSN as a parallel storage mechanism, and decommissioning the DSN after transitioning the state and/or slices to the replacement DSN.

Having selected the storage operation approach, the transition storage facility 354 initiates the selected storage operations approach. For example, the transition storage facility 354 sends the stored snapshot information 356 to the modules and units of the replacement DSN 352 for initiation of operations as transition information 358 when the DSN 350 is to be decommissioned and replaced by the replacement DSN 352. The modules and/or units of the replacement DSN 352 initiate operation with the operational parameters and/or encoded data slices of the transition information 358.

Figure 40B:
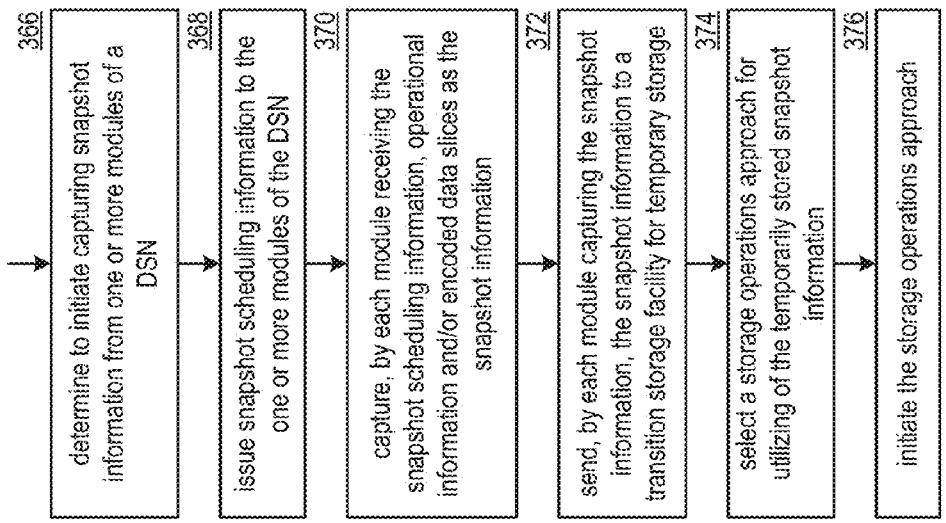
FIG. 40B is a flowchart illustrating an example of transitioning a state of a dispersed storage network in accordance with the present invention.

FIG. 40B is a flowchart illustrating an example of transitioning a state of a dispersed storage network. The method includes step 366 where a processing module (e.g., of a distributed storage and task (DST) client module) determines to initiate capturing snapshot information from one or more modules of a dispersed storage network (DSN). The determining includes at least one of receiving a request, interpreting a schedule, detecting availability of a replacement DSN, interpreting an error message, and detecting that a performance level of the DSN is less than a minimum performance threshold level.

The method continues at step 368 where the processing module issues snapshot scheduling information to the one or more modules of the DSN. The issuing includes generating the snapshot scheduling information such that each module shall initiate pausing operations at substantially a same time frame (e.g., allowing for time to propagate information), and sending the snapshot scheduling information to the one or more modules. The issuing further includes one or more of the processing module updating system registry information, publishing a message, issuing a schedule, issuing error messages, and issuing a request.

The method continues at step 370 where each module receiving the snapshot scheduling information captures operational information and/or encoded data slices as the snapshot information. For example, the module pauses operations of one or more processes associated with the module, obtains the operational information and/or encoded data slices in accordance with the snapshot scheduling information, generates the snapshot information, and may resume operations in accordance with the snapshot scheduling information.

The method continues at step 372 where each module capturing the snapshot information sends the snapshot information to a transition storage facility for temporary storage. For example, the module identifies the transition storage facility (e.g., in accordance with the snapshot scheduling information, by interpreting a query response, in accordance with a predetermination, based on identifying a replacement DSN), and outputs the snapshot information to the identified transition storage facility.

The method continues at step 374 where the processing module selects a storage operations approach for utilizing of the temporarily stored snapshot information. The selecting includes at least one of detecting that the replacement DSN is available, interpreting an error message, and receiving a request. The method continues at step 376 where the processing module initiates a storage operations approach. For example, the processing module sends the snapshot information as transition information to the replacement DSN when activating the replacement DSN. As another example, the processing module sends the snapshot information to modules of the DSN when restarting the DSN in accordance with a previous snapshot.

FIGS. 41A-B are schematic block diagrams of another embodiment of a dispersed storage network (DSN) that includes a set of distributed storage and task (DST) execution (EX) units 1-5, the network 24 of FIG. 1, and the DST integrity processing unit 20 of FIG. 1. The set of DST execution units 1-5 includes a plurality of M sets of memories (e.g., memory sets), where each DST execution unit includes a corresponding memory of each set of the M sets of memories. For example, DST execution unit 2 includes memory 2-1 of the memory set 1, memory 2-2 of the memory set 2, memory 2-3 of the memory set 3 etc. Each DST execution unit may be implemented utilizing the DST execution unit 36 of FIG. 1. Alternatively, or in addition to, one or more DST execution units may provide functionality of the DST integrity processing unit 20 as described in greater detail below. Hereafter, each DST execution unit may be interchangeably referred to as a storage unit and the set of DST execution units may be interchangeably referred to as a set of storage units.

The DSN functions to rebuild encoded data slices, where a data encoding entity (e.g., the DST processing unit 16 of FIG. 1) dispersed storage error encodes data utilizing dispersed storage error encoding parameters to produce a plurality of sets of encoded data slices and stores the plurality of sets of encoded data slices in one or more of the memory sets, and where each set of encoded data slices includes a total number of encoded data slices and a decode threshold number of encoded data slices of each set of encoded data slices that is required to recover the data. From time to time, the DST integrity processing unit 20 obtains slice availability information 1-5 from one or more memory sets with regards to one or more sets of encoded data slices and identifies a plurality of to-be rebuilt encoded data slices. The identifying includes one or more of interpreting list slice responses, interpreting read slice responses, receiving the slice availability information in response to a slice availability request, and interpreting an error message. For example, the DST integrity processing unit 20 identifies missing slices associated with a set of encoded data slices stored in the memory set 3, where the missing slices were stored in the memories 4-3 and 5-3 (e.g., memories 4-3 and 5-3 may be failing), and identifies further missing slices associated with another set of encoded data slices stored in the memory set 2, where the missing slices were stored in the memory 5-2 (e.g., memory 5-2 may be failing).

FIG. 41A illustrates steps of an example of operation of the rebuilding of encoded data slices, for each set of encoded data slices of a plurality of sets of encoded data slices that includes at least one of the plurality of to-be rebuilt encoded data slices, the DST integrity processing unit 20 determines a cumulative memory health for the memory devices of the storage units storing other encoded data slices of the respective set of encoded data slices. For instance, the DST integrity processing unit 20 determines the cumulative memory health for the memory devices 1-2 through memory 4-2 of the memory set 2 when the at least one of the plurality of to-be rebuilt encoded data slices is associated with the memory 5-2 of the memory set 2 and determines the cumulative memory health for the memory devices 1-3 through memory 3-3 of the memory set 3 when the another at least one of the plurality of to-be rebuilt encoded data slices is associated with the memories 4-3 and 5-3 of the memory set 3.

The determining the cumulative memory health includes, for each of the memory devices of the storage units storing the other encoded data slices, determining whether the respective memory device is in a soft failure mode (e.g., failing to maintain storage of previously stored encoded data slices) or a non-failure mode (e.g., no-no storage errors). The determining may be based on one or more of the slice availability information, interpreting a memory test result, interpreting a failure trend, and interpreting a read slice response. For example, the DST integrity processing unit 20 determines that the memory devices 1-2 through 4-2 are in the non-failure mode and the memory 5-2 is in the soft failure mode (e.g., some slice errors detected). As another example, the DST integrity processing unit 20 determines that the memory devices 1-3 through 3-3 are in the non-failure mode and the memories 4-3 and 5-3 are in the soft failure mode (e.g., more slice errors detected).

The determining the cumulative of memory health further includes, for each memory device in a soft failure mode, determining a soft failure mode level. For example, the DST integrity processing and 20 compares a number of error bits to a low threshold level and a high threshold level. For instance, the DST integrity processing unit 20 indicates a high soft failure mode level when the number of error bits is greater than 5 million error bits detected over one hour. In another instance, the DST integrity processing unit 20 indicates a low soft failure mode level when the number of error bits is less than 5 million error bits and greater than 10,000 error bits over one hour. Having determined the soft failure mode level, the DST integrity processing unit 20 calculates the cumulative memory health based on a ratio of memory devices in the soft failure mode to the memory devices in the non-failure mode and weights the ratio based on the soft failure modes levels. Having calculated the cumulative memory health, the DST integrity processing unit temporarily stores the cumulative memory health as memory failure rates for each of the memory sets 1-M.

Having determined the cumulative memory health, the DST integrity processing unit 20 determines a probability of data loss based on the cumulative memory health, respective dispersed storage error encoding parameters (e.g., may vary from sets of slices of one data object to another), and a number of encoded data slices requiring rebuilding in the respective set of encoded data slices. The determining the probability of data loss includes determining a number corresponding to the other encoded data slices (e.g., four other slices for the set of encoded data slices associated with the memory set 2, three other slices for the set of encoded data slice associated with the memory set 3), determining a total number of encoded data slices in the respective set of encoded data slices from the dispersed storage error encoding parameters (e.g., 5), determining a decode threshold number of encoded data slices of the respective set of encoded data slices from the dispersed storage error encoding parameters (e.g., 3), determining a current redundancy number of encoded data slices based on the total number minus the decode threshold number and minus the number of encoded data slices requiring rebuilding (e.g., 5−3−1=1 for the set of encoded data slices associated with the memory set 2; 5-3-2=0 for the set of encoded data slices associated with the memory set 3), and weighting the current redundancy number based on the cumulative memory health to produce the probability of data loss. For example, the DST integrity processing unit 20 calculates a higher probability of data loss for the set of encoded data slices associated with the memory set 2 as compared to the set of encoded data slice associated with the memory set 3 even though more slices are to be rebuilt (e.g., slices 4, 5), for the set of encoded data slice associated with the memory set 3, when the cumulative memory health of the memories 1-2 through 4-2 is less favorable than the cumulative memory health of the memories 1-3 through 3-3.

Having produced the probability of data loss, the DST integrity processing unit 20 prioritizes rebuilding of the plurality of to-be rebuilt encoded data slices based on the probability of data loss for each set of encoded data slices of the plurality of sets of encoded data slices. For example, the DST integrity processing unit 20 prioritizes the rebuilding of the to-be rebuilt encoded data slices associated with the memory of 5-2 ahead of the rebuilding of the to-be rebuilt encoded data slice associated with the memories 4-3 and 5-3 when the probability of data loss for the to-be rebuilt encoded data slice associated with the memory 5-2 is greater than the probability of data loss for the to-be rebuilt encoded data slices associated with the memories 4-3 and 5-3.

FIG. 41B illustrates further steps of the example of operation of the rebuilding of encoded data slices where the DST integrity processing unit 20 rebuilds, in accordance with the prioritizing, a first to-be rebuilt encoded data slice of the plurality of to-be rebuilt encoded data slices to produce a first rebuilt encoded data slice. For example, the DST integrity processing unit 20 retrieves at least a decode threshold number of encoded data slices from memories 1-2 through 4-2, where the encoded data slices are associated with the set of encoded data slices of the highest priority slice to-be rebuilt associated with the memory 5-2 (e.g., the first to-be rebuilt encoded data slice), dispersed storage error decodes the decode threshold number of retrieved slices to reproduce a data segment, and dispersed storage error encodes the reproduced data segment to produce the first rebuilt encoded data slice.

Alternatively, or in addition to, for a set of encoded data slices of the plurality of sets of encoded data slices having multiple encoded data slices requiring rebuilding (e.g., the set of encoded data slices associated with the memory set 3), the DST integrity processing unit 20 determines a first probability of data loss based on the cumulative memory health (e.g., with respect to an encoded data slice to-be rebuilt associated with the memory 4-3 based where the first probability of data loss is a function of memory health of the memory 5-3), the respective dispersed storage error encoding parameters, and the multiple encoded data slices requiring rebuilding in the respective set of encoded data slices, and determines a second probability of data loss based on the cumulative memory health (e.g., with respect to an encoded data slice to-be rebuilt associated with the memory 5-3 based where the second probability of data loss is a function of memory health of the memory 4-3), the respective dispersed storage error encoding parameters, and the multiple encoded data slices requiring rebuilding less one of the multiple encoded data slices requiring rebuilding. Having determined the first and second probabilities of data loss, the DST integrity processing unit 20 rebuilds the one of the multiple encoded data slices requiring rebuilding in accordance with the first probability of data loss and rebuilds a second one of the multiple encoded data slices requiring rebuilding in accordance with the second probability of data loss. For example, the DST integrity processing unit 20 rebuilds the encoded data slice to-be rebuilt associated with the memory 4-3 first and rebuilds the encoded data slice to-be rebuilt associated with the memory 5-3 second.

Having produced the first rebuilt encoded data slice, the DST integrity processing unit 20 identifies a memory device for storing the first rebuilt encoded data slice. The identifying may be based on one or more of memory health of the memory device, a predetermination, a test result, and a request. For example, the DST integrity processing unit 20 identifies a new memory device with one of the storage units based on a favorable memory health of the new memory device for storing the first rebuilt encoded data slice. As another example, the DST integrity processing unit 20 identifies an original memory when the memory health of the original memory is favorable (e.g., when the memory health of the memory 5-2 becomes favorable). Having identified the memory device for storing the first rebuilt encoded data slice, the DST integrity processing unit 20 sends the first rebuilt encoded data slice to the identified memory. For example, the DST integrity processing unit 20 sends, via the network 24, the prioritized rebuilt encoded data slice (e.g., the first rebuilt encoded data slice) for memory 5-2 to the DST execution unit 5 for storage in the memory 5-2 when the memory health is favorable again of the memory 5-2. As another example, the DST integrity processing unit 20 sends, via the network 24, the first rebuilt encoded data slice to the DST execution unit 5 for storage in the memory 5-1 when the memory health is favorable for the memory 5-1 and unfavorable for the memory 5-2.

Further alternatively, or in addition to, the DST integrity processing unit 20 identifies new to-be rebuilt encoded data slices. Having identified the new to-be rebuilt encoded data slices, the DST integrity processing unit 20 updates the plurality of sets of encoded data slices to include each new set of encoded data slices including at least one of the new to-be rebuilt encoded data slices and to exclude sets of the plurality of sets of encoded data slices for which the at least one of the plurality of to-be rebuilt encoded data slices has been rebuilt to produce an updated plurality of sets of encoded data slices.

Having updated the plurality of sets of encoded data slices, for each set of encoded data slices of the updated plurality of sets of encoded data slices, the DST integrity processing unit 20 determines a new cumulative memory health for memory devices of storage units storing other encoded data slices of the respective set of encoded data slices, determines a new probability of data loss based on the new cumulative memory health, the respective dispersed storage error encoding parameters, and the number of encoded data slices requiring rebuilding in the respective set of encoded data slices, updates prioritizing rebuilding of remaining to-be rebuilt encoded data slices of the plurality of to-be rebuilt encoded data slices and of the new to-be rebuilt encoded data slices based on the new probability of data loss for each set of encoded data slices of the updated plurality of sets of encoded data slices, and rebuilds, in accordance with the updated prioritizing, a second to-be rebuilt encoded data slice of the remaining to-be rebuilt encoded data slices of the plurality of to-be rebuilt encoded data slices and of the new to-be rebuilt encoded data slices.

FIG. 41C is a flowchart illustrating an example of rebuilding encoded data slices. In particular, a method to rebuild a plurality of to-be rebuilt encoded data slices in a dispersed storage network (DSN) is presented for use in conjunction with one or more functions and features described in conjunction with FIGS. 1-39, 41A-B, and also FIG. 41C. The method includes step 400 where a processing module of a computing device of one or more computing devices of a dispersed storage network (DSN), for each set of encoded data slices of a plurality of sets of encoded data slices that includes at least one of the plurality of to-be rebuilt encoded data slices, determines a cumulative memory health for memory devices of storage units storing other encoded data slices of the respective set of encoded data slices. The determining the cumulative memory health includes, for each of the memory devices of the storage units storing the other encoded data slices, determining whether the respective memory device is in a soft failure mode or a non-failure mode, for each memory device in a soft failure mode, determining a soft failure mode level, and calculating the cumulative memory health based on a ratio of memory devices in the soft failure mode to the memory devices in the non-failure mode and weighting the ratio based on the soft failure modes levels.

The method continues at step 402 where the processing module determines a probability of data loss based on the cumulative memory health, respective dispersed storage error encoding parameters, and a number of encoded data slices requiring rebuilding in the respective set of encoded data slices. The determining the probability of data loss includes determining a number corresponding to the other encoded data slices, determining a total number of encoded data slices in the respective set of encoded data slices from the dispersed storage error encoding parameters, determining a decode threshold number of encoded data slices of the respective set of encoded data slices from the dispersed storage error encoding parameters, determining a current redundancy number of encoded data slices based on the total number minus the decode threshold number and minus the number of encoded data slices requiring rebuilding, and weighting the current redundancy number based on the cumulative memory health to produce the probability of data loss.

The method continues at step 404 where the processing module prioritizes rebuilding of the plurality of to-be rebuilt encoded data slices based on the probability of data loss for each set of encoded data slices of the plurality of sets of encoded data slices. The method continues at step 406 where the processing module rebuilds, in accordance with the prioritizing, a first to-be rebuilt encoded data slice of the plurality of to-be rebuilt encoded data slices to produce a first rebuilt encoded data slice. Alternatively, or in addition to, for a set of encoded data slices of the plurality of sets of encoded data slices having multiple encoded data slices requiring rebuilding, the processing module determines a first probability of data loss based on the cumulative memory health, the respective dispersed storage error encoding parameters, and the multiple encoded data slices requiring rebuilding in the respective set of encoded data slices, determines a second probability of data loss based on the cumulative memory health, the respective dispersed storage error encoding parameters, and the multiple encoded data slices requiring rebuilding less one of the multiple encoded data slices requiring rebuilding, rebuilds the one of the multiple encoded data slices requiring rebuilding in accordance with the first probability of data loss, and rebuilds a second one of the multiple encoded data slices requiring rebuilding in accordance with the second probability of data loss.

The method continues at step 408 where the processing module identifies a new memory device with one of the storage units based on a favorable memory health of the new memory device for storing the first rebuilt encoded data slice. The method continues at step 410 where the processing module identifies new to-be rebuilt encoded data slices (e.g., interprets list slice responses, interprets a storage error message). The method continues at step 412 where the processing module updates the plurality of sets of encoded data slices to include each new set of encoded data slices including at least one of the new to-be rebuilt encoded data slices and to exclude sets of the plurality of sets of encoded data slices for which the at least one of the plurality of to-be rebuilt encoded data slices has been rebuilt to produce an updated plurality of sets of encoded data slices.

For each set of encoded data slices of the updated plurality of sets of encoded data slices, the method continues at step 414 where the processing module determines a new cumulative memory health for memory devices of storage units storing other encoded data slices of the respective set of encoded data slices. The method continues at step 416 where the processing module determines a new probability of data loss based on the new cumulative memory health, the respective dispersed storage error encoding parameters, and the number of encoded data slices requiring rebuilding in the respective set of encoded data slices.

The method continues at step 418 where the processing module updates prioritizing rebuilding of remaining to-be rebuilt encoded data slices of the plurality of to-be rebuilt encoded data slices and of the new to-be rebuilt encoded data slices based on the new probability of data loss for each set of encoded data slices of the updated plurality of sets of encoded data slices. The method continues at step 420 where the processing module rebuilds, in accordance with the updated prioritizing, a second to-be rebuilt encoded data slice of the remaining to-be rebuilt encoded data slices of the plurality of to-be rebuilt encoded data slices and of the new to-be rebuilt encoded data slices.

The method described above in conjunction with the processing module can alternatively be performed by other modules of the dispersed storage network or by other devices. In addition, at least one memory section (e.g., a non-transitory computer readable storage medium) that stores operational instructions can, when executed by one or more processing modules of one or more computing devices (e.g., a group of computing devices) of the dispersed storage network (DSN), cause the one or more computing devices to perform any or all of the method steps described above.

FIG. 42A is a schematic block diagram of another embodiment of a dispersed storage network (DSN) that includes the distributed storage and task (DST) processing unit 16 of FIG. 1, the network 24 of FIG. 1, and a set of DST execution (EX) units 1-n. The DST processing unit 16 includes the DST client module 34 of FIG. 1. Each DST execution unit may be implemented utilizing the DST execution unit 36 of FIG. 1.

The DSN functions to select retrieval locations for recovering data from the set of DST execution units 1-n. In an example of operation, the DST client module 34 determines to recover a data segment from the set of DST execution units, where the data segment was dispersed storage error encoded to produce a set of encoded data slices, and where the set of encoded data slices are stored in the set of DST execution units. The determining includes at least one of receiving a read data request 430, receiving a rebuilding request, identifying the data segment based on a data object identifier, and identifying slice names based on the identity of the data segment.

Having determined to recover the data segment, the DST client module 34 identifies retrieval locations of the set of encoded data slices. The identifying includes at least one of interpreting an entry of a dispersed hierarchical index, performing a DSN directory lookup, and accessing a slice location table utilizing the identified slice names (e.g., identify the set of DST execution units as the storage locations).

Having identified the retrieval locations, for each retrieval location, the DST client module 34 obtains performance information. The obtaining includes at least one of interpreting a query response, initiating a test, interpreting a test result, and performing a lookup. The DSN performance information includes one or more of a loading level, retrieval latency of a DST execution unit, and a network bandwidth capacity level.

Having obtained the performance information, for each k+x number of candidate retrieval locations of the set of DST execution units for potential utilization, where k+x ranges from k+1 to n−1 (e.g., k=a decode threshold number of an information dispersal algorithm (IDA), n=IDA width), determine a cost-benefit level for each permutation of corresponding DST execution units. The determining includes at least one of estimating a network loading impact level, and estimating a decode latency level (e.g., latency to obtain a decode threshold number of encoded data slices and decode them to reproduce the data segment).

Having determined the cost-benefit levels, the DST client module 34 selects a permutation of the plurality of permutations based on the corresponding plurality of cost-benefit levels. The selecting includes at least one of identifying a permutation with a most favorable cost-benefit level as the selected permutation and randomly selecting a permutation with a cost-benefit level that is greater than a minimum cost-benefit threshold level.

Having selected the permutation, the DST client module 34 issues read slice requests 432 to the k+x number of retrieval locations corresponding to the selected permutation. For example, the DST client module 34 identifies corresponding DST execution units, generates the k+x number of read slice requests, sends, via the network 24, the read slice requests 432 to the identified corresponding DST execution units.

Having issued the read slice requests 432, when receiving a decode threshold number of encoded data slices within a response timeframe (e.g., receiving read slice responses 434), the DST client module 34 dispersed storage error decodes the received decode threshold number of encoded data slices to reproduce the data segment for inclusion in a read data response 436. When not receiving the decode threshold number of encoded data slices within a response timeframe, the DST client module 34 issues at least one more read slice request 432 to an additional retrieval location in accordance with the selected permutation and a most favorable cost-benefit level in accordance with favorable retrieval locations and available additional retrieval locations. For example, the DST client module 34 selects the additional retrieval locations to maximize the cost-benefit level, where an unfavorable retrieval location has been excluded.

FIG. 42B is a flowchart illustrating an example of selecting retrieval locations. The method includes step 444 where a processing module (e.g., of a distributed storage and task (DST) client module) determines to recover a data segment from a set of storage units. The determining includes at least one of receiving a read data request and identifying a set of encoded data slices associated with the data segment, where the data segment was dispersed storage error encoded to produce the set of encoded data slices for storage in the set of storage units.

The method continues at step 446 where the processing module identifies candidate retrieval locations of the set of storage units. For example, the processing module interprets encoded data slice location information based on the set of slice names to produce a storage unit identifier for each retrieval location. For each retrieval location, the method continues at step 448 where the processing module obtains performance information. The obtaining includes at least one of interpreting a test result and accessing a historical performance record.

The method continues at step 450 where the processing module determines a cost-benefit level for each permutation of a selected number of storage locations of the candidate retrieval locations. The determining includes at least one of identifying permutations, and for each permutation, estimating incremental network loading level, and estimating resulting recovery latency.

The method continues at step 452 where the processing module selects a permutation based on the cost-benefit level for each permutation. The selecting includes at least one of identifying a permutation associated with a most favorable cost-benefit level and randomly selecting a permutation of the plurality of permutations associated with a cost-benefit level that is greater than a minimum cost-benefit threshold level.

The method continues at step 454 where the processing module initiates retrieval of encoded data slices from the corresponding retrieval locations of the selected permutation. For example, the processing module issues read slice requests to storage units of retrieval locations associated with the selected permutation and receives read slice responses that includes encoded data slices.

The method continues at step 456 where the processing module reproduces the data segment when receiving a decode threshold number of encoded data slices. For example, the processing module receives the decode threshold number of encoded data slices and dispersed storage error decodes the decode threshold number of encoded data slices to produce a recovered data segment.

FIG. 43A is a schematic block diagram of an embodiment of a dispersed storage network (DSN) that includes the distributed storage and task (DST) processing unit 16 of FIG. 1, the network 24 of FIG. 1, and a plurality of storage pools 1-2. The DST processing unit 16 includes the DST client module 34 of FIG. 1. Each storage pool includes a set of DST execution (EX) units, where a number of DST execution units of the set of DST execution units is in accordance with a storage approach. Each DST execution unit may be implemented utilizing the DST execution unit 36 of FIG. 1. The DSN functions to access data (e.g., store the data, retrieve the data, delete the data) utilizing the plurality of pools in accordance with the storage approach.

The storage approach includes establishing a set of dispersal parameters of a dispersed storage error coding function such that associated access results may be obtained. Such results includes a data retrieval reliability centric focus and a speed of access centric focus. For example, the storage pool 1 is associated with the data retrieval reliability centric focus when associated dispersal parameters includes an information dispersal algorithm (IDA) width of 28 and a decode threshold level of 20. As another example, the storage pool 2 is associated with the speed of access centric focus when associated dispersal parameters includes an IDA width of 3 and a decode threshold level of 2.

In an example of operation of the accessing of the data, the DST client module 34 receives data for storage. The receiving includes at least one of receiving an access data request 460, where the access data request 460 includes a store data request. The store data request includes one or more of the data, a data identifier of the data, and a storage approach preference.

Having received the data for storage, the DST client module 34 determines the storage approach (e.g., selecting a storage pool) for the data based on the data (e.g., and based on characteristics of the storage pools). The determining includes at least one of indicating to utilize storage pool 2 when a data size is less than a small data size maximum threshold level, indicating to utilize storage pool 2 when the data size is greater than a large data size minimum threshold level, selecting storage pool based on a requested storage pool approach preference, indicating storage pool 1 when an expected frequency of data access is greater than an access threshold level, interpreting system registry information to determine a storage pool selection, utilizing a predetermination which may include storing the data in both storage pools substantially simultaneously, establishing updated dispersal parameters in accordance with updated system registry information, and determining the dispersal parameters based on the data (e.g., for a desired level of retrieval reliability versus access performance).

Having determined the storage approach for the data, the DST client module 34 facilitates storage of the data in one or more of the storage pools in accordance with the storage approach. For example, the DST client module 34 dispersed storage error encodes the data utilizing dispersal parameters associated with the storage approach to produce a plurality of sets of encoded data slices and sends, via the network 24, slice access requests 462 that includes the plurality of sets of encoded data slices to DST execution units of the selected storage pool for storage.

Having stored the data, the DST client module 34 determines to recover the data from at least one of the storage pools. The determining includes at least one of receiving another access request that includes a read data request, detecting loss of the data from at least one of the storage pools, and interpreting a consistency check scheduled to facilitate updating consistency between the data stored on two or more of the storage pools.

Having determined to recover the data, the DST client module 34 selects a storage pool of the plurality of storage pools for recovery of the data. The selecting includes at least one of randomly selecting when the data is greater than a large data size threshold level and recovery performance within a timeframe is not required, selecting the first storage pool when a most up-to-date version is required, selecting the second storage pool when retrieval performance is to be maximized, selecting the first storage pool in a time frame since a last retrieval is greater than a retrieval time threshold level, and selecting another storage pool when data losses are detected from a storage pool.

Having selected the storage pool, the DST client module 34 facilitates recovery of the data from the selected storage pool. For example, the DST client module 34 issues, via the network 24, slice access requests 462 that includes read slice requests to the DST execution units of the selected storage pool, receives slice access responses 464 that includes read slice responses, and for each set of encoded data slices, dispersed storage error decodes a decode threshold number of received encoded data slices to reproduce the data, and issues an access data response 466 that includes the reproduced data.

FIG. 43B is a flowchart illustrating an example of accessing data utilizing a plurality of storage pools. The method includes step 472 where a processing module (e.g., of a distributed storage and task (DST) client module) receives data for storage in one or more sets of storage units. The receiving includes receiving one or more of the data, a data identifier, a data size indicator, and a storage approach preference. The method continues at step 474 where the processing module determines a storage approach for the data based on the data. The determining includes basing the determination on one or more of a predetermination, system registry information, the storage approach preference, and a request (e.g., use a set of storage units and associated dispersal parameters associated with high-performance when the data is smaller than a small size threshold, use another set of storage units and dispersal parameters when high retrieval reliability is required).

The method continues at step 476 where the processing module facilitates storage of the data in the one or more sets of storage units in accordance with the storage approach. For example, the processing module encodes the data utilizing associated dispersal parameters of the storage approach to produce a plurality of sets of encoded data slices and sends the plurality of sets of encoded data slices to a set of storage units affiliated with the storage approach.

The method continues at step 478 where the processing module determines to recover the data from at least one of the sets of storage units. The determining includes at least one of receiving a data access request, detecting loss of data, and determining to facilitate a consistency check function.

The method continues at step 480 where the processing module selects a set of storage units for recovery of the data. For example, the processing module selects a set of storage units associated with high retrieval reliability when a most recent revision is required, the data size is larger than a large data size threshold level, and a time frame since a last retrieval is greater than a retrieval time frame threshold level. As another example, the processing module selects a set of storage units associated with high-performance when high-performance is required and a DSN system activity level indicator indicates that a high level of system activity exists.

The method continues at step 482 where the processing module facilitates recovery of the data from the selected set of storage units. For example, the processing module issues read slice requests to the selected set of storage units, receives read slice responses, and for each set of encoded data slices, dispersed storage error decodes a decode threshold number of received encoded data slices to reproduce a data segment of the data.

FIGS. 44A and 44B are schematic block diagrams of another embodiment of a dispersed storage network (DSN) that includes the distributed storage and task (DST) processing unit 16 of FIG. 1 and a storage pool 490. The DST processing unit 16 includes the DST client module 34 of FIG. 1. The storage pool includes a set of DST execution (EX) units 1-6 when dispersal parameters of a dispersed storage error coding function utilized to store data in the set of DST execution units includes an information dispersal algorithm (IDA) width n=6. Each DST execution unit may be implemented utilizing the DST execution unit 36 of FIG. 1. The DSN functions to access data in the storage pool. The accessing includes storing the data in the storage pool and retrieving the data from the storage pool. The data may include one or more data objects.

FIG. 44A illustrates steps of an example of storing the data in the storage pool where the DST client module 34 generates a data segment to include a first data object A for storage and one or more future data objects, where a decode threshold number of data objects includes the first data object A and the one or more future data objects and where the dispersal parameters further includes the decode threshold number. The DST client module 34 generates each of the one or more future data objects to include all zeros. For example, the DST client module 34 generates the data segment to include the first data object A and all zeros for a decode threshold number k minus one number of future data objects. For instance, the DST client module 34 generates two future data objects of all zeros when the decode threshold number is three.

Having generated the data segment, the DST client module 34 dispersed storage error encodes the data segment utilizing the dispersed storage error coding function and the dispersal parameters to produce a set of encoded data slices 492, where the dispersed storage error coding function includes matrix multiplication of the data segment by an encoding matrix and where the encoding matrix includes a unity matrix in a most significant number of a decode threshold number of rows. For instance, the DST client module 34 generates a set of encoded data slices to include a first encoded data slice that is essentially the same as the first data object A, a second encoded data slice that is all zeros, a third encoded data slice that is all zeros, a fourth encoded data slice that is an error coded slice 4A corresponding to a fourth row of the encoding matrix, and a fifth encoded data slice that is an error coded slice 5A corresponding to a fifth row of the encoding matrix.

Having produced the set of encoded data slices 492, the DST client module 34 facilitates storage of the set of encoded data slices 492 in the set of DST execution units of the storage pool. For example, the DST client module 34 generates a set of write slice requests that includes the set of encoded data slices 492 and sends the set of write slice requests to the storage pool. The sending may include transmitting the set of write slice requests via the network 24 of FIG. 1 to the DST execution units of the storage pool.

FIG. 44B illustrates further steps of the example of storing the data in the storage pool where the DST client module 34 facilitates storage of a second data object B as a future data object. For example, the DST client module 34 sends slice update information 494 that includes the second data object B to the DST execution unit 2 for storage, where the DST execution unit 2 performs an exclusive OR (XOR) function on the second data object B with a retrieved stored future data object (e.g., all zeros) and overwrites the stored future data object with the result of the XOR function. Alternatively, the DST execution unit 2 stores the received second data object B by overwriting the stored future data object.

For each stored n-k error coded slice, the DST client module 34 calculates a partial contribution of the second data object B in accordance with a partial encoding approach. For example, the DST client module 34 matrix multiplies a row of the encoding matrix that corresponds to the error coded slice by the second data object B to produce the partial contribution. For instance, the DST client module 34 matrix multiplies a fourth row of the encoding matrix by the second data object B to produce the partial contribution for the error coded slice 4A that is stored in the DST execution unit 5.

For each stored n-k error coded slice, the DST client module 34 facilitates updating of the slice utilizing the corresponding calculated partial contribution. The facilitating includes the DST client module 34 sending further slice update information 494 that includes the partial contribution to a corresponding DST execution unit, where the DST execution unit performs the XOR function on a corresponding stored error coded slice with the partial contribution to produce an updated error coded slice for overwriting of the error coded slice. For example, the DST client module 34 sends the partial contribution for the error coded slice 4A to the DST execution unit 5, where the DST execution unit 5 performs the XOR function on the error coded slice 4A with the received partial contribution for the error coded slice 4A to produce an updated error coded slice 4AB for overwriting of the error coded slice 4A.

Alternatively, or in addition to, recovery of a data object includes accessing a corresponding DST execution unit to recover the data object (e.g., issuing a read slice request to DST execution unit 2 to recover the second data object B) or, when the data object is unavailable directly (e.g., a storage error is associated with storage of the second data object B), recovering a decode threshold number of encoded data slices of the set of encoded data slices (e.g., encoded data slices 1, 3, and 5), and dispersed storage error decoding the decode threshold number of encoded data slices to reproduce the desired data object.

FIG. 44C is a flowchart illustrating an example of accessing data. The method includes step 506 where a processing module (e.g., of a distributed storage and task (DST) client module) generates a data segment to include a first data object for storage in one or more future null data objects. For example, the processing module establishes the data segment such that a first encoded data slice is substantially the same as the first data object and further future null data objects are all zeros.

The method continues at step 508 where the processing module dispersed storage error encodes the data object to produce a set of encoded data slices, where a first encoded data slice is substantially the same as the first data object and where the set of encoded data slices includes n-k error coded slices. For example, the processing module matrix multiplies the data segment by an encoding matrix, where the encoding matrix includes a unity matrix, with a decode threshold number dimension, in a most significant number of rows, to produce the set of encoded data slices.

The method continues at step 510 where the processing module facilitates storage of the set of encoded data slices in a set of storage units. For example, the processing module sends the set of encoded data slices to the set of storage units for storage. The method continues at step 512 where the processing module facilitates storage of a second data object, where a null data object is overwritten with the second data object. For example, the processing module generates an update slice request to include the second data object, where a second encoded data slice is to be substantially the same as the second data object, and sends the update slice request to a corresponding storage unit where the storage unit performs an exclusive OR function on the corresponding null data object with the second data object to produce a second encoded data slice for storage.

For each of the error coded slices, the method continues at step 514 where the processing module calculates a partial contribution of the second data object in accordance with a partial encoding approach. For example, the processing module matrix multiplies a corresponding row of the encoding matrix by the second data object to produce the partial contribution. For each of the error coded slices, the method continues at step 516 where the processing module facilitates updating the error coded slice utilizing a corresponding partial contribution. For example, the processing module issues an update slice request to a corresponding storage unit where the storage unit performs the exclusive OR function on the partial contribution with the stored error coded slice to produce an updated error coded slice for storage in the storage unit.

Alternatively, or in addition to, recovery of a data object includes accessing a corresponding storage unit to recover the data object or, when the data object is unavailable directly, recovering a decode threshold number of encoded data slices of the set of encoded data slices and dispersed storage error decoding the decode threshold number of encoded data slices to reproduce the desired data object.

FIG. 45A is a schematic block diagram of another embodiment of a dispersed storage network (DSN) that includes the distributed storage and task (DST) processing unit 16 of FIG. 1, the network 24 of FIG. 1, and a storage pool 524. The DST processing unit 16 includes the DST client module 34 of FIG. 1. The storage pool 524 includes a set of DST execution (EX) units 1-5. Alternatively, the set of DST execution units may include any number of DST execution units in accordance with a dispersed storage error coding function that includes dispersal parameters. Each DST execution unit may be implemented utilizing the DST execution unit 36 of FIG. 1. The dispersal parameters includes an information dispersal algorithm (IDA) width n, and an IDA decode threshold. For instance, the storage pool may include 28 DST execution units when the IDA width is 28.

The DSN functions to access serially stored data. The accessing includes storing data 526 and retrieving at least a portion of the data to produce a recovered data portion 534. The data 526 includes a plurality of data blocks. Each data block includes one or more data bytes. For example, the DST processing unit 16 receives the data 526 that includes data blocks D1, D2, D3, etc.

In an example of operation of the storing of the serially stored data, the DST client module 34 determines to serially store received data 526 in the storage pool 524. The determining includes at least one of indicating to serially store when a data size of the received data 526 is greater than a serial storage threshold level, receiving a request, and interpreting a data retrieval requirement (e.g., required to recover a small portion of the data, i.e., an IDA decode threshold number of data blocks rather than a larger data segment that includes a plurality of the IDA decode threshold numbers of data blocks).

For every IDA decode threshold number of received data blocks of the data, the DST client module 34 dispersed storage error encodes the IDA decode threshold number of received data blocks to produce corresponding error coded slices 528 in accordance with a dispersed storage error coding function. For example, the DST client module 34 matrix multiplies the IDA decode threshold number of received data blocks by a corresponding row of an encoding matrix to produce a corresponding error coded slice. For instance, the DST client module 34 matrix multiplies data blocks D1, D2, and D3 by a fourth row of the encoding matrix to produce an error coded slice 4-1 and matrix multiplies the data blocks D1, D2, and D3, by a fifth row of the encoding matrix to produce an error coded slice 5-1 when the IDA decode threshold number is 3 and the IDA width is 5. The encoding of the IDA decode threshold number of received data blocks is discussed in greater detail with reference to FIG. 45B.

For each IDA decode threshold number of received data blocks, the DST client module 34 facilitates storage of the IDA threshold number of received data blocks and the corresponding n-k error coded slices in the storage pool. For example, the DST client module 34 sends, via the network 24, an initial set of encoded data slices 528 to the set of DST execution units for storage, sends subsequent sets of slices as slice appends 530, where each DST execution unit appends a corresponding subsequently received slice to a previously received slice to create an updated appended encoded data slice that is stored in the DST execution unit. For instance, the DST client module 34 sends, via the network 24, an encoded data slice of data block D1 to the DST execution unit 1 for storage, followed by an encoded data slice of data block D4 to the DST execution unit 1 for appending to the data block D1, followed by an encoded data slice of data block D7 to the DST execution unit 1 for appending to the data blocks D1 and D7 etc., as the serial data blocks are received and encoded.

In an example of operation of the retrieving of the serially stored data, the DST client module 34 identifies a portion of the data for recovery. For example, the DST client module 34 receives a retrieval request and identifies one or more of the IDA decode threshold number of data blocks for recovery that are associated with the portion of the data for recovery. The identifying includes at least one of accessing a directory, accessing metadata to identify a data size indicator, accessing the data to search for the portion based on one or more index keys, and receiving a read offset preference. For example, the DST client module 34 identifies the second decode threshold number of data blocks (e.g., data blocks D4, D5, and D6) associated with the portion of the data for recovery.

Having identified the portion of the data for recovery, the DST client module 34 generates a read offset for each of the set of appended encoded data slices based on the identified portion of the data for recovery. The generating includes identifying an offset to a desired data block of an appended encoded data slice based on the identified one or more IDA decode threshold number of data blocks. The generating may further include utilizing the read offset preference to produce the read offset.

Having generated the read offset, the DST client module 34 retrieves a decode threshold number of data blocks of a set of data blocks corresponding to the read offset. For example, the DST client module 34 generates a decode threshold number of read slice requests that includes the read offsets, sends, via the network 24, the read slice requests to the storage pool, and receives, via the network 24, at least a decode threshold number of data blocks 532 (e.g., may include multiple sets of data blocks as the DST execution unit receives a data block sequentially stored in a memory of the DST execution unit).

Having received the decode threshold number of data blocks 532, the DST client module 34, for each set of data blocks, dispersed storage error decodes the received decode threshold number of data blocks to reproduce received data blocks of the identified portion of the data for recovery to produce the recovered data portion 534. For example, the DST client module 34 dispersed storage error decodes slice D4, slice D6, and error coded slice 4-2 to reproduce data blocks D4, D5, and D6.

FIG. 45B is a diagram illustrating an example of matrix multiplication of an encoding matrix (E) and a data matrix (D) to produce a coded matrix (C) of encoded data blocks. A data segment that includes a serially received IDA decode threshold number of data blocks D1 through Dk is arranged in success of columns of the data matrix (D). For example, the data blocks D1-D3 are included in a first column, the data blocks D4-D6 are included in a second column, the data blocks D7-D9 are included in a third column, and data blocks D10-D12 are included in a fourth column of the data matrix. The encoding matrix includes a unity matrix in a most significant IDA decode threshold number of rows and columns.

The encoding function may utilize a variety of encoding approaches to facilitate dispersed storage error encoding of data. The encoding function includes, but is not limited to, at least one of Reed Solomon encoding, an information dispersal algorithm, on-line codes, forward error correction, erasure codes, convolution encoding, Trellis encoding, Golay, Multidimensional parity, Hamming, Bose Ray Chauduri Hocquenghem (BCH), and/or Cauchy-Reed-Solomon.

In an example of a Reed Solomon encoding function, the matrix multiplication is utilized to encode a data segment to produce a set of encoded data blocks as a representation of the data segment. The Reed Solomon encoding function is associated with an error coding number (e.g., IDA width, number of slices per set) and an IDA decode threshold number. As a specific example, the encoding matrix includes the error coding number of Y rows and the decode threshold number of X columns. Accordingly, the encoding matrix includes Y rows of X coefficients. The set of data blocks of the data segment is arranged into the data matrix having X rows of Z number of data words (e.g., X*Z=number of data blocks). The data matrix is matrix multiplied by the encoding matrix to produce the coded matrix, which includes Y rows of Z number of encoded values (e.g., encoded data blocks 540).

When utilizing the unity matrix within the encoding matrix, the coded matrix includes an IDA decode threshold number of rows that is substantially the same as the data matrix and n-k rows of error coded slices. The coded matrix may be generated in a sequential fashion as data is received for the encoding. For example, the first column of the coded matrix may generate five encoded data slices 1-5, where the encoded data slices includes D1, D2, D3, X41, and X51 when the corresponding received data includes data blocks D1, D2, and D3. The encoded data slices 1-5 may be updated by appending further encoded data blocks 542 as more data is received. For example, a second column of the coded matrix that includes D4, D5, D6, X42, and X52 may be generated when receiving corresponding data blocks D4, D5, and D6. The appending results in an updated encoded data slice 1 that includes D1 and D4, an updated encoded data slice 2 that includes D2 and D5, etc.

FIG. 45C is a flowchart illustrating an example of accessing serially stored data. The method includes step 550 where a processing module (e.g., of a distributed storage and task (DST) client module) determines to serially store received data in a set of storage units utilizing a dispersed storage error coding function. For example, the processing module receives a store data request and indicates to serially store when a data size of the received data is greater than a serial storage threshold level.

For every information dispersal algorithm (IDA) threshold number (e.g., a decode threshold number) of received data blocks, the method continues at step 552 where the processing module encodes the IDA threshold number of received data blocks using the dispersed storage error coding function to produce a set of encoded data slices. For example, the processing module receives a next IDA threshold number of data blocks and encodes the IDA threshold number of data blocks using the dispersed storage error coding function to produce the set of encoded data slices.

For every IDA decode threshold number of received data blocks, the method continues at step 554 where the processing module facilitates storage of the corresponding sets of encoded data slices in the set of storage units, where each storage unit appends a plurality of received encoded data slices to an appended encoded data slice for storage. For example, the processing module issues write slice requests to the set of storage units for a first set of encoded data slices and issues slice append requests for the subsequent sets of encoded data slices.

The method continues at step 556 where the processing module identifies a portion of the data for recovery from the set of storage units. For example, the processing module interprets a retrieval request to identify at least one IDA threshold number of received data blocks for recovery. The method continues at step 558 where the processing module generates a read offset for the set of appended encoded data slices based on the identified portion of the data for recovery. For example, the processing module generates the read offset based on a number of IDA threshold number of received data blocks from a first IDA threshold number of appended encoded data slices to the identified at least one IDA threshold number of received data blocks for recovery.

The method continues at step 560 where the processing module retrieves a decode threshold number of data blocks of a set of data blocks corresponding to the read offset within the set of appended encoded data slices. For example, the processing module issues read slice requests that includes the read offset to the set of storage units and receives at least one of the decode threshold number of data blocks.

The method continues at step 562 where the processing module dispersed storage error decodes the retrieved decode threshold number of data blocks to produce the portion of the data for recovery. For example, for each set of data blocks, the processing module dispersed storage error decodes the received decode threshold number of data blocks to reproduce received data blocks of the portion of the data for recovery.

FIGS. 46A and 46B are schematic block diagrams of another embodiment of a dispersed storage network (DSN) that includes the distributed storage and task (DST) processing unit 16 of FIG. 1 and a storage pool 570. The DST processing unit 16 includes the DST client module 34 of FIG. 1. The storage pool includes a set of DST execution (EX) units. Each DST execution unit may be implemented utilizing the DST execution unit 36 of FIG. 1. The storage pool may include a number of DST EX units in accordance with an information dispersal algorithm (IDA) width number when data is encoded using a dispersed storage error coding function to produce one or more sets of encoded data slices for storage in the set of DST EX units, where a decode threshold number of encoded data slices of each set of encoded data slices is required to recover the data. For example, the set of DST EX units includes DST EX units 1-16 and 10 encoded data slices are required from each set for data recovery when the IDA width is 16 and the decode threshold is 10. Each DST EX unit may be implemented using the DST EX unit 36 of FIG. 1. The DSN functions to optimize the data storage.

FIG. 46A illustrates steps of an example of operation of the optimizing of the data storage where the DST client module 34 dispersed storage error encodes a data segment of the data to produce a set of encoded data slices (e.g., encoded data slices 1-16). Having produced the set of encoded data slices, the DST client module 34 facilitates storage of greater than a write threshold number of encoded data slices of the set of encoded data slices, where the write threshold number is greater than the decode threshold number and less than the IDA width number. For example, the write threshold may be 13 when the IDA width is 16 and the decode threshold is 10. The data retrieval reliability is a function of a difference between the write threshold and the decode threshold and write availability is a function of a difference between the IDA width and the write threshold.

The facilitating of the storage of the greater than a write threshold number of encoded data slices includes generating a set of write slice requests 572 that includes the set of encoded data slices, sending (e.g., via the network 24 of FIG. 1) the set of write slice requests 572 to the set of DST execution units 1-16, receiving write slice responses 574 from at least some of the DST execution units, identifying a number of favorably stored encoded data slices of the set of encoded data slices based on the received write slice responses 574, and sending another write slice request 572 when the number of favorably stored encoded data slices is less than or equal to the write threshold. For example, the DST client module 34 facilitates storage of all 16 encoded data slices except for encoded data slice 15 when a storage error occurs for encoded data slice 15 and the write threshold is 13.

FIG. 46B illustrates further steps of the example of operation of the optimizing of the data storage where the DST client module 34 determines a number of stored encoded data slices for deletion. The determining includes calculating a difference between the number of favorably stored encoded data slices and a write threshold number. For example, the DST client module 34 determines to delete to encoded data slices when the number of favorable encoded data slices is 15 and the write threshold is 13.

Having determined the number of stored encoded data slices for deletion, the DST client module 34 selects the number of stored encoded data slices for deletion from the favorably stored encoded data slices. The selecting may be based on one or more of performing a random selection, a predetermination, and selecting error coded slices when the unity matrix is utilized in an encoding matrix of the dispersed storage error coding function (e.g., encoded data slices 11-16 as candidates of error coded slices). For example, the DST client module 34 selects encoded data slices 14 and 16 for deletion when encoded data slices 11-16 are error coded slices.

Having selected the stored encoded data slices for deletion, the DST client module 34 facilitates deletion of the selected number of stored encoded data slices for deletion. The facilitating of the deletion includes the DST client module 34 issuing delete slice requests 576 (e.g., delete slice, a rollback request, an undo request) to DST execution units associated with the selected number of stored encoded data slices for deletion, receiving delete slice responses 578, and retrying sending a particular delete slice request 576 when not receiving an indication of favorable deletion of an encoded data slice within a deletion time frame.

Having successfully deleted the selected encoded data slices for deletion, the DST client module 34 has completed a trimming process to maintain the number of stored encoded data slices of the set of encoded data slices at the write threshold number. The DST client module 34 may further indicate that the rebuilding of encoded data slices of the set of encoded data slices beyond the successfully stored and maintained write threshold number is unnecessary. For example, a rebuilding process rebuilds encoded data slice 9 when encoded data slice 9 is associated with a storage error, but does not rebuild encoded data slices 14, 15, and 16 when the DST client module 34 has indicated that the rebuilding of encoded data slices of the set of encoded data slices beyond the successfully stored and maintained write threshold number is unnecessary.

FIG. 46C is a flowchart illustrating an example of optimizing data storage. The method includes step 584 where a processing module (e.g., of a distributed storage and task (DST) client module) dispersed storage error encodes a data segment to produce a set of encoded data slices in accordance with an IDA width and a decode threshold number. The method continues at step 586 where the processing module facilitates storage of more than a write threshold number of encoded data slices of the set of encoded data slices in a set of storage units. For example, the processing module generates more than a write threshold number of write slice requests that includes encoded data slices of the set of encoded data slices and sends the write slice requests to the set of storage units to facilitate at least a storage of greater than a write threshold number of encoded data slices.

The method continues at step 588 where the processing module identifies a number of favorably stored encoded data slices. For example, the processing module receives write slice responses and interprets the write slice responses to produce the number of favorably stored encoded data slices. The method continues at step 590 where the processing module determines a number of stored encoded data slices for deletion. For example, the processing module calculates a difference between the number of favorably stored encoded data slices and the write threshold number as the number for deletion.

The method continues at step 592 where the processing module selects the number of stored encoded data slices for deletion from the favorably stored encoded data slices. The processing module may perform the selection based on a selection scheme. The processing module may choose the selection scheme based on at least one of a predetermined pattern, interpreting system registry information, and receiving instructions. The selection schemes include choosing error coded slices that are not strictly data, performing a random selection, and selecting slices associated with porous performing storage units.

The method continues at step 594 where the processing module facilitates deletion of the selected number of stored encoded data slices for deletion. For example, the processing module identifies storage units associated with the selected number of stored encoded data slices for deletion (e.g., performs a lookup in a slice location table), issues delete requests to the identified storage units to delete the selected number of stored encoded data slices for deletion (e.g., where the delete request includes one or more of slice names and revision levels), receives delete responses, and performs a retry deletion sequence when not receiving a favorable number of delete responses within a response timeframe.

FIGS. 47A, 47B, and 47C are schematic block diagrams of another embodiment of a dispersed storage network (DSN) that includes the distributed storage and task (DST) processing unit 16 of FIG. 1, the network 24 of FIG. 1, and a plurality of sites 1-3. The DST processing unit 16 includes the DST client module 34 of FIG. 1. Each of the plurality of sites includes a set of DST execution (EX) units, where a total number of DST execution units is in accordance with an information dispersal algorithm (IDA) width of a dispersed storage error coding function. For example, the plurality of sites includes DST execution units 1-24 when the IDA width is 24. Each DST execution unit may be implemented utilizing the DST execution unit 36 of FIG. 1. The DSN functions to optimize data storage in the set of DST execution units.

FIG. 47A illustrates steps of an example operation of the optimizing of the data storage where the DST client module 34 dispersed storage error encodes a data segment of the data to produce a set of encoded data slices 604, where at least a decode threshold number of encoded data slices are required for recovery of the data segment and where the set of encoded data slices 604 includes an IDA width number of encoded data slices. For example, the DST client module 34 dispersed storage error encodes the data segment to produce encoded data slices 1-24.

Having produced the set of encoded data slices 604, the DST client module 34 obtains DSN configuration information. The obtaining includes at least one of receiving system registry information, receiving a query response, and performing a lookup. The DSN configuration information includes one or more of a number of sites of the plurality of sites and a number of DST execution units per site.

Having obtained the DSN configuration information, the DST client module 34 maps a write threshold number of encoded data slices of the set of encoded data slices to a write threshold number of DST execution units of the set of DST execution units in accordance with an affinity function to produce a slice storage mapping. For example, the DST client module 34 performs a deterministic function on one or more of an identifier associated with the data segment, the IDA width, and the number of sites to produce the slice storage mapping, where encoded data slices are to be stored in an equi-distributed set of DST execution units with a uniform probability distance function across all possible data segment identifiers. For instance, the DST client module 34 produces the slice storage mapping to include mapping encoded data slices 1-5 to DST execution units 1-5 of site 1, encoded data slices 9-13 to DST execution units 9-13 of site 2, and encoded data slices 17-21 to DST execution unit 17-21 of site 3 when the write threshold is 15 and a number of sites is 3 (e.g., evenly distributed).

Having produced the slice storage mapping, the DST client module 34 facilitates storage of the write threshold number of encoded data slices to the write threshold number of DST execution units in accordance with the slice storage mapping. For example, DST client module 34 generates a write threshold number of write slice requests that includes the associated write threshold number of encoded data slices, sends, via the network 24, the write threshold number of write slice requests to corresponding DST execution units for storage (e.g., encoded data slices 1-5 to DST execution units 1-5, encoded data slices 9-13 to DST execution units 9-13, and encoded data slices 17-21 to DST execution units 17-21), identifies favorably stored encoded data slices (e.g., by interpreting write slice responses), issues one or more additional write slice requests when a number of favorably stored encoded data slices is less than the write threshold number, or deletes favorably stored encoded data slices when more than the write threshold number of encoded data slices have been stored (e.g., when issuing more than the write threshold number of write slice requests). Having successfully facilitated storage of the read threshold number of encoded data slices, the DST client module 34 may indicate that the write threshold number of encoded data slices have been successfully stored.

FIG. 47B illustrates further steps of the example of operation of the optimizing of the data storage where the DST client module 34 detects unavailability of one or more encoded data slices of the write threshold number of successfully stored encoded data slices. The detecting includes at least one of detecting a site failure, interpreting an error message, detecting a failure of one or more DST execution units, and detecting a storage error (e.g., a missing encoded data slice, a corrupted encoded data slice). For example, the DST client module 34 detects unavailability of encoded data slices 9-13 when interpreting an error message indicating that site 2 is temporarily unavailable.

Having detected the unavailability of the one or more encoded data slice, the DST client module 34 obtains updated DSN configuration information. The obtaining of the updated DSN configuration information includes at least one of interpreting an updated test result, interpreting updated site availability information, interpreting updated DST execution unit availability information, interpreting updated system registry information, interpreting a further received query response, and performing a local lookup.

Having obtained the updated DSN configuration information, the DST client module 34 maps an updated write threshold number of encoded data slices of the set of encoded data slices to an updated write threshold number of available DST execution units in accordance with the affinity function and based on the updated DSN configuration information to produce an updated slice storage mapping. For example, the DST client module 34 produces the updated slice storage mapping to indicate storage of 8 encoded data slices at site 1 (e.g., encoded data slices 1-8), zero encoded data slices at site 2, and 7 encoded data slices at site 3 (e.g., encoded data slices 17-23; totaling 15 encoded data slices of the write threshold number distributed in a substantially equal fashion amongst available sites).

Having produced the updated slice storage mapping, the DST client module 34 facilitates storage of the updated write threshold number of encoded data slices 604 to the write threshold number of available DST execution units in accordance with one or more of the updated slice storage mapping and the slice storage mapping (e.g., where already stored encoded data slices are located). The facilitating includes generating one or more additional encoded data slices for encoded data slices 604 of the updated slice storage mapping that are not included in the slice storage mapping and storing the additional encoded data slices in corresponding DST execution units of available sites. For example, the DST client module 34 retrieves a decode threshold number of encoded data slices of the set of encoded data slices (e.g., encoded data slices 1-5 from site 1, encoded data slices 17-21 from site 3) when the decode threshold is 10, dispersed storage error decodes the retrieved decode threshold number of encoded data slices to reproduce the data segment, dispersed storage error encodes the reproduced data segment to reproduce the set of encoded data slices, sends, via the network 24, the one or more additional encoded data slices 604 to the corresponding DST execution units (e.g., encoded data slices 6-8 to DST execution units 6-8, encoded data slices 22-23 to DST execution units 22-23).

Alternatively, or in addition to, further received data for storage when received while the site 2 is temporarily unavailable, may be stored in a similar fashion as described above. For example, the DST client module 34 encodes the further received data for storage to produce further sets of encoded data slices, selects a write threshold number of the further sets of encoded data slices, and facilitates storage of the selected read threshold number of further sets of encoded data slices 604 in the available sites 1 and 3.

FIG. 47C illustrates further steps of the example of operation of the optimizing of the data storage where the DST client module 34 detects availability of greater than the write threshold number of encoded data slices of the set of encoded data slices. The detecting includes one or more of detecting availability of a previously failed site, detecting availability of a previously temporarily unavailable site, interpreting an error message, detecting availability of one or more previously unavailable DST execution units, interpreting list slice responses, interpreting read slice responses, and detecting abatement of a storage error. For example, the DST client module 34 detects availability of encoded data slices 9-13 at site 2 when detecting that the previously temporarily unavailable site 2 is now available. As such, the DST client module 34 detects that greater than the write threshold number of encoded data slices are available when detecting that encoded data slices 1-13 and 17-23 are available (e.g., 20 available encoded data slices is greater than a write threshold of 15).

Having detected the availability of the greater than the write threshold number of encoded data slices, the DST client module 34 obtains further updated DSN configuration information. Having obtained the further updated DSN configuration information, the DST client module 34 maps a further updated write threshold number of encoded data slices of the set of encoded data slices to a further updated write threshold number of available DST execution units in accordance with the affinity function and based on the further updated DSN configuration information to produce a further updated slice storage mapping. For example, the processing module maps encoded data slices 1-5 to site 1, encoded data slices 9-13 to site 2, and encoded data slices 17-21 to site 3 to substantially even distribute the write threshold number of encoded data slices amongst the three sites.

Having produced the further updated slice storage mapping, the DST client module 34 facilitates storage of the further updated write threshold number of encoded data slices to the further updated write threshold number of available DST execution units in accordance with the further updated slice storage mapping. The facilitating includes one or more of deleting one or more encoded data slices when the number of available encoded data slices is greater than the read threshold number and/or rebuilding one or more encoded data slices for storage in the one or more DST execution units of the set of DST execution units in accordance with the further updated slice mapping. For example, the DST client module 34 issues delete slice requests 606 for encoded data slices 6-8 to DST execution units 6-8 and for encoded data slices 22-23 to DST execution units 22-23. As a result, storage of the write threshold number of encoded data slices is maintained in a uniformly distributed fashion. Alternatively, the DST client module 34 may rebuild encoded data slices 9-13 when the encoded data slices 9-13 are unavailable as the previously temporarily unavailable site 2 becomes available.

FIG. 47D is a flowchart illustrating another example of optimizing data storage. The method includes step 610 where a processing module (e.g., of a distributed storage and task (DST) client module) dispersed storage error encodes a data segment to produce a set of encoded data slices. The method continues at step 612 where the processing module obtains DSN configuration information. For example, the processing module interprets a query response. The method continues at step 614 where the processing module maps a write threshold number of encoded data slices to a write threshold number of storage units to produce a slice storage mapping. For example, the processing module performs a deterministic function on an identifier associated with the data segment, an IDA width number, and a number of available sites to produce the slice storage mapping.

The method continues at step 616 where the processing module facilitates storage of the write threshold number of encoded data slices to the write threshold number of storage units in accordance with the slice storage mapping. For example, the processing module issues write slice requests to storage units of a set of storage units that includes the write threshold number of storage units, trims (e.g., deletes) encoded data slices beyond the write threshold number, and retries storage of encoded data slices when determining that the write threshold number has not yet been successfully stored.

The method continues at step 618 where the processing module detects unavailability of one or more of the write threshold number of encoded data slices. The detecting includes at least one of detecting a site failure, detecting a storage unit failure, and interpreting a slice storage error. The method continues at step 620 where the processing module obtains updated DSN configuration information. For example, the processing module interprets a subsequent query response.

The method continues at step 622 where the processing module maps an updated write threshold number of encoded data slices to an updated write threshold number of storage units to produce an updated slice storage mapping. For example, the processing module performs the deterministic function based on currently available encoded data slices of the write threshold number of encoded data slices to produce the updated slice storage mapping. Alternatively, the processing module produces a new mapping without regards to previously stored encoded data slices.

The method continues at step 624 where the processing module facilitates storage of the updated write threshold number of encoded data slices to the updated write threshold number of storage units in accordance with the updated slice storage mapping. For example, the processing module identifies encoded data slices of the updated write threshold number of encoded data slices that have not been stored, rebuilds the identified encoded data slices, and sends the rebuilt encoded data slices to corresponding storage units for storage.

The method continues at step 626 where the processing module detects availability of greater than the write threshold number of encoded data slices. The detecting includes at least one of detecting availability of a previously filled site, detecting availability of a previously filled storage unit, detecting availability of a previously unavailable site, detecting availability of a previously unavailable storage unit, and detecting availability of a previously unavailable encoded data slice.

The method continues at step 628 where the processing module obtains updated DSN configuration information. For example, the processing module interprets a still further query response. The method continues at step 630 where the processing module maps a further updated write threshold number of encoded data slices to a further updated write threshold number of storage units to produce a further updated slice storage mapping. For example, the processing module performs the deterministic function further based on currently available encoded data slices of the write threshold number of encoded data slices to produce the further updated slice storage mapping. Alternatively, the processing module produces a new slice storage mapping without regards to previously stored and available encoded data slices.

The method continues at step 632 where the processing module facilitates storage of the further updated write threshold number of encoded data slices to the further updated write threshold number of storage units in accordance with the further updated slice storage mapping. The facilitating includes one or more of deleting previously stored encoded data slices that are not included in the further updated slice storage mapping and rebuilding encoded data slices for encoded data slices that are included in the further updated slice storage mapping but are not available.

FIGS. 48A, 48B, and 48C are schematic block diagrams of an embodiment of a dispersed storage network (DSN) that includes the distribute storage and task (DST) processing unit 16 of FIG. 1 and a storage pool 640. The DST processing unit 16 includes the DST client module 34 of FIG. 1. The storage pool 640 includes a set of DST execution (EX) units, where the set of DST execution units includes an information dispersal algorithm (IDA) width number of DST execution units. For example, the storage pool includes DST execution units 1-36 when the IDA width is 36. The DSN functions to transition to an optimized data storage approach.

FIG. 48A illustrates steps of an example of operation of the transitioning to the optimized data storage approach where the DST client module 34 dispersed storage error encodes a data segment of the data to produce a set of encoded data slices, where at least a decode threshold number of encoded data slices of the set of encoded data slices are required for recovery of the data segment and where the set of encoded data slices includes an IDA width number of encoded data slices. For example, the DST client module 34 encodes the data segment to produce encoded data slices 1-36.

Having produced the set of encoded data slices, the DST client module 34 maintains storage of the set of encoded data slices in the IDA width number of DST execution units. For example, the DST client module 34 issues a set of write slice requests to the set of DST execution units 1-36, where the set of write slice requests includes the set of encoded data slices. For instance, the DST client module 34 sends (e.g., via the network 24 of FIG. 1) the encoded data slices 1-36 to the DST execution units 1-36 for storage. Alternatively, the set of write slice requests includes a write threshold number of encoded data slices where the write threshold number is less than the IDA width and greater than the decode threshold (e.g., write threshold of 23 when the IDA width is 36 and the decode threshold is 20). The maintaining further includes facilitating storage of a rebuilt encoded data slice when detecting a storage error associated with an encoded data slice of the set of encoded data slices. For example, the DST client module 34 rebuilds encoded data slice 2 when detecting a storage error associated with encoded data slice 2 and sends the rebuilt encoded data slice 2 to the DST execution unit 2 for storage. The maintaining further includes indicating that a rebuilding level of encoded data slices of the set of encoded data slices is to be maintained at the IDA width number. For example, the DST client module 34, or a rebuilding module, rebuilds any of the encoded data slices such that there are always 36 stored encoded data slices.

FIG. 48B illustrates further steps of the example of operation of the transitioning to the optimized data storage approach where the DST client module 34 detects activation of an incremental subset of DST execution units for utilization in a trimmed write configuration of the storage pool. The detecting includes at least one of interpreting an error message, receiving an activation message, and interpreting system registry information (e.g., an updated IDA width of 45 is detected). For example, the DST client module 34 detects activation of DST execution units 37-45 when interpreting a received activation message.

Having detected the activation of the incremental subset of DST execution units, the DST client module 34 generates a subset of rebuilt encoded data slices corresponding to the incremental subset of DST execution units. For example, the DST client module 34 obtains a decode threshold number of encoded data slices, dispersed storage error decodes the decode threshold number of encoded data slices to produce a recovered data segment, and dispersed storage error encodes the recovered data segment utilizing expanded rows of an encoding matrix to produce the subset of rebuilt encoded data slices. For instance, the DST client module 34 recovers 20 encoded data slices, decodes the 20 encoded data slices to produce the recovered data segment, dispersed storage error encodes the recovered data segment to produce encoded data slices 37-45.

Having generated the subset of rebuilt encoded data slices, the DST client module 34 maintains storage of an updated set of encoded data slices that includes the set of encoded data slices and the subset of rebuilt encoded data slices of the updated IDA width number of encoded data slices. For example, the DST client module 34 sends the subset of rebuilt encoded data slices (e.g., encoded data slices 37-45) to corresponding DST execution units of the incremental subset of DST execution units (e.g., DST execution units 37-45) for storage and temporarily updates the rebuilding level of encoded data slices as the updated IDA width number (e.g., 45).

FIG. 48C illustrates further steps of the example of operation of the transitioning to the optimized data storage approach where the DST client module 34 updates the write threshold number to produce an updated write threshold number in accordance with a trimmed write configuration of the storage pool 640. The updating includes at least one of receiving an input, interpreting updated system registry information, and determining to activate the trimmed write configuration based on a system performance level. For example, the DST client module 34 updates the write threshold number from 23 to 30 when interpreting the system registry information to activate the trimmed write configuration of the storage pool.

Having updated the write threshold number, the DST client module 34 maintains storage of the updated write threshold number of encoded data slices. The maintaining includes updating the rebuilding level of encoded data slices to the write threshold number (e.g., rather than the IDA width number) and trimming extra encoded data slices to facilitate the maintaining of the number of encoded data slices at the write threshold number. For example, the DST client module 34 issues delete slice requests 31-45 to the DST execution units 31-45 to facilitate deletion of encoded data slices 31-45 from the storage pool when the write threshold number of encoded data slices 1-30 are available.

FIG. 48D is a flowchart illustrating an example of transitioning to an optimized data storage approach. The method includes step 646 where a processing module (e.g., of a distributed storage and task (DST) client module) dispersed storage error encodes a data segment to produce a set of an IDA width number of encoded data slices. For example, the processing module encodes the data segment in accordance with dispersal parameters including the IDA width number, a write threshold number, and a decode threshold number.

The method continues at step 648 where the processing module maintains storage of the set of encoded data slices in a set of storage units. For example, the processing module stores the set of encoded data slices in the set of storage units and maintains a rebuilding level of encoded data slices at the IDA width level (e.g., enabling a rebuilding process to maintain storage of the full IDA width number of encoded data slices).

The method continues at step 650 where the processing module detects activation of an incremental subset of storage units to produce an expanded set of storage units in accordance with an updated IDA width number. The detecting includes at least one of interpreting an activation message, interpreting updated system registry information, receiving identifiers of the expanded set of storage units, and receiving the updated IDA width number.

The method continues at step 652 where the processing module generates an incremental subset of encoded data slices of an expanded set of encoded data slices (e.g., the set of encoded data slices and the incremental subset of encoded data slices) in accordance with the updated IDA width number. For example, the processing module performs a rebuilding function to generate the incremental subset of encoded data slices using an expanded encoding matrix based on the updated IDA width number.

The method continues at step 654 where the processing module maintains storage of the expanded set of encoded data slices in the expanded set of storage units. For example, the processing module sends the incremental subset of encoded data slices to the incremental subset of storage units for storage and temporarily updates the rebuilding level of encoded data slices to the updated IDA width number level.

The method continues at step 656 where the processing module updates the write threshold number to produce an updated write threshold number. The updating includes at least one of receiving the updated write threshold number and generating the updated write threshold number in accordance with the updated IDA width number and a trimming operation.

The method continues at step 658 where the processing module maintains storage of an updated write threshold number of encoded data slices in the expanded set of storage units. For example, the processing module deletes encoded data slices to maintain the updated write threshold number. As another example, the processing module rebuilds the encoded data slices associated with storage errors to maintain the updated write threshold number of stored and available encoded data slices.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc., described with reference to one or more of the embodiments discussed herein. Further, from figure to figure, the embodiments may incorporate the same or similarly named functions, steps, modules, etc., that may use the same or different reference numbers and, as such, the functions, steps, modules, etc., may be the same or similar functions, steps, modules, etc., or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for a computing device to rebuild a plurality of to-be rebuilt encoded data slices in a dispersed storage network (DSN), the method comprises:
for each set of encoded data slices of a plurality of sets of encoded data slices that includes at least one of the plurality of to-be rebuilt encoded data slices:
determining a cumulative memory health for memory devices of storage units storing other encoded data slices of a respective set of encoded data slices; and
determining a probability of data loss based on the cumulative memory health, respective dispersed storage error encoding parameters, and a number of encoded data slices requiring rebuilding in the respective set of encoded data slices;
prioritizing rebuilding of the plurality of to-be rebuilt encoded data slices based on the probability of data loss for each set of encoded data slices of the plurality of sets of encoded data slices; and
rebuilding, in accordance with the prioritizing, a first to-be rebuilt encoded data slice of the plurality of to-be rebuilt encoded data slices to produce a first rebuilt encoded data slice.

2. The method of claim 1, wherein the determining the cumulative memory health comprises:
for each of the memory devices of the storage units storing the other encoded data slices, determining whether a respective memory device is in a soft failure mode or a non-failure mode;
for each memory device in the soft failure mode, determining a soft failure mode level; and
calculating the cumulative memory health based on a ratio of memory devices in the soft failure mode to the memory devices in the non-failure mode and weighting the ratio based on the soft failure modes levels.

3. The method of claim 1, wherein the determining the probability of data loss comprises:
determining a number corresponding to the other encoded data slices;
determining a total number of encoded data slices in the respective set of encoded data slices from the dispersed storage error encoding parameters;
determining a decode threshold number of encoded data slices of the respective set of encoded data slices from the dispersed storage error encoding parameters;
determining a current redundancy number of encoded data slices based on the total number minus the decode threshold number and minus the number of encoded data slices requiring rebuilding; and
weighting the current redundancy number based on the cumulative memory health to produce the probability of data loss.

4. The method of claim 1 further comprises:
for a set of encoded data slices of the plurality of sets of encoded data slices having multiple encoded data slices requiring rebuilding:
determining a first probability of data loss based on the cumulative memory health, the respective dispersed storage error encoding parameters, and the multiple encoded data slices requiring rebuilding in the respective set of encoded data slices; and
determining a second probability of data loss based on the cumulative memory health, the respective dispersed storage error encoding parameters, and the multiple encoded data slices requiring rebuilding less one of the multiple encoded data slices requiring rebuilding;
rebuilding the one of the multiple encoded data slices requiring rebuilding in accordance with the first probability of data loss; and
rebuilding a second one of the multiple encoded data slices requiring rebuilding in accordance with the second probability of data loss.

5. The method of claim 1 further comprises:
identifying a new memory device with one of the storage units based on a favorable memory health of the new memory device for storing the first rebuilt encoded data slice.

6. The method of claim 1 further comprises:
identifying new to-be rebuilt encoded data slices;
updating the plurality of sets of encoded data slices to include each new set of encoded data slices including at least one of the new to-be rebuilt encoded data slices and to exclude sets of the plurality of sets of encoded data slices for which the at least one of the plurality of to-be rebuilt encoded data slices has been rebuilt to produce an updated plurality of sets of encoded data slices;
for each set of encoded data slices of the updated plurality of sets of encoded data slices:
determining a new cumulative memory health for memory devices of storage units storing other encoded data slices of the respective set of encoded data slices; and
determining a new probability of data loss based on the new cumulative memory health, the respective dispersed storage error encoding parameters, and the number of encoded data slices requiring rebuilding in the respective set of encoded data slices;
updating prioritizing rebuilding of remaining to-be rebuilt encoded data slices of the plurality of to-be rebuilt encoded data slices and of the new to-be rebuilt encoded data slices based on the new probability of data loss for each set of encoded data slices of the updated plurality of sets of encoded data slices; and
rebuilding, in accordance with the updated prioritizing, a second to-be rebuilt encoded data slice of the remaining to-be rebuilt encoded data slices of the plurality of to-be rebuilt encoded data slices and of the new to-be rebuilt encoded data slices.

7. A non-transitory computer readable storage medium comprises:
at least one memory section that stores operational instructions that, when executed by one or more processing modules of one or more computing devices of a dispersed storage network (DSN), causes the one or more computing devices to:
for each set of encoded data slices of a plurality of sets of encoded data slices that includes at least one of a plurality of to-be rebuilt encoded data slices:
determine a cumulative memory health for memory devices of storage units storing other encoded data slices of a respective set of encoded data slices; and
determine a probability of data loss based on the cumulative memory health, respective dispersed storage error encoding parameters, and a number of encoded data slices requiring rebuilding in the respective set of encoded data slices;
prioritize rebuilding of the plurality of to-be rebuilt encoded data slices based on the probability of data loss for each set of encoded data slices of the plurality of sets of encoded data slices; and
rebuild, in accordance with the prioritizing, a first to-be rebuilt encoded data slice of the plurality of to-be rebuilt encoded data slices to produce a first rebuilt encoded data slice.

8. The non-transitory computer readable storage medium of claim 7, wherein the one or more processing modules functions to execute the operational instructions stored by the at least one memory section to cause the one or more computing devices of the DSN to determine the cumulative memory health by:
for each of the memory devices of the storage units storing the other encoded data slices, determining whether a respective memory device is in a soft failure mode or a non-failure mode;
for each memory device in the soft failure mode, determining a soft failure mode level; and
calculating the cumulative memory health based on a ratio of memory devices in the soft failure mode to the memory devices in the non-failure mode and weighting the ratio based on the soft failure modes levels.

9. The non-transitory computer readable storage medium of claim 7, wherein the one or more processing modules functions to execute the operational instructions stored by the at least one memory section to cause the one or more computing devices of the DSN to determine the probability of data loss by:
determining a number corresponding to the other encoded data slices;
determining a total number of encoded data slices in the respective set of encoded data slices from the dispersed storage error encoding parameters;
determining a decode threshold number of encoded data slices of the respective set of encoded data slices from the dispersed storage error encoding parameters;
determining a current redundancy number of encoded data slices based on the total number minus the decode threshold number and minus the number of encoded data slices requiring rebuilding; and
weighting the current redundancy number based on the cumulative memory health to produce the probability of data loss.

10. The non-transitory computer readable storage medium of claim 7 further comprises:
the at least one memory section stores further operational instructions that, when executed by the one or more processing modules, causes the one or more computing devices of the DSN to:
for a set of encoded data slices of the plurality of sets of encoded data slices having multiple encoded data slices requiring rebuilding:
determine a first probability of data loss based on the cumulative memory health, the respective dispersed storage error encoding parameters, and the multiple encoded data slices requiring rebuilding in the respective set of encoded data slices; and
determine a second probability of data loss based on the cumulative memory health, the respective dispersed storage error encoding parameters, and the multiple encoded data slices requiring rebuilding less one of the multiple encoded data slices requiring rebuilding;
rebuild the one of the multiple encoded data slices requiring rebuilding in accordance with the first probability of data loss; and
rebuild a second one of the multiple encoded data slices requiring rebuilding in accordance with the second probability of data loss.

11. The non-transitory computer readable storage medium of claim 7 further comprises:
the at least one memory section stores further operational instructions that, when executed by the one or more processing modules, causes the one or more computing devices of the DSN to:

identify a new memory device with one of the storage units based on a favorable memory health of the new memory device for storing the first rebuilt encoded data slice.

12. The non-transitory computer readable storage medium of claim 7 further comprises:

the at least one memory section stores further operational instructions that, when executed by the one or more processing modules, causes the one or more computing devices of the DSN to:

identify new to-be rebuilt encoded data slices;

update the plurality of sets of encoded data slices to include each new set of encoded data slices including at least one of the new to-be rebuilt encoded data slices and to exclude sets of the plurality of sets of encoded data slices for which the at least one of the plurality of to-be rebuilt encoded data slices has been rebuilt to produce an updated plurality of sets of encoded data slices;

for each set of encoded data slices of the updated plurality of sets of encoded data slices:

determine a new cumulative memory health for memory devices of storage units storing other encoded data slices of the respective set of encoded data slices; and determine a new probability of data loss based on the new cumulative memory health, the respective dispersed storage error encoding parameters, and the number of encoded data slices requiring rebuilding in the respective set of encoded data slices;

update prioritizing rebuilding of remaining to-be rebuilt encoded data slices of the plurality of to-be rebuilt encoded data slices and of the new to-be rebuilt encoded data slices based on the new probability of data loss for each set of encoded data slices of the updated plurality of sets of encoded data slices; and rebuild, in accordance with the updated prioritizing, a second to-be rebuilt encoded data slice of the remaining to-be rebuilt encoded data slices of the plurality of to-be rebuilt encoded data slices and of the new to-be rebuilt encoded data slices.

13. A computing device of a group of computing devices of a dispersed storage network (DSN), the computing device comprises:

an interface;

a local memory; and a processing module operably coupled to the interface and the local memory, wherein the processing module functions to:

for each set of encoded data slices of a plurality of sets of encoded data slices that includes at least one of a plurality of to-be rebuilt encoded data slices:

determine a cumulative memory health for memory devices of storage units storing other encoded data slices of a respective set of encoded data slices; and determine a probability of data loss based on the cumulative memory health, respective dispersed storage error encoding parameters, and a number of encoded data slices requiring rebuilding in the respective set of encoded data slices;

prioritize rebuilding of the plurality of to-be rebuilt encoded data slices based on the probability of data loss for each set of encoded data slices of the plurality of sets of encoded data slices; and rebuild, in accordance with the prioritizing, a first to-be rebuilt encoded data slice of the plurality of to-be rebuilt encoded data slices to produce a first rebuilt encoded data slice.

14. The computing device of claim 13, wherein the processing module functions to determine the cumulative memory health by:

for each of the memory devices of the storage units storing the other encoded data slices, determining whether a respective memory device is in a soft failure mode or a non-failure mode;

for each memory device in the soft failure mode, determining a soft failure mode level; and calculating the cumulative memory health based on a ratio of memory devices in the soft failure mode to the memory devices in the non-failure mode and weighting the ratio based on the soft failure modes levels.

15. The computing device of claim 13, wherein the processing module functions to determine the probability of data loss by:

determining a number corresponding to the other encoded data slices;

determining a total number of encoded data slices in the respective set of encoded data slices from the dispersed storage error encoding parameters;

determining a decode threshold number of encoded data slices of the respective set of encoded data slices from the dispersed storage error encoding parameters;

determining a current redundancy number of encoded data slices based on the total number minus the decode threshold number and minus the number of encoded data slices requiring rebuilding; and weighting the current redundancy number based on the cumulative memory health to produce the probability of data loss.

16. The computing device of claim 13, wherein the processing module further functions to:

for a set of encoded data slices of the plurality of sets of encoded data slices having multiple encoded data slices requiring rebuilding:

determine a first probability of data loss based on the cumulative memory health, the respective dispersed storage error encoding parameters, and the multiple encoded data slices requiring rebuilding in the respective set of encoded data slices; and determine a second probability of data loss based on the cumulative memory health, the respective dispersed storage error encoding parameters, and the multiple encoded data slices requiring rebuilding less one of the multiple encoded data slices requiring rebuilding;

rebuild the one of the multiple encoded data slices requiring rebuilding in accordance with the first probability of data loss; and rebuild a second one of the multiple encoded data slices requiring rebuilding in accordance with the second probability of data loss.

17. The computing device of claim 13, wherein the processing module further functions to:

identify a new memory device with one of the storage units based on a favorable memory health of the new memory device for storing the first rebuilt encoded data slice.

18. The computing device of claim 13, wherein the processing module further functions to:

identify new to-be rebuilt encoded data slices;

update the plurality of sets of encoded data slices to include each new set of encoded data slices including at least one of the new to-be rebuilt encoded data slices and to exclude sets of the plurality of sets of encoded data slices for which the at least one of the plurality of to-be rebuilt encoded data slices has been rebuilt to produce an updated plurality of sets of encoded data slices;

for each set of encoded data slices of the updated plurality of sets of encoded data slices:
  determine a new cumulative memory health for memory devices of storage units storing other encoded data slices of the respective set of encoded data slices; and
  determine a new probability of data loss based on the new cumulative memory health, the respective dispersed storage error encoding parameters, and the number of encoded data slices requiring rebuilding in the respective set of encoded data slices;

update prioritizing rebuilding of remaining to-be rebuilt encoded data slices of the plurality of to-be rebuilt encoded data slices and of the new to-be rebuilt encoded data slices based on the new probability of data loss for each set of encoded data slices of the updated plurality of sets of encoded data slices; and rebuild, in accordance with the updated prioritizing, a second to-be rebuilt encoded data slice of the remaining to-be rebuilt encoded data slices of the plurality of to-be rebuilt encoded data slices and of the new to-be rebuilt encoded data slices.

* * * * *